United States Patent
Cann et al.

(10) Patent No.: US 7,563,851 B2
(45) Date of Patent: Jul. 21, 2009

(54) PRODUCTION OF BROAD MOLECULAR WEIGHT POLYETHYLENE

(75) Inventors: Kevin J Cann, Rocky Hill, NJ (US); Minghui Zhang, Hillsborough, NJ (US); Jose Fernando Cevallos-Candau, Charleston, WV (US); John Moorhouse, Kendall Park, NJ (US); Mark Gregory Goode, Hurricane, WV (US); Daniel Paul Zilker, Jr., Charleston, WV (US); Maria Apecetche, Piscataway, NJ (US)

(73) Assignee: Univation Technologies, LLC, Houston, TX (US)

( * ) Notice: Subject to any disclaimer, the term of this patent is extended or adjusted under 35 U.S.C. 154(b) by 286 days.

(21) Appl. No.: 11/202,311

(22) Filed: Aug. 11, 2005

(65) Prior Publication Data

US 2006/0074205 A1    Apr. 6, 2006

Related U.S. Application Data

(62) Division of application No. 10/716,291, filed on Nov. 18, 2003, now Pat. No. 6,989,344.

(60) Provisional application No. 60/436,790, filed on Dec. 27, 2002.

(51) Int. Cl.
*C08F 4/24* (2006.01)
*C08F 4/52* (2006.01)
(52) U.S. Cl. ........................... 526/106; 526/105
(58) Field of Classification Search ............ 526/105, 526/106
See application file for complete search history.

(56) References Cited

U.S. PATENT DOCUMENTS

| 3,622,521 A | * | 11/1971 | Hogan et al. ............... 502/167 |
| 3,878,179 A | * | 4/1975 | Hogan ........................ 526/105 |
| 3,960,826 A | * | 6/1976 | Aboutboul et al. .......... 526/103 |
| 4,025,707 A | * | 5/1977 | Hogan ........................ 526/105 |
| 4,290,914 A | | 9/1981 | Katzen et al. ............... 242/428 |
| 4,374,234 A | | 2/1983 | Stricklen et al. ............. 526/105 |
| 4,404,340 A | | 9/1983 | Speca et al. .................. 526/97 |
| 4,801,572 A | | 1/1989 | Hsieh ........................ 502/242 |
| 4,879,359 A | | 11/1989 | Chamla et al. ............. 526/105 |
| 5,034,364 A | | 7/1991 | Kral et al. ................... 502/117 |
| 5,075,395 A | | 12/1991 | Durand et al. .............. 526/105 |

(Continued)

FOREIGN PATENT DOCUMENTS

CN          1214344         4/1999

(Continued)

OTHER PUBLICATIONS

Abstract—JP 58-084806; published date: Nov. 17, 1981.

*Primary Examiner*—Caixia Lu
(74) *Attorney, Agent, or Firm*—Kevin M. Faulkner; Leandro Arechederra, III

(57) ABSTRACT

The present invention is directed to the use of aluminum alkyl activators and co-catalysts to improve the performance of chromium-based catalysts. The aluminum alkyls allow for the variable control of polymer molecular weight, control of side branching while possessing desirable productivities, and may be applied to the catalyst directly or separately to the reactor. Adding the alkyl aluminum compound directly to the reactor (in-situ) eliminates induction times.

11 Claims, 35 Drawing Sheets

U.S. PATENT DOCUMENTS

| | | |
|---|---|---|
| 5,081,089 A | 1/1992 | Rekers et al. ............... 502/117 |
| 5,198,400 A | 3/1993 | Katzen et al. ............... 502/113 |
| 5,310,834 A | 5/1994 | Katzen et al. ............... 526/114 |
| 5,541,270 A | 7/1996 | Chinh et al. ................. 526/68 |
| 5,624,877 A | 4/1997 | Bergmeister et al. ........ 502/120 |
| 5,648,439 A | 7/1997 | Bergmeister et al. ......... 526/96 |
| 5,800,800 A | 9/1998 | Pinnavaia et al. ............ 423/702 |
| 5,844,054 A | 12/1998 | Samples et al. ............... 526/60 |
| 5,910,299 A | 6/1999 | Carluccio et al. ............ 423/706 |
| 6,165,929 A | 12/2000 | McDaniel et al. ........... 502/117 |
| 6,245,867 B1 | 6/2001 | Debras ........................ 526/65 |
| 6,326,443 B1 | 12/2001 | Monoi et al. ................ 526/129 |
| 6,673,736 B2 | 1/2004 | Kellum et al. ............... 502/152 |
| 6,734,131 B2 | 5/2004 | Shih et al. ..................... 502/80 |
| 6,828,268 B1 | 12/2004 | McDaniel et al. ........... 502/113 |
| 6,928,278 B2 | 8/2005 | Shimomura ................. 455/411 |
| 6,989,344 B2 | 1/2006 | Cann et al. .................. 502/150 |
| 2002/0042482 A1 | 4/2002 | Monoi et al. ................ 526/106 |
| 2004/0016705 A1 | 1/2004 | Umezawa et al. ........... 210/724 |
| 2005/0272886 A1 | 12/2005 | Cann et al. .................. 526/106 |

FOREIGN PATENT DOCUMENTS

| | | |
|---|---|---|
| CN | 1098282 C | 1/2001 |
| CN | ZL 96111424.X | 1/2001 |
| CN | 1095475 C | 12/2002 |
| CN | ZL 97106144.0 | 12/2002 |
| GB | 2099005 | 12/1982 |
| JP | 10-265513 | 10/1998 |
| JP | 11-228622 | 8/1999 |
| JP | 2001198811 | 7/2001 |
| JP | 2001294612 | 10/2001 |
| JP | 2002020412 | 1/2002 |
| JP | 36-22144 | 2/2005 |
| RU | 2177954 | 1/2002 |
| WO | WO 00/39173 | 7/2000 |
| WO | WO 01/32307 | 5/2001 |
| WO | WO 01/94428 A1 | 12/2001 |
| WO | WO 03/104291 | 12/2003 |

* cited by examiner

PRODUCTION OF BROAD MOLECULAR WEIGHT POLYETHYLENE

CROSS-REFERENCE TO RELATED APPLICATION

The present application is a divisional of U.S. patent application Ser. No. 10/716,291, filed Nov. 18, 2003, now issued as U.S. Pat. No. 6,989,344, which claims priority to Provisional U.S. Patent Application Ser. No. 60/436,790 filed Dec. 27, 2002, and are herein incorporated by reference.

TECHNICAL FIELD

The present invention relates to the use of chromium-based catalysts with aluminum alkyl activators. The aluminum alkyls allow for the control of polymer molecular weight, molecular weight distribution, and side-chain branching while possessing desirable productivities. The aluminum alkyls may be applied to the catalyst directly or separately to the reactor.

BACKGROUND OF THE INVENTION

Ethylene polymers have been used generally and widely as resin materials for various molded articles and are required of different properties depending on the molding method and purpose. For example, polymers having relatively low molecular weights and narrow molecular weight distributions are suitable for articles molded by an injection molding method. On the other hand, polymers having relatively high molecular weights and broad molecular weight distributions are suitable for articles molded by blow molding or inflation molding. In many applications, medium-to-high molecular weight polyethylenes are desirable. Such polyethylenes have sufficient strength for applications which call for such strength (e.g., pipe applications), and simultaneously possess good processability characteristics.

Ethylene polymers having broad molecular weight distributions can be obtained by use of a chromium catalyst obtained by calcining a chromium compound carried on an inorganic oxide carrier in a non-reducing atmosphere to activate it such that at least a portion of the carried chromium atoms is converted to hexavalent chromium atoms (Cr+6) commonly referred to in the art as the Phillips catalyst. The respective material is impregnated onto silica, fluidized and heated in the presence of oxygen to about 400° C.-860° C., converting chromium from the +3 oxidation state to the +6 oxidation state. A second chromium catalyst used for high density polyethylene applications consists of silylchromate (bis-triphenylsilyl chromate) absorbed on dehydrated silica and subsequently reduced with diethylaluminum ethoxide (DEALE). The resulting polyethylenes produced by each of these catalysts are different in some important properties. Chromium oxide-on-silica catalysts have good productivity (g PE/g catalyst), also measured by activity (g PE/g catalyst-hr) but produce polyethylenes with molecular weight distributions lower than that desired. Silylchromate-based catalysts produce polyethylenes with desirable molecular weight characteristics (broader molecular weight distribution with a high molecular weight shoulder on molecular weight distribution curve, indicative of two distinct molecular weight populations).

Monoi, in Japanese Patent 2002020412 discloses contain the use of inorganic oxide-supported Cr+6-containing solid components (A) prepared by sintering under nonreducing conditions, dialkylaluminum functional group-containing alkoxides (B), and trialkylaluminum (C). The resulting ethylene polymers are said to possess good environmental stress crack resistance and good blow molding creep resistance. U.S. application 2002/0042482 discloses a method of ethylene polymerization in co-presence of hydrogen using a trialkylaluminum compound-carried chromium catalyst (A), wherein the chromium catalyst is obtained by calcination-activating a Cr compound carried on an inorganic oxide carrier in a non-reducing atmospheric to convert Cr atoms into the hexavalent state and then treating A with a trialkylaluminum compound in an inert hydrocarbon solvent and removing the solvent in a short time.

Hasebe et al. Japanese Patent 2001294612 discloses catalysts containing inorganic oxide-supported Cr compounds calcined at 300° C.-1100° C. in a nonreducing atmosphere, $R_3$-$nAlL_n$ (R=C1-12 alkyl; L=C1-8 alkoxy, phenoxy; 0<n<1), and Lewis base organic compounds. The catalysts are said to produce polyolefins with high molecular weight and narrow molecular weight distribution.

Hasebe et al., in Japanese Patent 2001198811 discloses polymerization of olefins using catalysts containing Cr oxides (supported on fire resistant compounds and activated by heating under nonreductive conditions) and $R_3$-$nAlL_n$ (R=C1-6 alkyl; L=C1-8 alkoxy, phenoxy; n>0.5 but <1). Ethylene is polymerized in the presence of $SiO_2$-supported $CrO_3$ and a reaction product of a 0.9:1 MeOH-$Et_3$Al mixture to give a polymer with melt index 0.18 g/10 min at 190° under 2.16-kg load and 1-hexene content 1.6 mg/g-polymer.

Da, et al, in Chinese Patent 1214344 teaches a supported chromium-based catalyst for gas-phase polymerization of ethylene prepared by impregnating an inorganic oxide support having hydroxyl group on the surface with an inorganic chromium compound aqueous solution; drying in air; activating the particles in oxygen; and reducing the activated catalyst intermediate with an organic aluminum compound. 10 g commercial silica gel was mixed with 0.05 mol/L $CrO_3$ aqueous solution, dried at 80-120° C. for 12 h, baked at 200° C. for 2 h and 600° C. for 4 h, reduced with 25% hexane solution of diethylethoxyaluminum to give powder catalyst with Cr content 0.25% and Al/Cr ratio of 3.

Durand, et al, U.S. Pat. No. 5,075,395, teaches a process for elimination of the induction period in the polymerization of ethylene by bringing ethylene in contact under fluidized-bed polymerization conditions and/or stirred mechanically, with a charge powder in the presence of a catalyst comprising a chromium oxide compound associated with a granular support and activated by thermal treatment, this catalyst being used in the form of a prepolymer. The Durand process is characterized in that the charge powder employed is previously subjected to a treatment by contacting the said charge powder with an organoaluminium compound, in such a way that the polymerization starts up immediately after the contacting of the ethylene with the charge powder in the presence of the prepolymer.

Unique to chromium-based catalysis generally, molecular weights increase as residence time of the reaction increases. Thus, increasing residence time allows one to achieve higher molecular weight polymers from chromium oxide-based catalysts. However, an increase in reactor residence time represents a decrease in reactor throughput and an increase in production costs. Lowering residence times may lead to better economics but for any particular chromium-based catalyst, also lead to lower polymer molecular weights. To help preserve higher molecular weights, one may decrease reactor temperature, but this results in reduced heat transfer and lower production rates. Better control of the characteristics of the resulting polyethylene, while simultaneously preserving or improving productivity is desired in chromium-based catalyst systems. It is desirable to preserve desirable molecular weights and catalyst activities with decreased residence times. While the prior art contains these and other examples of the use of Phillips-type catalysts and an organoaluminum compound in combination, there has not yet been disclosed a method for obtaining a polyethylene having moderate-to-high molecular weight using a catalyst system having good productivity and in which the molecular weight and molecular weight distribution may be tuned and side chain branching may be controlled. Additionally, the prior art is devoid of any teaching of the use of the in-situ addition of aluminum alkyls (directly to the reactor) to comprehensively address the problems encountered with higher reactor throughput and shorter residence time (polymer molecular weight, molecular weight distribution and catalyst productivity). The present invention addresses a number of the shortcomings of chromium-based ethylene polymerization not previously addressed in the prior art.

BRIEF SUMMARY OF THE INVENTION

The present invention is directed to a system and method for the polymerization of ethylene that can be used for high space time yield operation (shorter residence times) employing chromium-based catalysts that have good productivities and variable control of polymer molecular weight, molecular weight distribution, and side chain branch formation.

As used herein, "a" or "an" is defined herein as one or more.

As used herein, "in situ", in reference to the mode of addition of a component to the catalyst, is defined herein as addition to the catalyst in the reactor. Therefore, when a catalyst component is added in situ, it is added to the remaining catalyst components in the reactor and is not combined with the other catalyst components prior to their transport to the reactor. "In reactor" is synonymous with and used interchangeably herein with "in situ."

As used herein, "in catalyst" or "on catalyst", in reference to the mode of addition of a component to the catalyst, is defined herein as addition directly to the catalyst prior to introduction of the catalyst to the reactor. Therefore, when a component is added to the catalyst "in catalyst" or "on catalyst", it is added to the other catalyst components prior to the transport of the aggregate to the reactor.

As used herein, the term alkyl aluminum is defined as a compound having the general formula $R_3Al$ wherein R can be any of one to twelve carbon alkyl groups. The R groups can be the same or different.

As used herein, the term alkyl aluminum alkoxide is defined as a compound having the general formula $R_2$—Al—OR wherein R can be any of one to twelve carbon alkyl groups and OR is a one to twelve carbon alkoxy or phenoxy group. The R groups can be the same or different.

As used herein, "DEALE" means diethyl aluminum ethoxide.

As used herein, "TEAL" means triethyl aluminum.

As used herein, "TEB" means triethyl boron.

As used herein, "TIBA" means tri-isobutyl aluminum.

As used herein, "TNHAL" means tri-n-hexyl aluminum.

As used herein, "$M_w$" is the weight-average molecular weight.

As used herein, "$M_n$" is the number-average molecular weight.

As used herein, "$M_z$" is the z-average molecular weight.

As used herein, "molecular weight distribution" is equal to $M_w/M_n$.

In one embodiment of the present invention, there is a supported chromium catalyst comprising chromium oxide, a silica-containing support comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; and an organoaluminum compound wherein the supported chromium catalyst is activated at 400-860° C. In another embodiment, the organoaluminum compound is added in situ. In another embodiment, the silica has a pore volume of about 2.4-3.7 $cm^3/g$ and a surface area of about 410-620 $m^2/g$ and the organoaluminum compound is an alkyl aluminum alkoxide compound. In another embodiment, the organoaluminum compound is an alkyl aluminum alkoxide compound. In a preferred embodiment, the alkyl aluminum alkoxide compound is diethyl aluminum ethoxide. In another embodiment, the catalyst is formed by the in situ addition of an alkyl aluminum alkoxide compound. In a preferred embodiment, the alkyl aluminum alkoxide added in situ is diethyl aluminum ethoxide. In one embodiment, the supported catalyst is activated at 600-860° C. In another embodiment the catalyst also comprises titanium tetraisopropoxide. In another embodiment, the catalyst organoaluminum compound is an alkyl aluminum compound. In a preferred embodiment where the organoaluminum compound is an alkyl aluminum compound, the alkyl aluminum compound is triethyl aluminum, tri-isobutyl aluminum, or tri-n-hexyl aluminum. Preferably, the alkyl aluminum compound is added in situ. More preferably, the catalyst is formed by the in situ addition of the triethyl aluminum.

In another embodiment, there is a supported chromium catalyst system comprising silylchromate, a silica-containing support, dehydrated at about 400-860° C., comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; an organoaluminum compound; the catalyst formed by the process of adding the organoaluminum compound in situ. In another embodiment, the organoaluminum compound is an alkyl aluminum alkoxide compound. In a preferred embodiment, the alkyl aluminum alkoxide compound is diethyl aluminum ethoxide. In another embodiment, the organoaluminum compound is an alkyl aluminum compound. In a preferred embodiment, the alkyl aluminum compound is selected from the group consisting of triethyl aluminum, tri-isobutyl aluminum, and tri-n-hexyl aluminum.

In another embodiment, there is a supported chromium catalyst system comprising: silylchromate, a silica-containing support, dehydrated at about 400-860° C., comprising silica selected from the group consisting of silica having (a) a pore volume of about 1.1-1.8 $cm^3/g$ and a surface area of about 245-375 $m^2/g$, (b) a pore volume of about 2.4-3.7 $cm^3/g$ and a surface area of about 410-620 $m^2/g$, and (c) a pore volume of about 0.9-1.4 $cm^3/g$ and a surface area of about 390-590 $m^2/g$; an organoaluminum compound selected from the group consisting of triethyl aluminum, tri-isobutyl aluminum, and tri-n-hexyl aluminum, the catalyst being formed by the process of adding the organoaluminum compound in catalyst.

In another embodiment, there is a supported chromium catalyst system comprising silylchromate, a silica-containing support, dehydrated at 400-860° C., comprising silica selected from the group consisting of silica having a pore volume of about 0.9-1.4 cm³/g and a surface area of about 390-590 m²/g; and, an organoaluminum compound.

In another embodiment, there is a supported chromium catalyst system comprising silylchromate, a silica-containing support, dehydrated at 400-860° C., comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g; and triethyl boron, formed by the process of adding the triethyl boron in situ.

In another embodiment, there is a process for producing an ethylene polymer comprising the steps of contacting ethylene under polymerization conditions with a catalyst system, the catalyst system comprising chromium oxide, an alkyl aluminum, and a silica-containing support comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g; and, controlling one or more of catalyst activity, polymer side chain branching, polymer $M_z/M_w$, polymer $M_w/M_n$, polymer density and polymer molecular weight of the resulting ethylene polymer by the addition of alkyl aluminum alkoxide in an amount to effect a final ratio of equivalents of aluminum to equivalents of chromium of from 0.1:1 to 10:1. In another embodiment the alkyl aluminum is triethyl aluminum, tri-isobutyl aluminum, or tri-n-hexyl aluminum. In a preferred embodiment, the alkyl aluminum alkoxide is diethyl aluminum ethoxide. In another embodiment, the catalyst system further comprises titanium tetraisopropoxide. In a preferred embodiment, the polymerization is gas phase polymerization. In a preferred embodiment, the addition of diethyl aluminum ethoxide comprises in situ addition. In another embodiment, the addition of diethyl aluminum ethoxide comprises addition directly to the catalyst during catalyst preparation. In another embodiment, the polymer $M_w/M_n$ is greater than or equal to 16 and said polymer $M_z/M_w$ is greater than or equal to 6.

In another embodiment, there is a process for producing an ethylene polymer comprising the steps of contacting ethylene under polymerization conditions with a catalyst system comprising silylchromate and a silica-containing support comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g; wherein said silica-containing support is dehydrated at about 400-860° C.; and, controlling catalyst productivity, reaction induction time and polymer molecular weight of the resulting ethylene polymer by the addition of an organoaluminum compound in an amount to effect a final ratio of equivalents of aluminum to equivalents of chromium of from 0.1:1 to 10:1. In a preferred embodiment, the addition of an organoaluminum compound comprises addition of diethyl aluminum ethoxide. In another embodiment the addition of diethyl aluminum ethoxide comprises in situ addition of diethyl aluminum ethoxide. In another embodiment, the addition of said diethyl aluminum ethoxide comprises addition directly to the catalyst during catalyst preparation. In a preferred embodiment, the polymerization is gas phase polymerization. Preferably, the silylchromate is loaded onto said silica-containing support at a loading of about 0.15-1.0 weight % of chromium. In another embodiment, the addition of an organoaluminum compound comprises addition of an alkyl aluminum compound. Preferably, the alkyl aluminum compound is selected from the group consisting of triethyl aluminum, tri-isobutyl aluminum, and tri-n-hexyl aluminum.

In another embodiment, there is a process for producing an ethylene polymer comprising the steps of contacting ethylene under polymerization conditions with a catalyst system comprising silylchromate and a silica-containing support comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g; herein said silica-containing support is dehydrated at about 400-860° C.; and, controlling catalyst activity, reaction induction time, and polymer molecular weight of the resulting ethylene polymer by the addition of a co-catalyst in an amount to effect a final ratio of equivalents of aluminum to equivalents of chromium of from 0.1:1 to 10:1. In another embodiment, the step of contacting comprises contacting with diethyl aluminum ethoxide. In another embodiment, the co-catalyst is selected from the group consisting of triethyl aluminum, tri-isobutyl aluminum, and tri-n-hexyl aluminum. In another embodiment, the ratio of equivalents of aluminum to equivalents of chromium is from about 1:1 to about 3:1. In a preferred embodiment, the polymerization is gas phase polymerization. In another embodiment, the catalyst is treated, in catalyst, with an alkyl aluminum or an alkyl aluminum alkoxide prior to the addition of co-catalyst. In another specific embodiment, the alkyl aluminum alkoxide is diethyl aluminum ethoxide and the ratio of equivalents of aluminum to equivalents of chromium is between about 1:1 and 10:1.

In another embodiment of the present invention there is a process for producing an ethylene polymer comprising the steps of contacting ethylene under polymerization conditions with a catalyst system comprising chromium oxide and a silica-containing support comprising silica selected from the group consisting of silica having (a) a pore volume of about 1.1-1.8 cm³/g and a surface area of about 245-375 m²/g, (b) a pore volume of about 2.4-3.7 cm³/g and a surface area of about 410-620 m²/g, and (c) a pore volume of about 0.9-1.4 cm³/g and a surface area of about 390-590 m²/g; controlling catalyst activity, polymer $M_w/M_n$, and polymer molecular weight of the resulting ethylene polymer by the addition of a co-catalyst in an amount to effect a final ratio of equivalents of aluminum to equivalents of chromium of from 0.1:1 to 10:1. In a preferred embodiment, the co-catalyst is selected from the group consisting of triethyl aluminum, tri-isobutyl aluminum, and tri-n-hexyl aluminum. In a specific embodiment, the ratio of equivalents of aluminum to equivalents of chromium is from about 1:1 to about 3:1. In another embodiment, the polymerization is gas phase polymerization.

Another embodiment of the present invention is a process for producing an ethylene polymer in a reactor comprising contacting ethylene under polymerization conditions with a chrome catalyst system; conducting the polymerization at a space-time-yield value of greater than 8; and operating the polymerization at a catalyst productivity of greater than 3000 kg polymer/kg catalyst and at a reaction temperature at least 2.5° C. higher than the reaction temperature when polymerizing with the same chrome catalyst system in the absence of triethyl aluminum and producing the ethylene polymer at the same polymer molecular weight and density using the same space-time-yield value, ethylene partial pressure, $H_2/C_2$ gas mole ratio and comonomer to $C_2$ gas mole ratio.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 2:
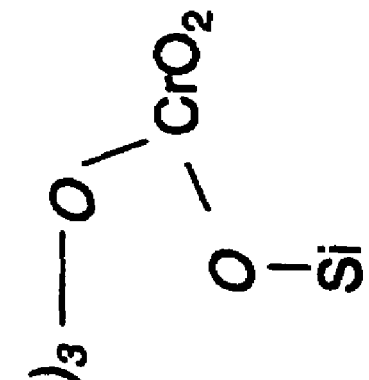
FIG. 2. Possible structure of silylchromate-on-silica catalyst.

The invention is applicable to the polymerization of olefins by any suspension, solution, slurry, or gas phase process, using known equipment and reaction conditions, and is not limited to any specific type of polymerization system. Generally, olefin polymerization temperatures range from about 0° C. to about 300° C. at atmospheric, subatmospheric, or superatmospheric pressures. Slurry or solution polymerization systems may utilize subatmospheric or superatmospheric pressures and temperatures in the range of about 40° C. to about 300° C. A useful liquid phase polymerization system is described in U.S. Pat. No. 3,324,095. Liquid phase polymerization systems generally comprise a reactor to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

The invention is, however, especially useful with gas phase polymerization systems, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase polymerization systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally partially or fully condensed, and recycled into the reactor. Product is withdrawn from the reactor and make-up monomer is added to the recycle stream. As desired for temperature control of the polymerization system, any gas inert to the catalyst composition and reactants may also be present in the gas stream. In addition, a fluidization aid such as carbon black, silica, clay, or talc may be used, as disclosed in U.S. Pat. No. 4,994,534.

The polymerization system may comprise a single reactor or two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls.

Conventional adjuvants may be used in the process, provided they do not interfere with the operation of the catalyst composition in forming the desired polyolefin. Hydrogen may be used as a chain transfer agent in the process, in amounts up to about 10 moles of hydrogen per mole of total monomer feed.

Polyolefins that may be produced according to the invention include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.86 to about 0.95 may be made. Suitable higher alpha-olefin monomers include, for example, propylene, 1-butene, 1-pentene, 1-hexene, 4-methyl-1-pentene, 1-octene, and 3,5,5-trimethyl-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, high density polyethylene, medium density polyethylene (including ethylene-butene copolymers and ethylene-hexene copolymers) homo-polyethylene, polypropylene, ethylene/propylene rubbers (EPR's), ethylene/propylene/diene terpolymers (EPDM's), polybutadiene, polyisoprene and the like.

Reduced chromium oxide-on-silica catalysts represent one pathway to improved catalyst systems for polyethylenes having characteristics of those typically formed using silylchromate-on-silica catalysts. It is desired that any such catalytic system perform well during high space-time yield operation (i.e., operation maximizing polymer produced per unit reactor time and reactor space), producing the greatest amount of polyethylene possible with high catalyst activity in a shorter residence time. Chromium oxide catalysts possess adequate productivity and activity, yet polyethylenes produced through their use are less than optimal for a number of applications where high molecular weight, broad molecular weight distribution, and the presence of some degree of bimodality of molecular weight distribution are desired.

Figure 1:
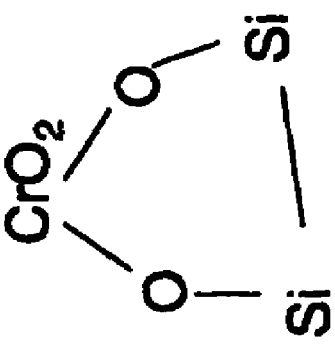
FIG. 1. Possible structure of chromium oxide-on-silica ("Phillips") catalyst.

The so-called Phillips catalyst, introduced in the early 1960s was the first chromium oxide-on-silica catalyst. The catalyst is formed by impregnating a $Cr^{+3}$ species into silica, followed by fluidization of the silica matrix at ca. 400° C.-860° C. Under these conditions, $Cr^{+3}$ is converted to $Cr^{+6}$. The Phillips catalyst is also commonly referred to in the prior art as "inorganic oxide-supported $Cr^{+6}$." While chromium oxide-on-silica catalysts exhibit good productivity, they produce poylethylenes having relatively narrow molecular weight distribution. The so-called Phillips catalyst and related catalysts are herein referred to as "CrOx" catalysts. FIG. 1 gives a schematic representation of the structure of CrOx catalysts. Silylchromate-on-silica catalysts are one type of inorganic oxide-supported $Cr^{+6}$ catalyst that produces polyethylenes not having the aforementioned deficiencies. Silylchromate-on-silica catalysts are referred to herein as "SC" catalysts. FIG. 2 gives a schematic representation of the structure of SC-type catalysts. SC-type catalysts are typically reduced with aluminum alkyls, such as DEALE, during a catalyst preparation step prior to addition to the reactor. It is and has been a goal to preserve or improve productivity of CrOx catalysts, while producing a polyethylene with molecular weight and molecular weight distributions more closely approaching those produced with SC catalysts.

Variations on catalysts employing $Cr^{+6}$ species supported on silica have been known. One particular variation uses titanium tetraisopropoxide (TTIP) impregnated onto silica along with the $Cr^{+3}$ species before activation. This variation is hereinafter referred to as "Ti—CrOx" (titanated chromium oxide). Such modifications result in polyethylenes with slightly greater molecular weight distributions compared to those made without titanation. While this system produces polyethylenes tending towards those produced using silylchromate-on-silica type catalysts, further improvements in molecular weight and molecular weight distribution more closely approaching those obtained with silylchromate-on-silica are desired.

EXAMPLES

Examples 1 through 53 were conducted as slurry polymerization reactions. Examples 54 through 74 were conducted in a gas phase fluid bed reactor.

General Catalyst Preparations

Unless otherwise noted the catalysts used in the following examples were all made by the following procedures.

General Preparation A. Chromium oxide catalyst activation: Catalysts was received from the suppliers with the chromium already impregnated on the supports. The catalyst physical properties are described in Table 2. Activation is conducted by passing gas through the catalyst for four hours at the specified temperature in dry air. This is usually conducted in a tube furnace. The catalyst is then stored under nitrogen until used.

General Preparation B. Chromium oxide catalyst reductions: In a typical preparation 3 grams of previously activated catalyst is placed in a 50 mL airless ware flask with a stir bar under inert atmosphere. Thirty-five mL of dry degassed hexane is added and the mixture is heated to 50° C. The reducing agent is then added via syringe (all reagents are 20-25 wt % in hexane). The stated equivalents are always the ratio of reagent to chromium. After 30 minutes, drying is commenced. This can be done under high vacuum or with a nitrogen purge. Catalyst is stored under nitrogen until used.

General Preparation C. SC-type Catalyst Preparations All silicas are dehydrated prior to use. Silica dehydration is conducted by passing gas through the catalyst for four hours at the specified temperature in dry air or nitrogen. In a typical preparation 3 grams of previously dehydrated silica is placed in a 50 mL airless ware flask with a stir bar under inert atmosphere. Thirty-five mL of dry degassed hexane is added and the mixture is heated to 50 C. The organochrome source (triphenyl silylchromate (TPSC)) can be added prior to, at the same time as, or after addition of the diluent. The mixture is typically stirred for 2 hours (where stated, stirring can continue for 10 hours). The reducing agent is then added via syringe (all reagents are 20-25 wt % in hexane). The stated equivalents are always the ratio of reagent to chromium. After 30 minutes, drying is commenced. This can be done under high vacuum or with a nitrogen purge. Catalyst is stored under nitrogen until used. In cases where no reducing agent is added, drying commences after the chrome source and silica have been mixed as above.

Catalyst Descriptions

When used, the ratio of reducing agent to chromium added can be found in the example; "in reactor" means the reagent was added separately from the catalyst. "In catalyst" means the reagent is added in a catalyst preparation step. Recited wt % values for chromium are approximate; actual values can range±50%. This applies for both chromium oxide and silylchromate catalysts.

Example 1

The catalyst was used as supplied by Davison Chemical and consists of 0.5 wt % chromium on Davison 955 silica and was activated at 825C (General preparation A). See silica specifications in Table 2.

Examples 2-6

The catalyst is the same as that used in Example 1 except that reducing agents are added in a catalyst preparation step as in General preparation B. When a mixture of reducing agents are used the mole ratios of each is 1:1.

Example 7

The catalyst consists of 0.5 wt % Cr on Davison 955 silica (200° C. dehydration) treated with titanium tetraisopropoxide prior to activation. Enough TTIP is added so after activation 3.8 wt % Ti remains (see U.S. Pat. No. 4,011,382 for specific procedures for TTIP addition).

Examples 8-9

The catalyst is the same as that used in Example 7 except that a reducing agent is added in a catalyst preparation step as in General preparation B.

Examples 10-12

MS35100 is a chromium oxide catalyst obtained from PQ with the specifications listed in Table 2. The catalyst contains 0.5 wt % Cr. The catalyst is activated at 700° C. (General preparation A). When used, reducing agent is added in a catalyst preparation step as in General preparation B.

Examples 13-15

The catalyst is the same as that used in Example 1 with the addition of DEALE as a reducing agent using General preparation B.

Examples 16-18

EP352 is a chromium oxide catalyst obtained from Ineos with the specifications listed in Table 2. The catalyst contains 0.5 wt % Cr. The catalyst is activated at 700° C. (General preparation A). When used, reducing agent is added in a catalyst preparation step as in General preparation B.

Examples 19-21

Triphenysilylchromate is added to MS3050 support (which has been previously dehydrated at 700° C.) as in General preparation C. Enough triphenyl silylchromate is added so the final dried composition contains 0.5 wt % Cr. When used, reducing agent is added in a catalyst preparation step as in General preparation C.

Examples 22-25 and 27

Triphenysilylchromate is added to Davison 955 support (which has been previously dehydrated at 600° C.) as in General preparation C. Enough triphenyl silylchromate is added so the final dried composition contains 0.24-0.25 wt % Cr. When used, DEALE reducing agent is added in a catalyst preparation step as in General preparation C.

Example 26

Triphenysilylchromate is added to Davison 955 support (which has been previously dehydrated at 600° C.) as in General preparation C. Enough triphenyl silylchromate is added so the final dried composition contains 0.25 wt % Cr.

Tri-isobutylaluminum reducing agent is added in a catalyst preparation step as in General preparation C.

Examples 28-34

This catalyst was produced on a commercial scale. Triphenysilylchromate is added to Davison 955 support (which has been previously dehydrated at 600° C.) as in General preparation C. Enough triphenyl silylchromate is added so the final dried composition contains 0.24 wt % Cr. The TPSC is allowed to mix with the silica for 10 hours before the addition of DEALE. A 5:1 ratio of DEALE/Cr was used.

Examples 35-38

The same catalyst as that used in Example 28 was used here except that the ration of DEALE/Cr was 1.5.

Examples 39-45, 50-53

The same catalyst as that used in example 7 was used here. Co-catalysts listed under addition were added separately to the reactor.

Examples 46-49 and 74

The same catalyst as that used in example 1 was used here. Co-catalyst listed under addition is added separately to the reactor.

Examples 54, 55, 60-68 and 72

This catalyst was produced on a commercial scale (with the exception of 55, which was prepared on lab pilot plant scale).
Triphenysilylchromate is added to Davison 955 support (which has been previously dehydrated at 600° C.) as in General preparation C. Enough triphenyl silylchromate is added so the final dried composition contains 0.24 wt % Cr. The TPSC is allowed to mix with the silica for 10 hours before the addition of DEALE. A 5:1 ratio of DEALE/Cr was used. Co-catalysts listed as added to the reactor were added separately to the reactor.

Examples 69, 70, 71,74

This catalyst was produced on a commercial scale. Bis-triphenysilylchromate is added to Davison 955 support (which has been previously dehydrated at 600° C.) as in General preparation C. Enough triphenyl silylchromate is added so the final dried composition contains 0.25 wt % Cr. The TPSC is allowed to mix with the silica for 10 hours before the addition of DEALE. A 1.5:1 ratio of DEALE/Cr was used. Co-catalysts listed as added to the reactor were added separately to the reactor.

Example 56

This catalyst is the same as that used in Example 19 but was prepared on a pilot plant scale. A 5:1 ratio of DEALE/Cr was used.

Examples 57 and 58

The catalyst is the same as that used in Example 13 employing DEALE as the reducing agent at a 5:1 DEALE/Cr ratio and was prepared on a pilot plant scale.

Example 59

The catalyst is the same as that used in Example 10 employing DEALE as the reducing agent at a 5:1 DEALE/Cr ratio and was prepared on a pilot plant scale.

Although the specific examples describe specific loadings of silylchromate onto silica supports, it should be understood that loadings of about 0.2-1.0 weight % of chromium are useful and part of the instant invention.

Lab Slurry Procedure

A one liter stirred reactor was used for the polymerization reactions. The reactor was thoroughly dried under a purge of nitrogen at elevated temperatures before each run. 500 mL of dry degassed hexane was fed to the reactor at 60° C. If used, hexene is added at this point. Unless otherwise noted 10 mL of 1-hexene is used in each experiment. A small quantity (0.1-0.25 g) of Davison 955 silica dehydrated at 600° C. and treated with 0.6 mmole/g of TEAL is then added to the reactor to passivate any impurities. No TEAL treated silica was added in any run where a reagent was added to the reactor separately from the catalyst. After stirring for 15 minutes the catalyst is charged followed by additional reagents. Co-catalysts are added directly to the reactor as diluted solutions as mention elsewhere. The reactor is sealed and hydrogen is charged at this point. Hydrogen is only used where noted in the tables. The reactor is charged to 200 psi with ethylene. Ethylene is allowed to flow to maintain the reactor pressure at 200 psi. Ethylene uptake is measure with an electronic flow meter. All copolymerizations were run at 85° C.; homopolymerizations were run at 90° C. Polymerizations were run until a maximum of 160 grams PE were made or terminated sooner. The reactor was opened after depressurization and the temperature lowered. The polymer weight was determined after allowing the diluent to evaporate. The polymer was then characterized employing a number of tests.

Tests

Density: ASTM D-1505.

Melt Index: ($I_2$) ASTM D-2338 Condition E measured at 190° C. reported as grams per 10 minutes.

Flow Index: ($I_{21}$) ASTM D-1238 Condition F measured 10 times the weight as used in Melt Index above.

MFR: Melt Flow ratio is the Flow index/Melt index.

SEC: Polymer Laboratories instrument; Model: HT-GPC-220, Columns: Shodex, Run Temp: 140° C., Calibration Standard: traceable to NIST, Solvent: 1,2,4-Trichlorobenzene.

BBF: Butyl branching frequency as measured by $^{13}$C-NMR. The value is the number of butyl branches per 1000 carbon atoms.

The inventors have found that systems employing reduced chromium oxide catalysts on silica exhibit the desired productivity while producing polyethylenes having molecular weight and molecular weight distribution similar to those obtained with silylchromate-on-silica. The addition of alkyl aluminum compounds such as triethylaluminum (TEAL), either 1) directly to the catalyst prior to introduction into the reaction or 2) added directly to the reactor (in-situ) increases the molecular weight and molecular weight distribution of the resulting polyethylenes. In general, the alkyl groups of the trialkylaluminum can be the same or different, and should have from about 1 to about 12 carbon atoms and preferably 2 to 4 carbon atoms. Examples include, but are not limited to, triethylaluminum, tri-isopropylaluminum, tri-isobutyl aluminum, tri-n-hexyl aluminum, methyl diethylaluminum, and trimethylaluminum. Although the examples almost exclusively use TEAL, it should be understood that the invention is not so limited. However, TEAL results in some uncontrolled side branching in the polymer. It would be beneficial to eliminate this side branching in applications where it is not desired, yet preserve it for applications where it is desired. This can be achieved by the addition of alkyl aluminum alkoxide compounds such as diethyl aluminum ethoxide. Use of an alkyl aluminum alkoxide such as diethylaluminum ethoxide (DEALE) eliminates the side branching. In general, the alkyl aluminum alkoxide, having the general formula $R_2$—Al—OR where the alkyl groups may be the same or different, should have from about 1 to about 12 carbon atoms and preferably 2 to 4 carbon atoms. Examples include but are not limited to, diethyl aluminum ethoxide, diethyl aluminum methoxide, dimethyl aluminum ethoxide, di-isopropyl aluminum ethoxide, diethyl aluminum propoxide, di-isobutyl aluminum ethoxide, and methyl ethyl aluminum ethoxide. Although the examples almost exclusively use DEALE, it should be understood that the invention is not so limited. The data of Table 1 illustrates the reaction conditions and the characteristics of the resulting polymer when TEAL and DEALE are used with CrOx catalysts (chromium oxide-on-silica). The numerical prefixes listed before the aluminum alkyl in each case represents the mole ratio of aluminum to chromium. In Table 1, CrOx catalyst is produced by impregnating chromium oxide on Grace 955 silica, followed by air fluidization and heating to about 825° C. Ti—CrOx catalyst is produced in a similar fashion with the exception that titanium tetraisopropoxide is also added to the silica prior to fluidization and activation. The reducing agents are added as an additional catalyst preparation step.

reducing agents are used to make catalyst and the catalyst run in a homopolymerization reaction it can be seen in Example 6 that side chains are not detected. This shows that DEALE is suppressing formation of side chain branches in the absence of comonomer. Both in the presence and absence of hexene, the addition of DEALE significantly decreases and sometimes eliminates side chain branching in the resulting ethylene polymer.

Making comparisons using productivity (g polyethylene/g catalyst) or activity (g polyethylene/g catalyst-hour), the presence of hexene becomes beneficial, improving productivity and activity. The trends in molecular weight of the produced polymers can be gleaned from a review of the Flow Index (FI) results. Comparing FI values for polymer produced with CrOx catalyst in the absence of TEAL to those produced in the presence of TEAL reveals an increase in molecular weight as indicated by the decrease in flow index. Thus, judicious application of TEAL and DEALE during catalyst preparation affords the ability to modify molecular weight and molecular weight distribution and simultaneously control side chain branching in these chromium oxide-based catalysts. This technology will be useful in making higher density polymers.

In summary, addition of DEALE decreases branching and increases molecular weight for CrOx produced polymers. Addition of TEAL increases molecular weight of the produced polymer and increases the generation of side chain branches when comonomer is not present.

TABLE 1

Effect of TEAL and DEALE on chromium catalyst performance.

| Example No. | Catalyst treatment | 1-Hexene | Time (min) | YIELD (g) | Flow Index | Act.gPE/g cat-1 hr | Bulk Density (g/cc) | BBF | Den. g/cc |
|---|---|---|---|---|---|---|---|---|---|
| | CrOx on 955 silica | | | | | | | | |
| 1 | none | 10 | 51 | 157 | 5.5 | 1,816 | 0.37 | 3.8 | 0.9415 |
| 2 | 5 eq. TEAL | 10 | 46 | 116 | 1.9 | 1,328 | 0.29 | 2.6 | 0.9434 |
| 3 | 5 eq. TEAL | 0 | 65 | 115 | 6.8 | 911 | 0.22 | 2.4/1.0 | 0.9438 |
| 4 | 5 eq. DEALE | 10 | 46 | 147 | 22.3 | 1,631 | 0.32 | 0.8 | 0.9573 |
| 5 | 5 eq. TEAL/DEALE | 10 | 54 | 146 | 7.5 | 1,680 | 0.30 | 1.2 | 0.9531 |
| 6 | 5 eq. TEAL/DEALE | 0 | 34 | 124 | 4.1 | 2,366 | 0.26 | non det | 0.9586 |
| | Ti—CrOx on 955 silica | | | | | | | | |
| 7 | none | 10 | 65 | 163 | 6.9 | 1,886 | 0.32 | 3.0 | 0.9433 |
| 8 | 5 eq. TEAL | 10 | 77 | 151 | 2.1 | 1,096 | 0.29 | 2.7 | 0.9455 |
| 9 | 5 eq. TEAL | 0 | 70 | 136 | 3.0 | 941 | 0.28 | 0.5/0.5 | 0.9531 |

CrOx Catalyst

Referring to the examples in Table 1, Example 1 reveals that under the polymerization conditions described, 3.8 butyl branches per 1000 carbon atoms are observed by NMR analysis. This shows the extent of comonomer incorporation into the polymer. Example 2 shows that when the catalyst is treated with TEAL the amount of hexene incorporated drops slightly under the same conditions; while polymer flow index is lowered. Example 3 demonstrates that significant branching is found when the catalyst is treated with TEAL even though no comonomer is present. In this case both butyl (2.4) and ethyl branches (1.0) are detected. When the catalyst is treated with DEALE lower polymer side chains are detected indicating lower comonomer incorporation has occurred (Example 4). When the catalyst reducing agent is a combination of TEAL and DEALE it can be seen that the comonomer incorporation rate is between that found with either reducing agent alone (Example 5). When this combination of catalyst Ti—CrOx Catalyst Ti—CrOx catalyst is the same as CrOx with the exception that titanium 5 tetraisopropoxide is co-impregnated with the chromium oxide onto the silica before activation (Examples 7-9 on Table 1). The same molecular weight trend seen for CrOx catalyst is observed for Ti—CrOx catalyst in the presence of TEAL compared with no reducing agent.

Effect of DEALE Addition

It has also been found that the productivity of chromium-based catalysts can be increased by adding an activator such as DEALE directly to the reactor or as part of the catalyst preparation step. Consistent with the discussion above, control of polymer molecular weight and molecular weight distribution is another feature of the invention.

Chromium oxide-based catalysts have high activity with moderate induction times. These catalysts produce polymers with intermediate molecular weight distribution. Addition of reagents such as DEALE to the polymerization reactor with these catalysts eliminates the induction period and increases activity (boosting productivity). The presence of DEALE also modifies the molecular weight distribution. Productivity is particularly poor in the case of silychromate-on-silica-type catalysts (SC) in the absence of reducing agents due to long induction times. It has been found that in-situ addition of DEALE effectively eliminates induction times in silychromate-on-silica-type catalyst systems.

Table 2 lists several exemplary commercial silica supports with their physical properties. The effect of the presence of DEALE and of the reduction method employed (direct addition to catalyst prior to polymerization versus direct addition (in-situ) to the reactor) was studied. These silica support are illustrative examples and not exhaustive of the types of silica which may be used in the present invention. Other silica supports commonly used in the filed and known to those of skill in the art are also useful herein. Table 2 provides approximate pore volume, surface area, average pore diameter, average pore size and percent titanium for the silica supports used in this study. The label is that used by the supplier to describe the support. The number without the parentheses is the name of the support supplied as silica alone. The number in parentheses is the name of the support when it is supplied with a chromium salt already impregnated on the support. Although these silcas were obtained from the suppliers any silica fitting the specifications below would be expected to function in a similar manner. The present invention is not limited to any specific commercial silica support but may be used with any silicas having a pore volume of about 1.1 to about1.8 cm$^3$/g and a surface area of about 245-375 m$^2$/g; or a pore volume of about 2.4 to about3.7 cm$^3$/g and a surface area of about 410-620 m$^2$/g; or a pore volume of about 0.9 to about1.4 cm$^3$/g and a surface area of about 390-590 m$^2$/g.

TABLE 2

Commercial Silica Supports and Physical Properties

| Silica Support | Pore Volume (cm$^3$/g) | Surface Area (m$^2$/g) | Average Pore Diameter (Å) | Average Pore Size (μm) | Ti (%) |
|---|---|---|---|---|---|
| Grace 955 (957) | 1.45 | 310 | 210 | 55 | — |
| PQ MS3050 (35100) | 3.02 | 513 | 198 | 90 | — |
| Ineos EP52 (352) | 1.15 | 490 | 90 | 70 | 2.60 |

Figure 3:
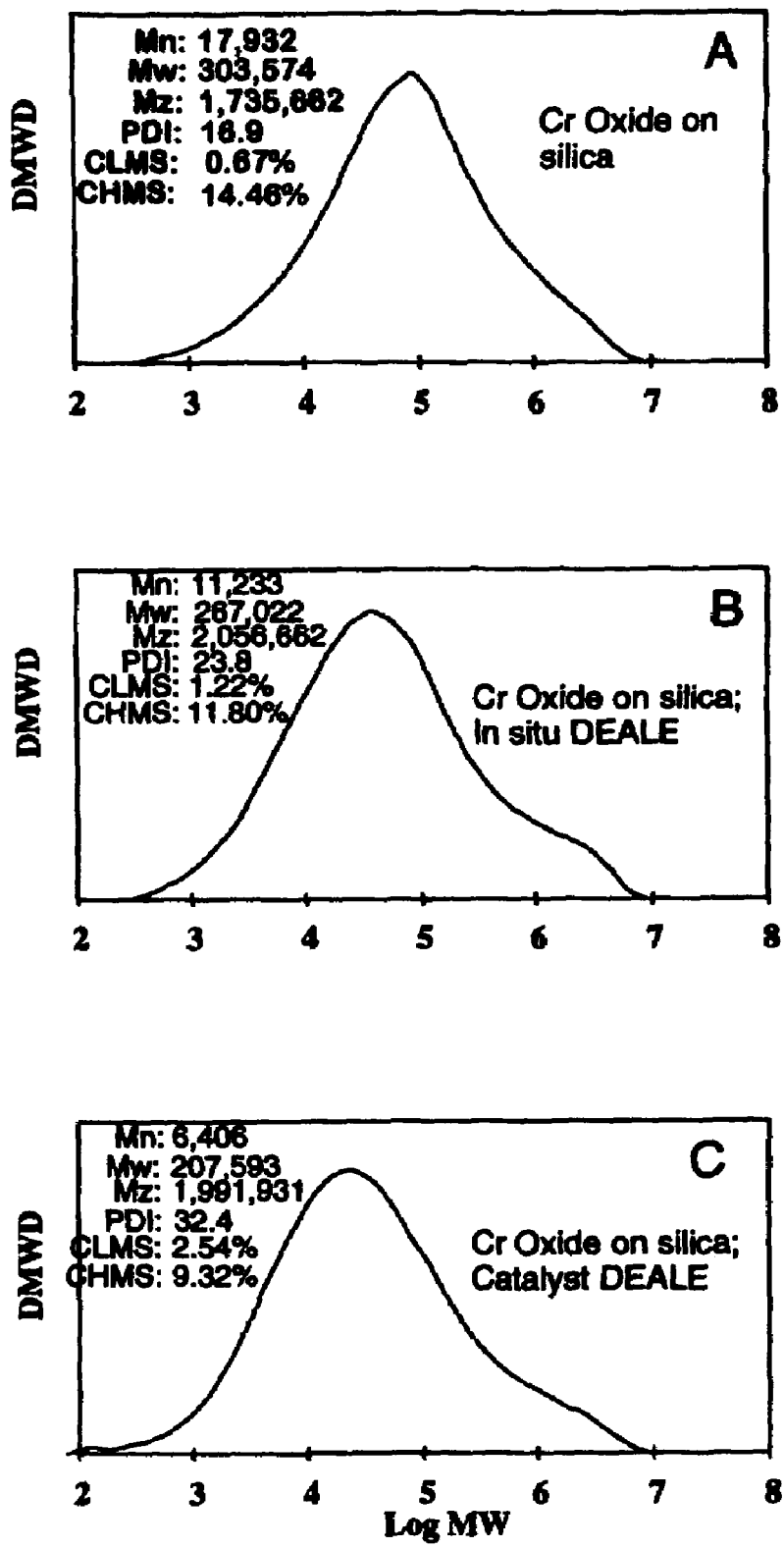
FIG. 3. Molecular weight plots of polyethylene produced with MS35100 chromium oxide catalyst; (a) no DEALE; (b) In-situ DEALE; (c) DEALE added to catalyst.

MS 35100 CrOx catalyst (chromium oxide-on-silica) was studied for performance 1) in the absence of DEALE, 2) when DEALE was added directly to the catalyst and 3) when it was added to the reactor in situ. Reactions were performed in 500 mL of hexane slurry with 10 mL of 1-hexene added; the reaction was run at 85° C. and 200 psi total pressure. FIG. 3 illustrates the molecular weight distribution of the resulting polymer in the absence and presence of DEALE. In the absence of DEALE (FIG. 3(a)), the resulting polymer has a molecular weight distribution of 16.9. When DEALE is added in-situ (FIG. 3(b)), a broadening of the molecular weight is observed, with a shoulder becoming apparent at a molecular weight distribution of 23.8. Similar but less pronounced results occur when DEALE is added to the catalyst before polymerization (FIG. 3(c)), the high molecular weight shoulder being slightly less prominent. When DEALE is added directly to the catalyst, a polymer molecular weight distribution of 32.4 is recovered. A similar trend is observed in the value of $M_Z/M_W$ as DEALE is added. $M_Z/M_W$ is indicative of the high molecular weight shoulder; as $M_Z/M_W$ increases, the desirable high molecular weight shoulder becomes more pronounced. $M_Z/M_W$ data are obtained from SEC analysis of the polymer. In the absence of DEALE (FIG. 3(a)), a value of $M_Z/M_W$ of 5.7 is recovered. When DEALE is added in-situ and to the catalyst (FIGS. 3(b) and 3(c)), one recovers $M_Z/M_W$ values of about 7.7 and 9.6, respectively.

Figure 4:
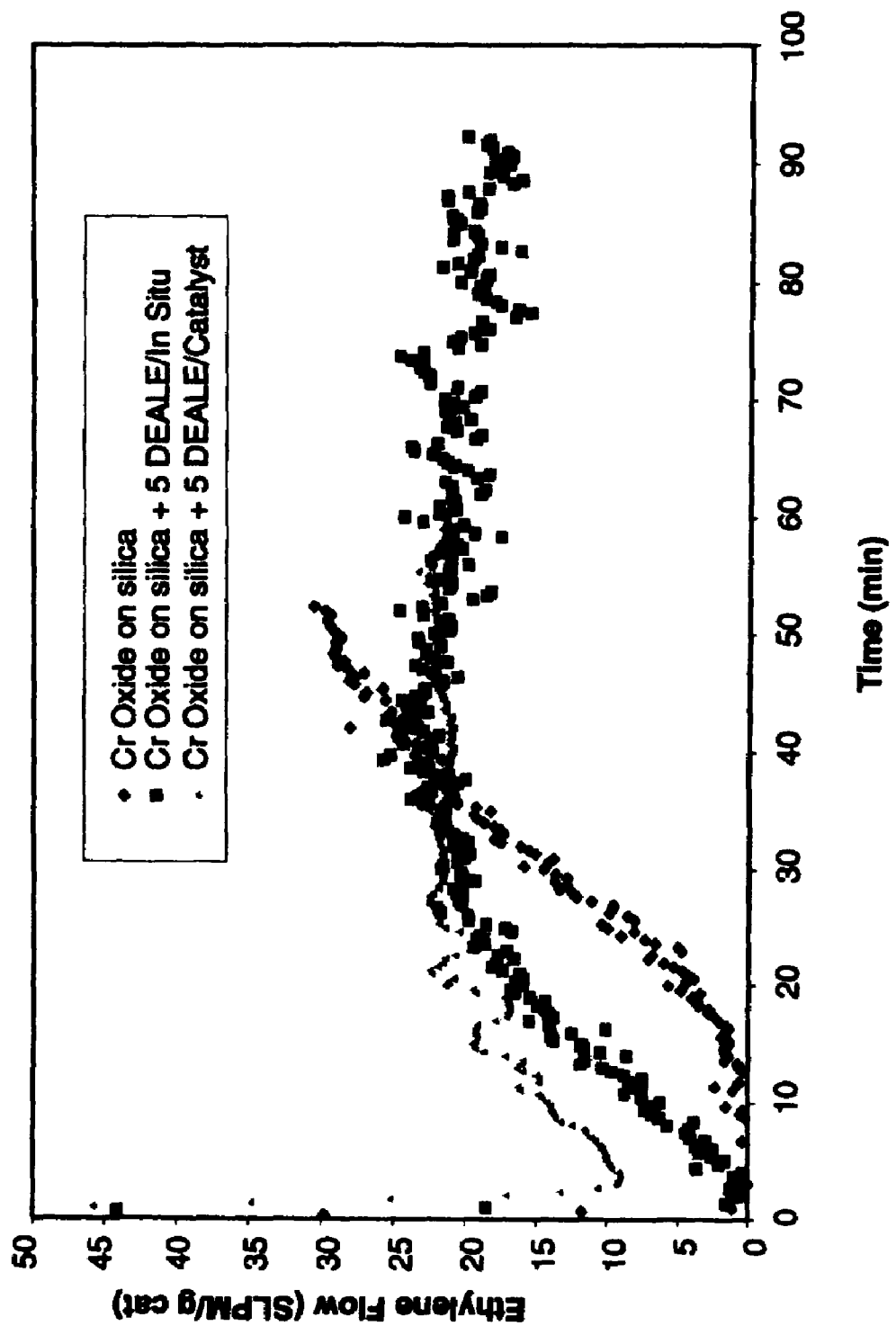
FIG. 4. Ethylene Flow versus Time for MS35100 chromium oxide catalyst.

Increases in polymer density and activity of catalyst are realized both in the direct addition to catalysts (in catalyst) and in the in-situ addition (in reactor) as evidenced in Table 3. Comonomer incorporation, as evidenced by the branching parameter (BBF) indicates a decrease in comonomer incorporation rate for both in-situ added DEALE and DEALE added to catalyst, in comparison with the absence of DEALE. There is a modest molecular weight decrease, as evidenced by an increase in flow index upon the use of DEALE. As demonstrated in FIG. 4, induction times are virtually eliminated when DEALE is added, either in-situ or directly to the catalyst prior to polymerization. The elimination of induction times for DEALE addition in-situ or to catalyst contrast with the long induction times observed for the same catalyst system in the absence of DEALE. In conclusion, in-situ addition of DEALE behaves comparably to DEALE added to the catalyst prior to polymerization for this CrOx catalyst.

TABLE 3

Effect of DEALE of MS35100 CrOx catalyst

| Example No. | DEALE | Time (min) | YIELD (g) | Flow Index | Act.gPE/gcat-1 hr | Bulk Density (g/cc) | Mn (× 10$^3$) | Mw (× 10$^3$) | Mz (× 10$^6$) | Mw/Mn | Mz/Mw | BBF | Den. g/cc |
|---|---|---|---|---|---|---|---|---|---|---|---|---|---|
| 10 | none | 52 | 123 | 2.8 | 974 | 0.31 | 17.9 | 304 | 1.74 | 16.9 | 5.7 | 5.1 | 0.9372 |
| 11 | 5 eq. in reactor | 93 | 160 | 6.9 | 1,272 | 0.30 | 11.2 | 267 | 2.06 | 23.8 | 7.7 | 1.6 | 0.9533 |
| 12 | 5 eq. in catalyst | 60 | 163 | 18.5 | 1,457 | 0.36 | 6.4 | 208 | 1.99 | 32.4 | 9.6 | 1.7 | 0.9562 |

Figure 5:
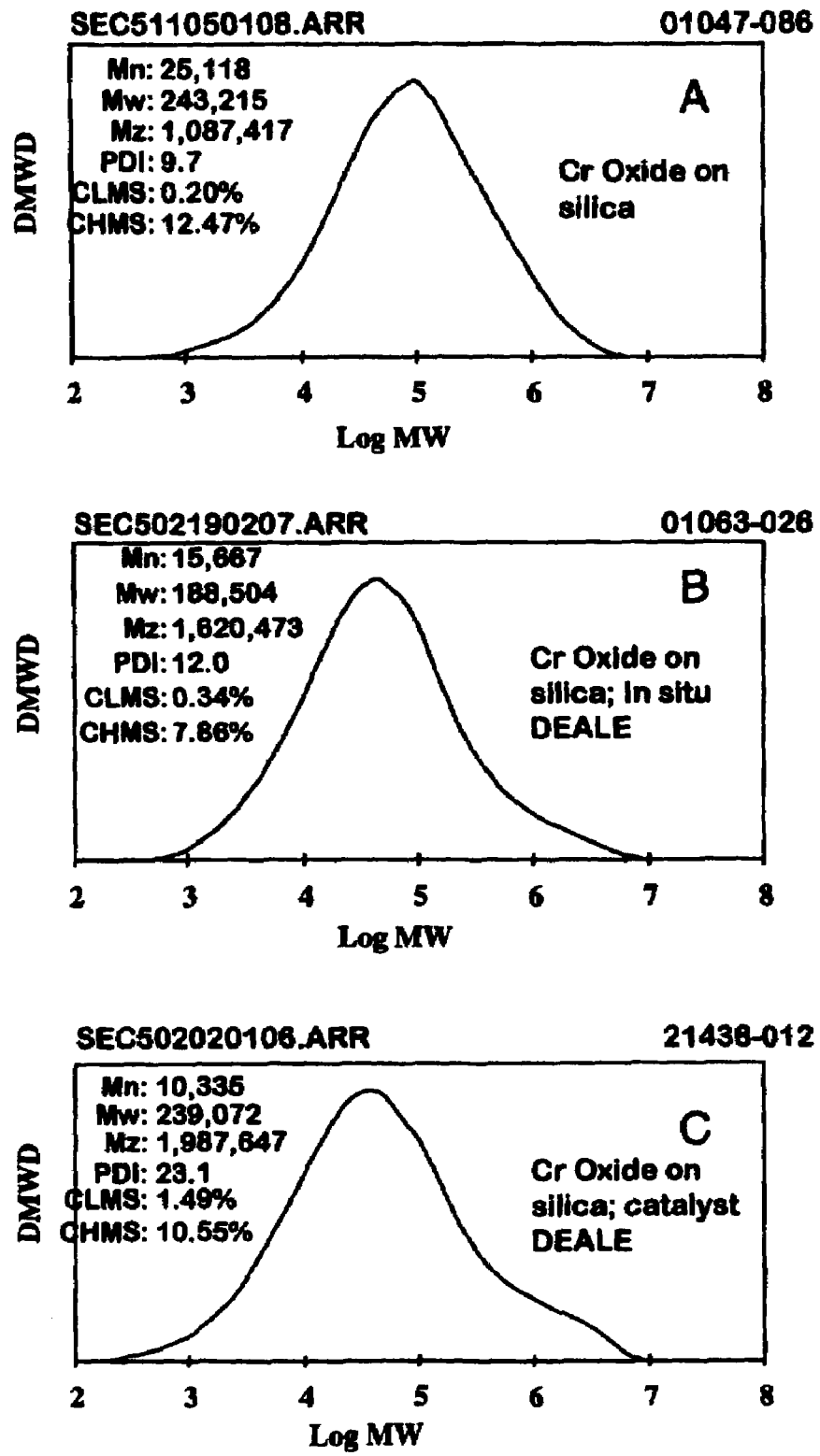
FIG. 5. Molecular weight plots of polyethylene produced with 957HS chromium oxide catalyst; (a) no DEALE; (b) In-situ DEALE; (c) DEALE added to catalyst.
Figure 6:
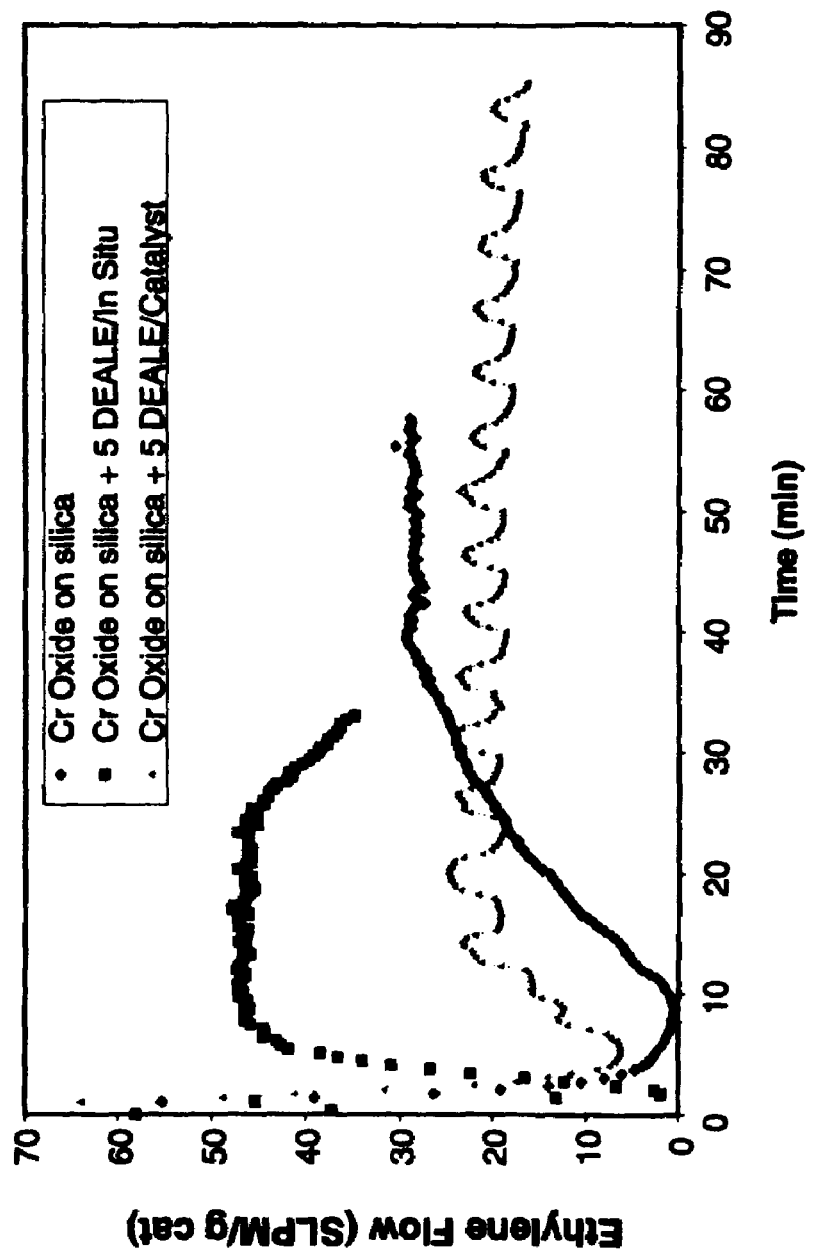
FIG. 6. Ethylene Flow versus Time for 957HS chromium oxide catalyst.

The same experiments were performed with 957HS chromium oxide catalysts. Reactions were performed in 500 mL of hexane slurry with 10 mL of 1-hexene added; the reaction was run at 85° C. and 200 psi total pressure. FIG. 5 illustrates the molecular weight distribution of the resulting polymer in the absence and presence of DEALE. In the absence of DEALE (FIG. 5(*a*)), the resulting polymer exhibits a molecular weight distribution of 9.7 and a molecular weight of well under 500,000. When DEALE is added in-situ (FIG. 5(*b*)), an increase of the polymer molecular weight distribution is observed to a value of about 12.0. $M_z/M_w$ values demonstrate that a high molecular weight shoulder appears upon the addition of DEALE, $M_z/M_w$ being about 4.5 in the absence of DEALE and about 8.6 and about 8.3, respectively for DEALE added in-situ and DEALE added to the catalyst. Increases in density and decreased side-chain branching are realized for both the direct addition to catalysts and for the in-situ addition (in reactor) as evidenced in Table 4. A moderate decrease in molecular weight is demonstrated by the increase in flow index. Similar to the effect observed for MS35100 CrOx catalyst, the addition of DEALE to 957HS CrOx catalyst, either through in-situ addition or direct addition to catalyst results in a virtual elimination of induction time, thereby improving activity of the catalyst (FIG. 6). In conclusion, addition of DEALE in-situ to this CrOx catalyst system results in higher activity, lower molecular weight, comparable molecular weight distribution, and with comparable comonomer incorporation as the case where DEALE is added directly to the catalyst prior to polymerization. Both the in-situ addition and the direct addition to polymer yields essentially zero induction time relative to the finite induction times observed in the absence of DEALE.

Figure 7:
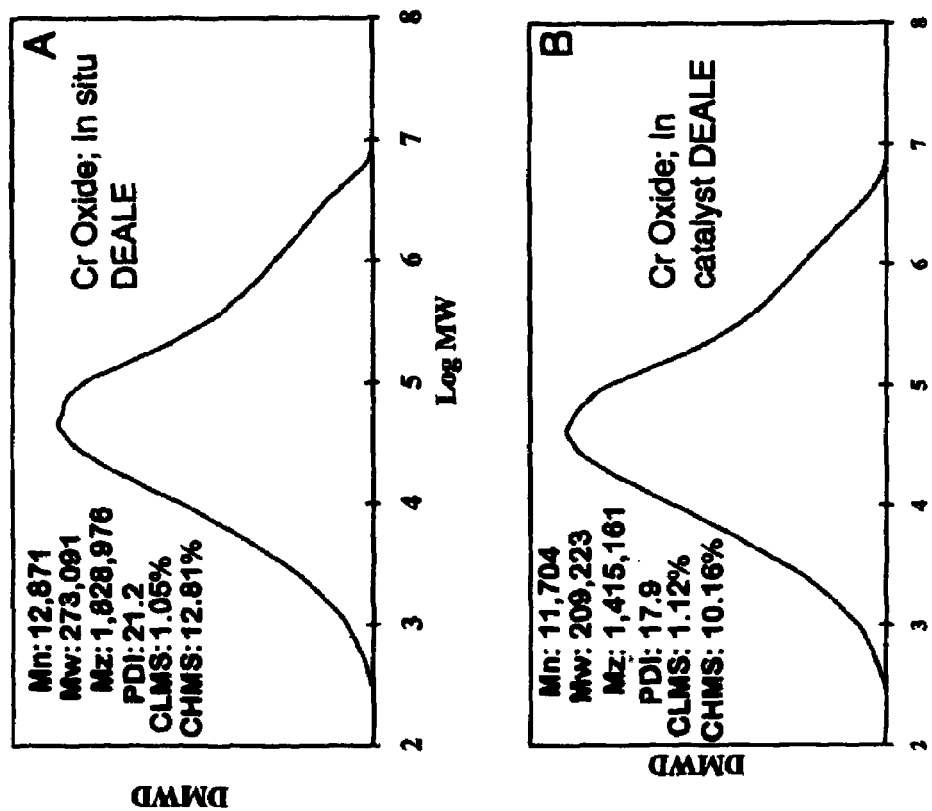
FIG. 7. Molecular weight plots of polyethylene produced with EP352 chromium oxide catalyst; (a) In-situ DEALE; (b) DEALE added to catalyst.
Figure 8:
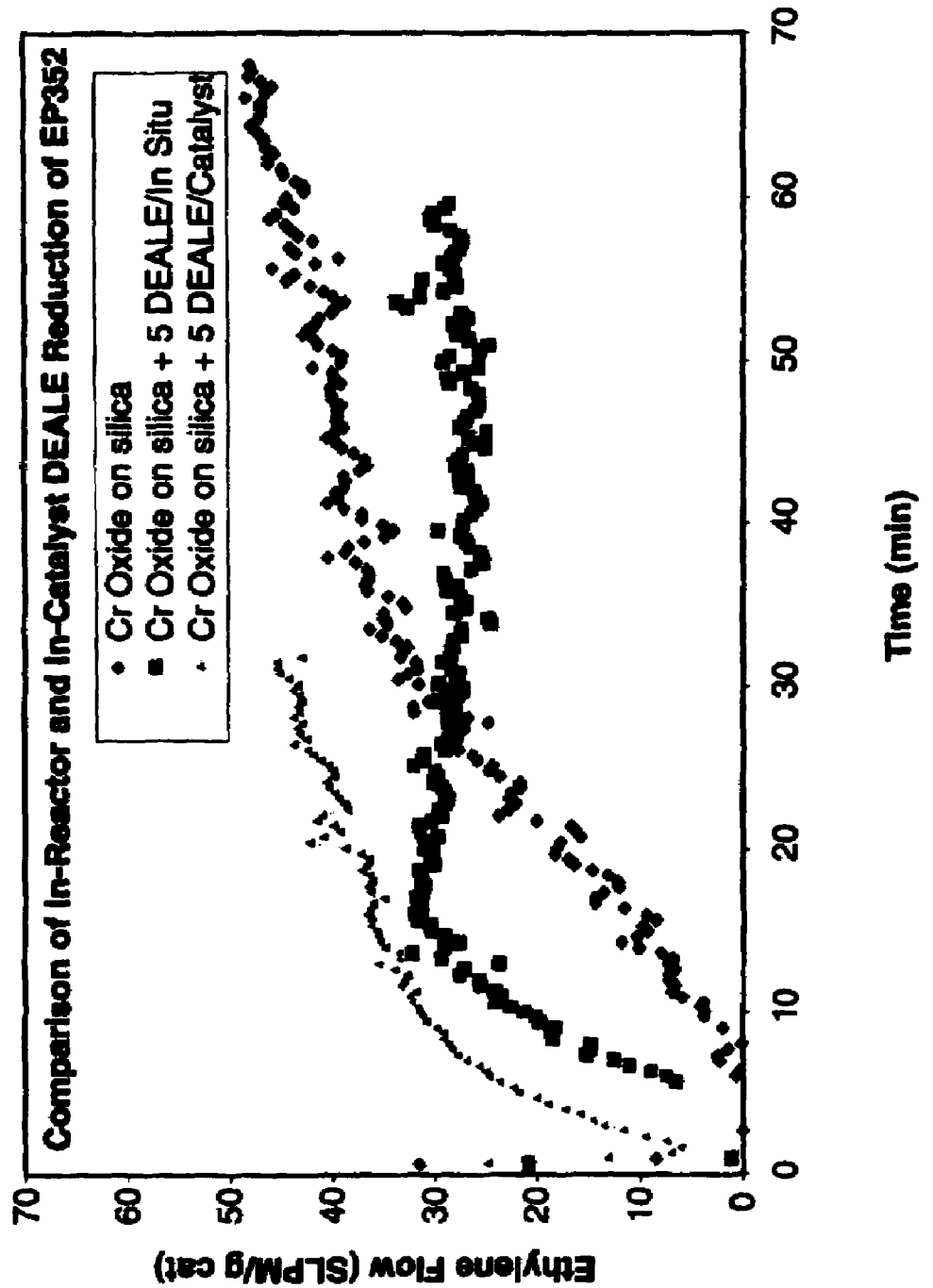
FIG. 8. Ethylene Flow versus Time for EP352 chromium oxide catalyst.

DEALE. When DEALE is added in-situ (FIG. 7(*a*)), a broader molecular weight distribution is observed in comparison to DEALE added directly to the catalyst (FIG. 7(*b*)) with the presence of a high molecular weight shoulder in both cases, similar to that observed for EP352 CrOx catalyst with no DEALE. Increases in polymer density and lower side-chain branching are realized both in the direct addition to catalysts (in catalyst) and in the in-situ addition (in reactor) as evidenced in Table 5. However, addition of DEALE in-situ to EP352 CrOx catalyst results in little change in activity relative to the that observed in the absence of DEALE. This is in stark contrast to the addition of DEALE directly to the catalyst prior to polymerization, where a substantial improvement in catalyst activity is observed. FIG. 8 demonstrates the improvement in induction time in the presence of DEALE; the improvement being realized both when the DEALE is added in-situ and when it is added to the catalyst. In conclusion, addition of DEALE in-situ to this CrOx catalyst system results in higher activity, broader molecular weight distribution and comparable comonomer incorporation to that observed when DEALE is added directly to the catalyst prior to polymerization. Induction time is improved with either method of DEALE addition in comparison to the absence of DEALE.

TABLE 4

Effect of DEALE on 957HS CrOx Catalyst

| EX. NO. | DEALE | Time (min) | YIELD (g) | Flow Index | Act.gPE/ gcat-1 hr | Bulk Density (g/cc) | Mn (× $10^3$) | Mw (× $10^3$) | Mz (× $10^6$) | Mw/Mn | Mz/Mw | BBF | Den. g/cc |
|---|---|---|---|---|---|---|---|---|---|---|---|---|---|
| 13 | none | 58 | 153 | 2.6 | 1,429 | 0.34 | 25.1 | 243 | 1.09 | 9.68 | 4.47 | 3.7 | 0.9392 |
| 14 | 5 eq. in reactor | 33 | 172 | 15.1 | 2,978 | 0.31 | 15.7 | 189 | 1.62 | 12.03 | 8.60 | 1.1 | 0.9553 |
| 15 | 5 eq. on catalyst | 85 | 159 | 7.5 | 1,387 | 0.34 | 10.3 | 239 | 1.99 | 23.13 | 8.32 | 0.6 | 0.9574 |

EP352 CrOx catalyst was also studied for performance 1) in the absence of DEALE, 2) when DEALE was added directly to the catalyst and 3) when it was added to the reactor in situ. Reactions were performed in 500 mL of hexane slurry with 10 mL of 1-hexene added; the reaction was run at 85° C. and 200 psi total pressure. FIG. 7 illustrates the molecular weight distribution of the resulting polymer in the presence of

TABLE 5

Effect of DEALE on EP352 CrOx Catalyst

| Ex. No. | DEALE | Time (min) | YIELD (g) | Flow Index | Act.gPE/ gcat-1 hr | Bulk Density (g/cc) | Mn × $10^3$ | Mw × $10^3$ | Mz × $10^6$ | Mw/Mn | Mz/Mw | BBF | Den. g/cc |
|---|---|---|---|---|---|---|---|---|---|---|---|---|---|
| 16 | none | 67 | 160 | 4.7 | 2,014 | 0.33 | 13.3 | 263 | 1.48 | 19.84 | 5.63 | 2.7 | 0.9425 |
| 17 | 5 eq. in reactor | 60 | 155 | 4.1 | 1,824 | 0.26 | 12.9 | 273 | 1.83 | 21.22 | 6.70 | 1.4 | 0.9529 |
| 18 | 5 eq. in catalyst | 32 | 160 | 3.2 | 2,329 | 0.27 | 11.7 | 209 | 1.42 | 17.88 | 6.76 | 1.0 | 0.9548 |

Figure 9:
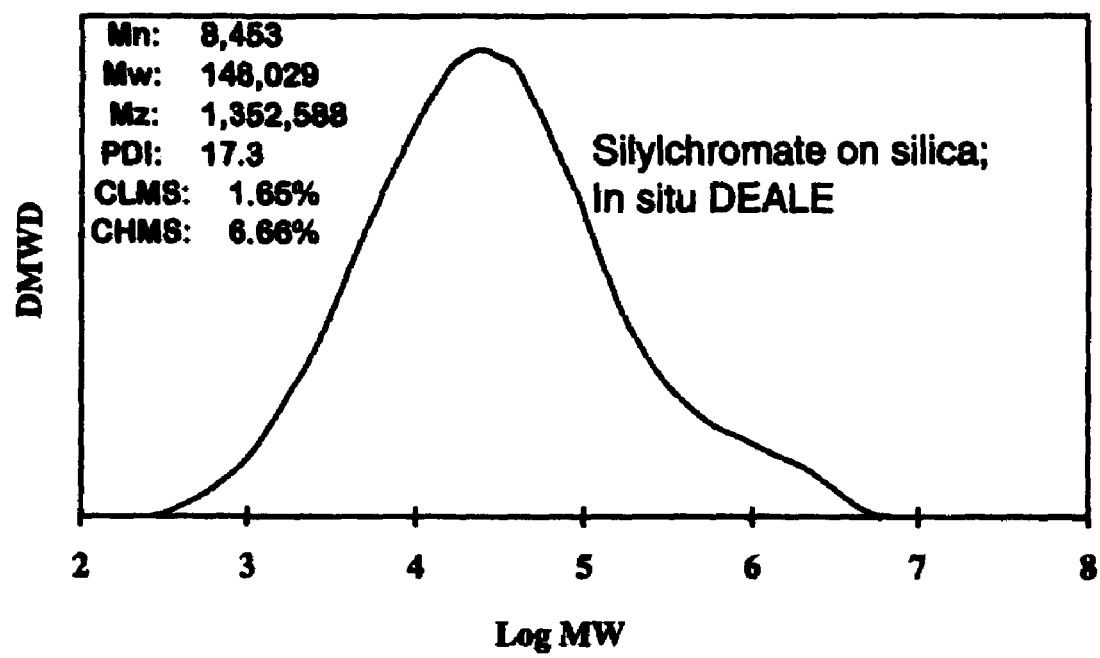
FIG. 9. Molecular weight plots of polyethylene produced with silylchromate on MS3050 with DEALE added in-situ.
Figure 10:
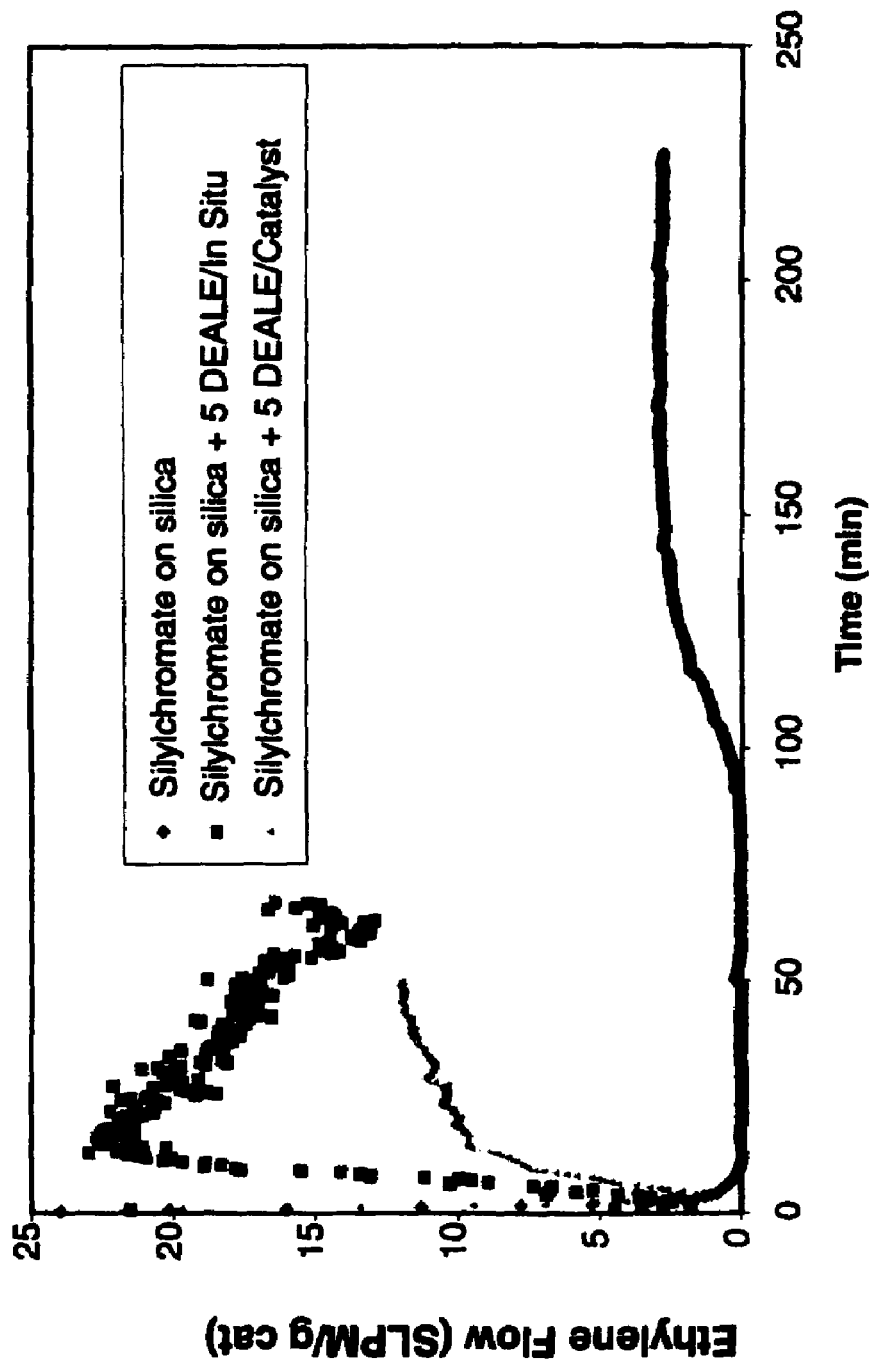
FIG. 10. Ethylene Flow versus Time for silylchromate on MS3050 silica.

Similar data for SC catalyst on MS3050 is illustrated in FIGS. 9 and 10 and Table 6. As can be seen from FIG. 10, addition of DEALE effects a stark improvement in induction time; virtually eliminating induction time for SC catalyst.

This is also seen in the significant improvement is activity as shown in Table 6. Long induction times are the major weakness of silylchromate-on-silica catalysts, in-situ addition of DEALE or other alkyl aluminum compounds significantly increases activity through elimination of induction time. The molecular weight of the produced polymer is lowered as evidenced by a significant increase in flow index. While the molecular weight of the resulting polymer is decreased, this has enhanced applicability in a two-catalyst system, with the use of an additional catalyst to produce high molecular weight polymer.

pounds. Thus, the positive molecular weight attributes of silylchromate-produced polymers are preserved with the use of DEALE or TIBA with a concomitant increase in activity. Use of TEAL and DEALE with CrOx catalysts results in polymers more similar to those produced with SC catalysts, while preserving the desirable activities inherent in CrOx polymers. Continuously varying the TEAL and DEALE in both CrOx and SC catalyst systems allows a mechanism to tailor the characteristics of the polyethylene so produced while preserving good activities. In this way, the space time

TABLE 6

Effect of DEALE on SC Catalyst on MS3050.

| Example No. | DEALE | Time (min) | YIELD (g) | Flow Index | Act.gPE/ gcat-1 hr | Bulk Density (g/cc) | BBF | Den. g/cc |
|---|---|---|---|---|---|---|---|---|
| 19 | none | 227 | 152 | 3.8 | 111 | 0.44 | 1.7 | 0.9545 |
| 20 | 5 eq. in reactor | 67 | 158 | 49.1 | 1,157 | 0.31 | 1.5 | 0.9603 |
| 21 | 5 eq. in catalyst | 50 | 154 | 112.5 | 724 | 0.42 | 1.4 | 0.9592 |

Figure 11:
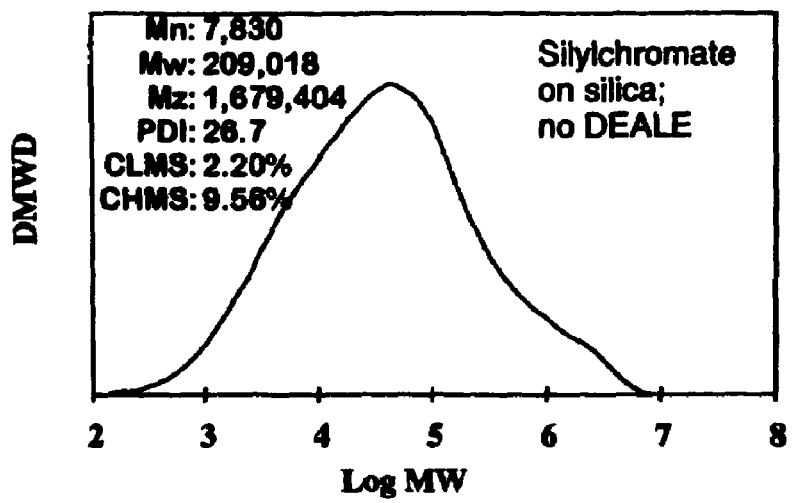
FIG. 11. Molecular weight plots of polyethylene produced with silylchromate on 955 silica; (a) no DEALE; (b) 5 eq DEALE/eq Cr; in-catalyst; (c) 10 eq DEALE/eq Cr; in-catalyst.
Figure 11:
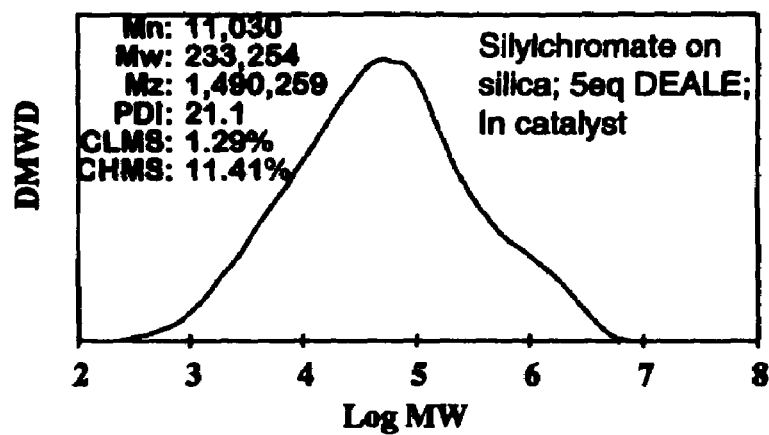
Figure 11:
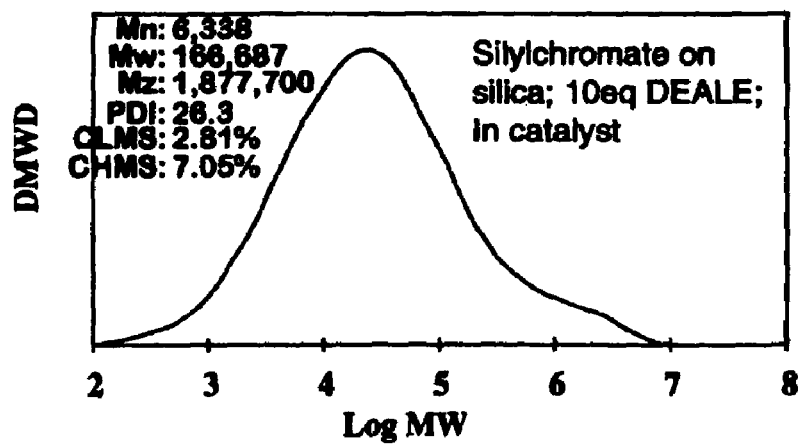
Figure 12:
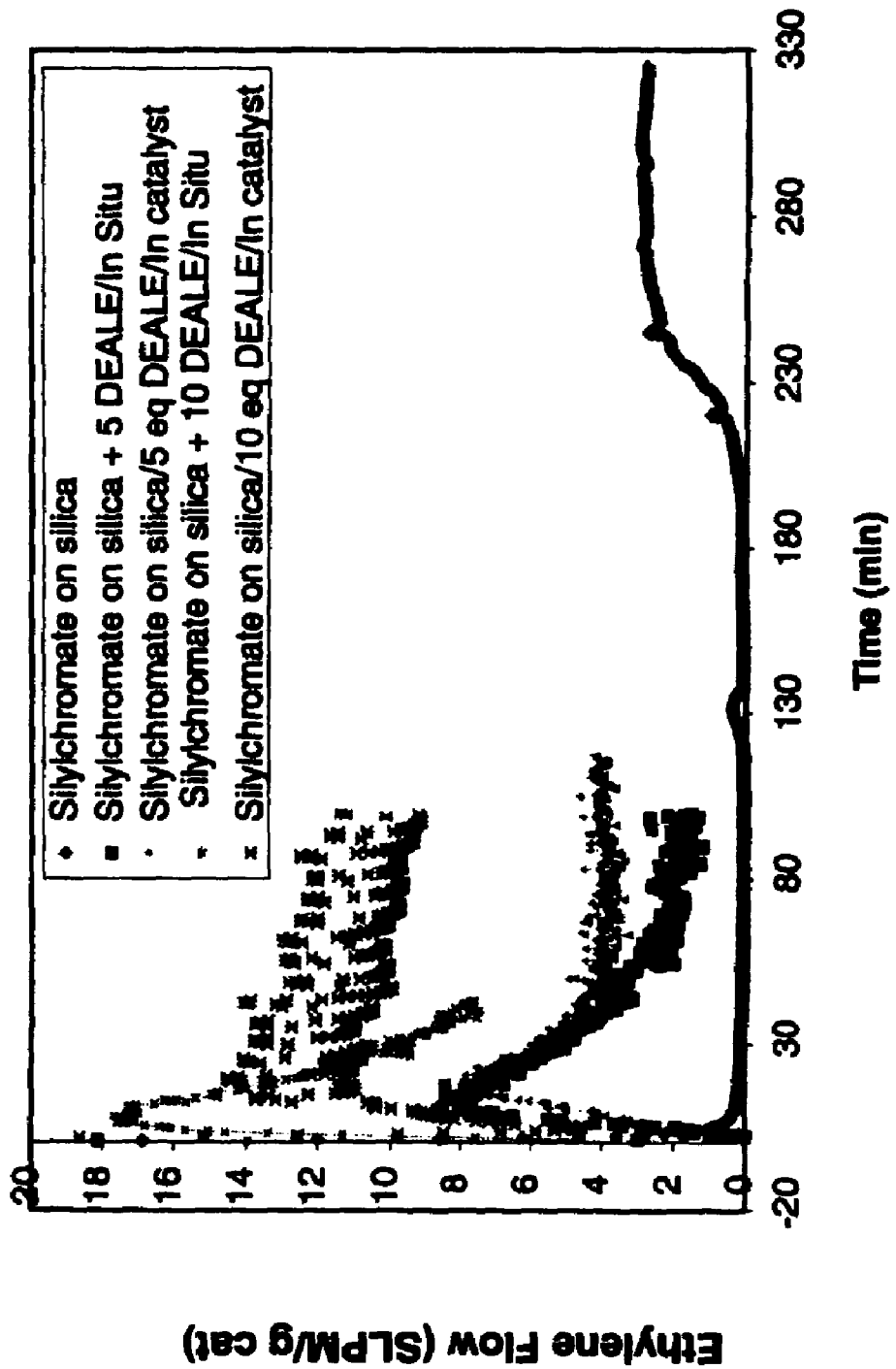
FIG. 12. Ethylene Flow versus Time for silylchromate on 955 silica.

SC catalyst on Grace 955 silica was also studied. Again, a marked improvement in induction time is observed when DEALE is added. This is important, as long induction time is a major disadvantage when using silylchromate-on-silica type catalysts. As shown in FIG. 11, the molecular weight and molecular weight distribution behavior is not significantly altered by the in-catalyst addition of DEALE to this SC catalyst. From the data in Table 7, one can see that this is not the case when DEALE is added in-situ. In all cases, the addition of DEALE virtually eliminates induction time (FIG. 12). In-situ addition significantly increases activity and lowers polymer molecular weight. Use of TIBA with SC-type catalysts provides a catalyst system that has high productivity and makes polymer with higher molecular weight than that found when DEALE is used as the reducing agent. This is especially important to maintain polymer molecular weight at shorter residence times. Other alkylaluminum compounds, such as triethylaluminum and tri-n-hexylaluminum, would be expected to work in a similar manner.

yield (weight of polymer per unit of reactor volume per unit of time) can be optimized for a number of different polyethylene grades.

Effect of Co-Catalyst on Performance

The effect of co-catalyst on the performance of SC catalyst (treated with 5 equivalents of DEALE/Cr) was studied using the following co-catalysts: TEAL, TIBA (tri-isobutyl aluminum), and TNHAL (tri-n-hexyl aluminum). Although examples are limited to specific co-catalysts, it should be understood that other alkyl aluminum compounds are applicable and are a part of the invention herein. Table 8 and FIG. 13-21 provides flow index, activity, density, induction time, and various molecular weight-related data for polymers produced when the co-catalyst is varied. The base catalyst system studied in the data of Table 8 and FIG. 13-21 is SC catalyst with 5 equivalents of DEALE per equivalent of Cr (designated herein as SC-500). The trend in flow index in Table 8

TABLE 7

Effect of DEALE on SC Catalyst on 955 Silica.

| Example No. | DEALE | Time (min) | YIELD (g) | Flow Index | Act.gPE/ gcat-1 hr | Bulk Density (g/cc) | Mn (× 10$^3$) | Mw (× 10$^3$) | Mz (× 10$^6$) | Mw/Mn | Mz/Mw | Den. g/cc |
|---|---|---|---|---|---|---|---|---|---|---|---|---|
| 22 | none | 162 | 127 | 11.4 | 129 | 0.33 | 7.8 | 209 | 1.68 | 26.7 | 8.0 | 0.9505 |
| 23 | 5 eq. in reactor | 100 | 101 | 73.6 | 267 | 0.36 | 7.8 | 134 | 1.27 | 17.2 | 9.5 | 0.9636 |
| 24 | 5 eq. in catalyst | 118 | 156 | 5.2 | 319 | 0.46 | 11.0 | 233 | 1.49 | 21.1 | 6.4 | 0.9516 |
| 25 | 10 eq. in catalyst | 100 | 160 | 44.6 | 809 | 0.35 | 6.3 | 167 | 1.88 | 26.3 | 11.3 | 0.9612 |
| 26 | 5 eq. TIBA in catalyst | 56 | 155 | 9.57* | 572 | 0.36 | 8.0 | 257 | 1.96 | 32.3 | 7.6 | 0.9531 |
| 27 | 5 eq. DEALE in catalyst | 48 | 158 | 35.48* | 526 | 0.45 | | | | | | 0.9566 |

*run with 500 cc H$_2$ present

In summary, the use of DEALE or TIBA with silylchromate catalysts results in polymer molecular weight characteristics (molecular weight, molecular weight distribution, high molecular weight shoulders, etc.) similar to those obtained without the use of DEALE or TIBA, but with better productivities than in the absence of these aluminum compounds.

indicates an increase in molecular weight upon addition of co-catalyst. Table 8 also demonstrates that catalyst activity is increased by co-catalyst addition. It should be noted that TEB (triethyl boron) can also be used as a co-catalyst for SC catalysts. It should be understood that, co-catalyst is always added "in-reactor", by definition.

TABLE 8

Effect of Co-Catalyst on SC-500 Catalyst Performance.

| Example No. | Addition | Equivalents | Time (min) | YIELD (g) | Flow Index | Act.gPE/ gcat-1 hr | Bulk Density (g/cc) | Mn (× $10^3$) | Mw (× $10^3$) | Mz (× $10^6$) | Mw/Mn | Mz/Mw | Den. g/cc |
|---|---|---|---|---|---|---|---|---|---|---|---|---|---|
| 28 | none | 0.00 | 54 | 158 | 49.0 | 487 | 0.43 | | | | | | 0.9579 |
| 29 | TEAL | 2.0 eq | 65 | 157 | 31.9 | 649 | 0.44 | 9.6 | 217 | 1.68 | 22.6 | 7.8 | 0.9581 |
| 30 | TEAL | 5.0 eq | 115 | 156 | 33.3 | 368 | 0.37 | 7.7 | 196 | 1.56 | 25.3 | 8.0 | 0.9619 |
| 31 | TIBA | 2.0 eq | 50 | 151 | 18.5 | 873 | 0.44 | 8.7 | 240 | 1.89 | 27.4 | 7.9 | 0.9548 |
| 32 | TIBA | 5.0 eq | 66 | 162 | 24.5 | 686 | 0.37 | 8.5 | 210 | 1.69 | 24.6 | 8.0 | 0.9542 |
| 33 | TNHAL | 2.0 eq | 57 | 155 | 17.3 | 811 | 0.43 | 8.6 | 241 | 1.97 | 28.0 | 8.2 | 0.9545 |
| 34 | TNHAL | 5.0 eq | 60 | 151 | 30.5 | 619 | 0.33 | 7.6 | 174 | 1.56 | 23.0 | 8.9 | 0.9516 |

[500 cc H2 present in all runs]

Figure 13:
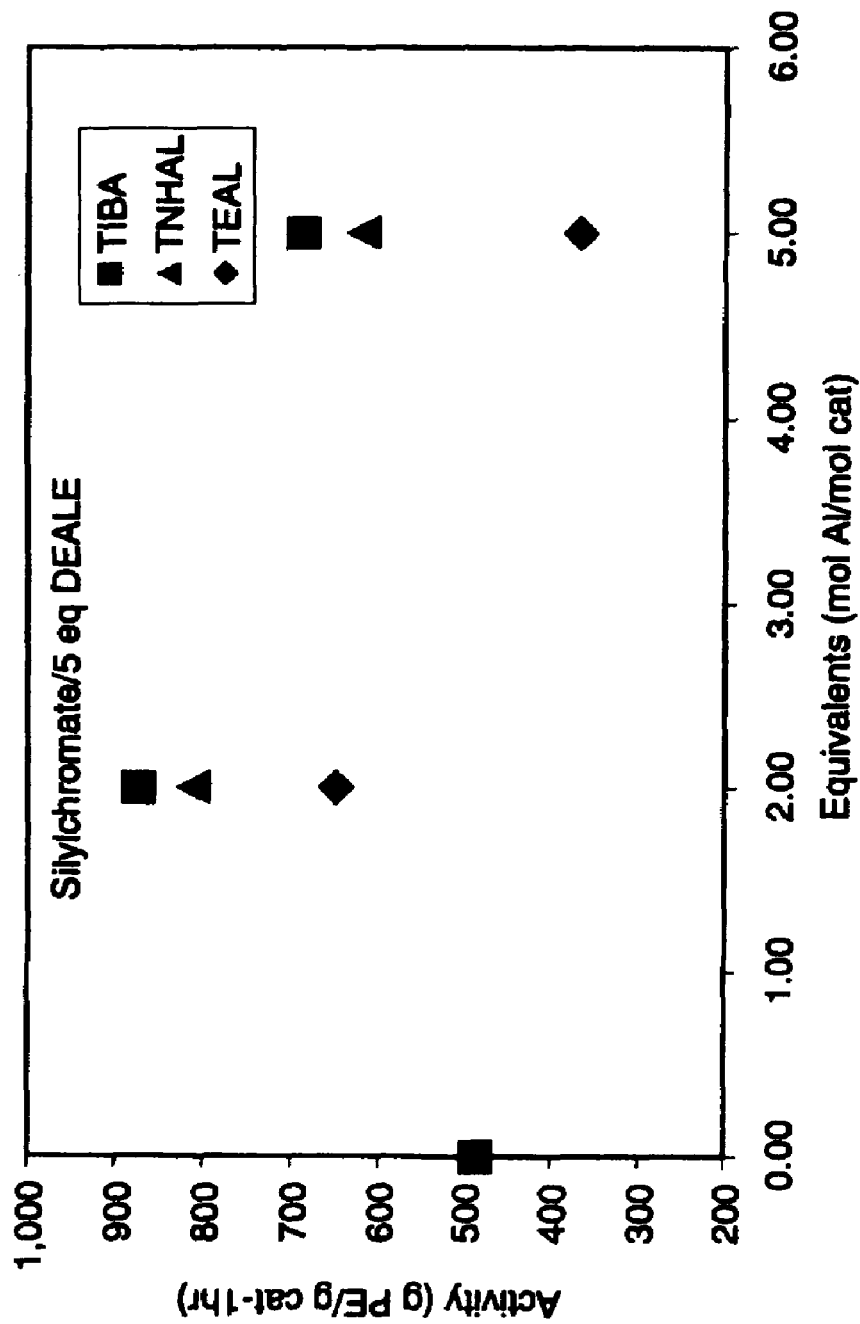
FIG. 13. Activity versus Equivalents of Co-Catalyst (Al/Cr) for various co-catalyst for silylchromate catalyst having 5 eq DEALE/eq Cr.
Figure 14:
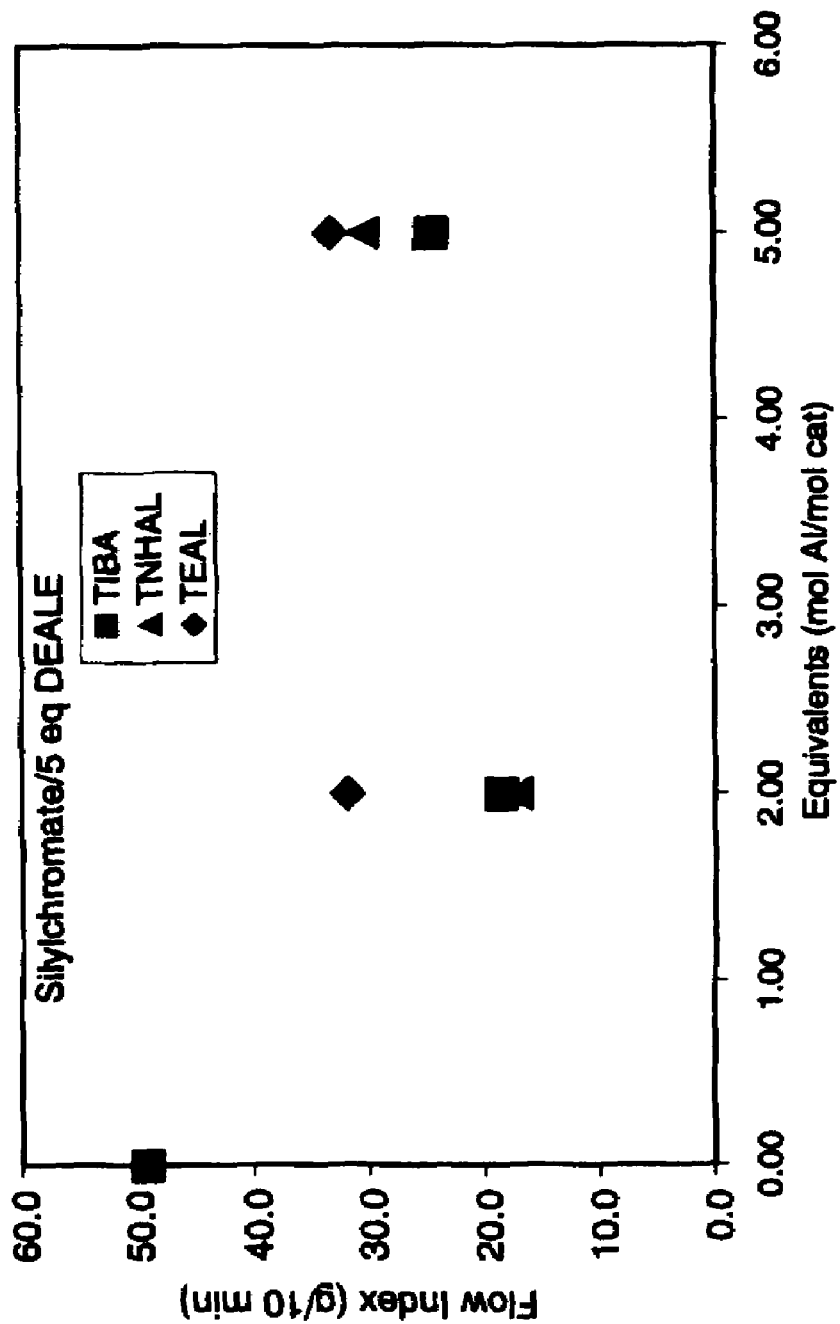
FIG. 14. Flow Index versus Equivalents of Co-Catalyst (Al/Cr) for various co-catalysts for silylchromate catalyst having 5 eq DEALE/eq Cr.
Figure 15:
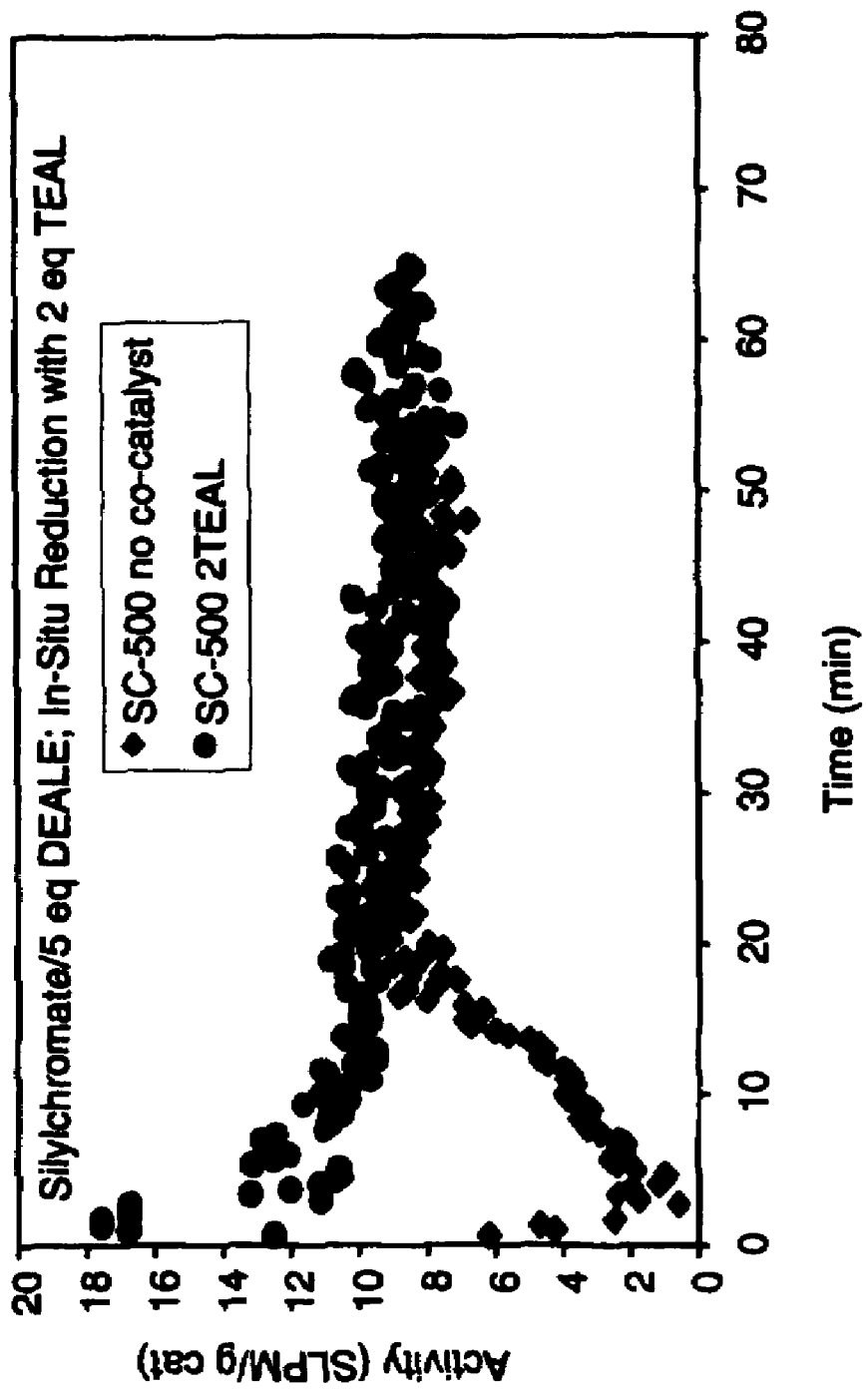
FIG. 15. Activity versus Time for silylchromate catalyst having 5 eq DEALE/eq Cr, with no co-catalyst; and in the presence of TEAL.
Figure 16:
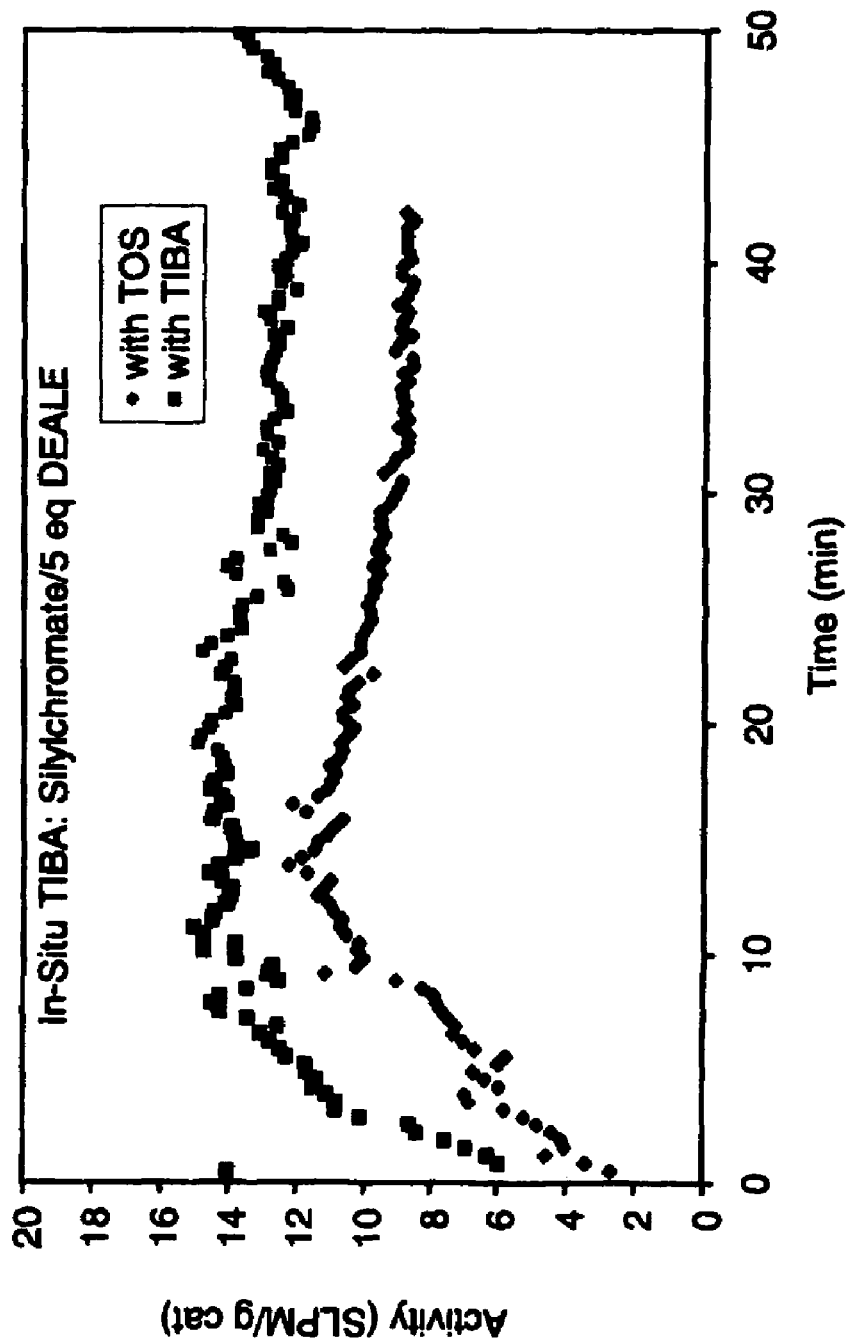
FIG. 16. Activity versus Time for silylchromate catalyst having 5 eq DEALE/eq Cr, with no co-catalyst; and in the presence of TIBA.
Figure 17:
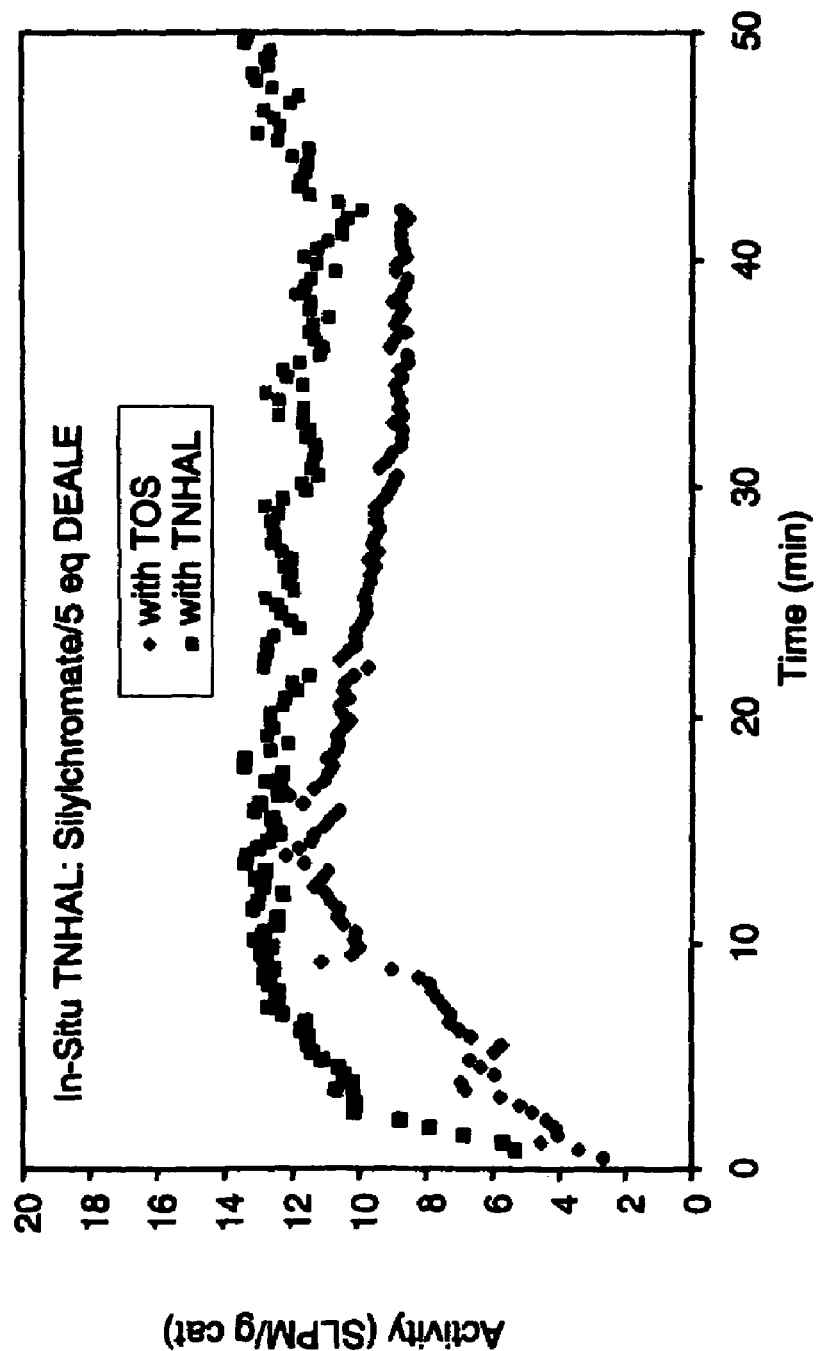
FIG. 17. Activity versus Time for silylchromate catalyst having 5 eq DEALE/eq Cr, with no co-catalyst; and in the presence of TNHAL.
Figure 18:
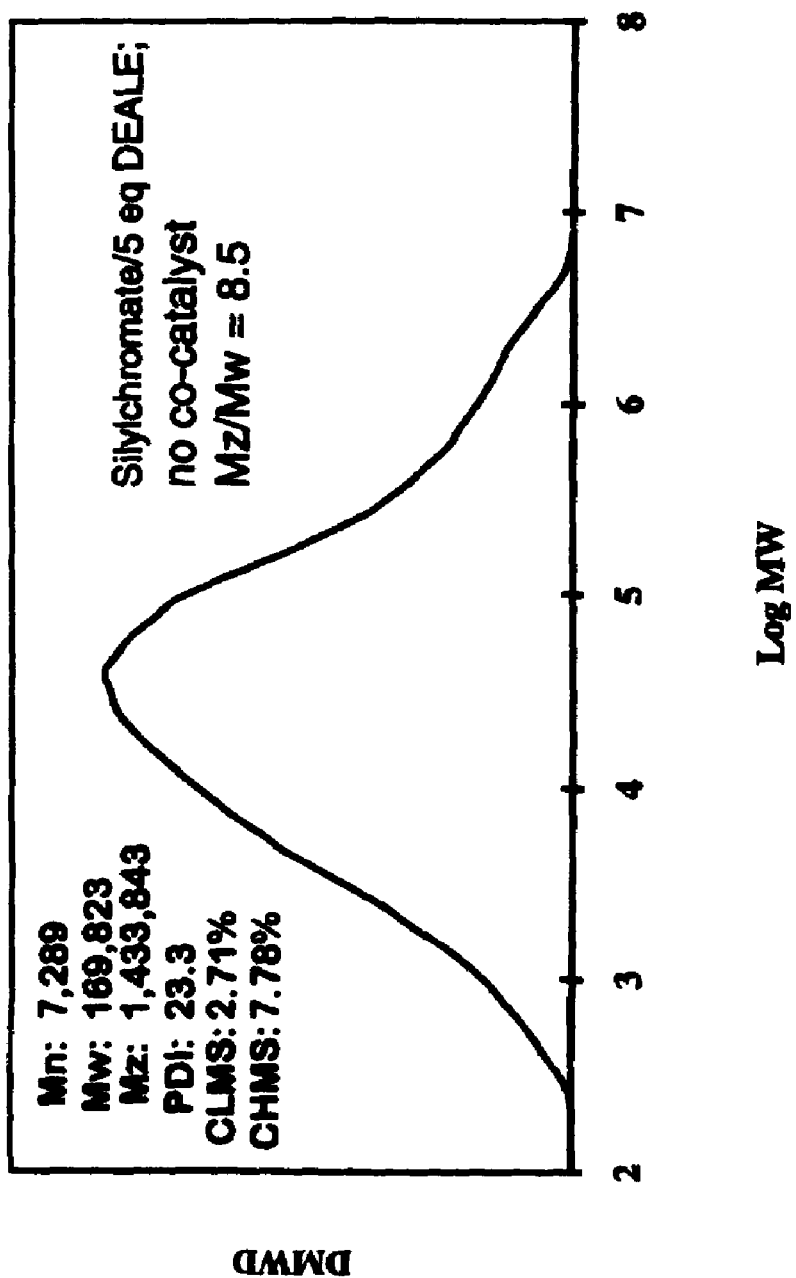
FIG. 18. Molecular weight plot for silylchromate catalyst having 5 eq DEALE/eq Cr, produced polyethylene, no co-catalyst.
Figure 19:
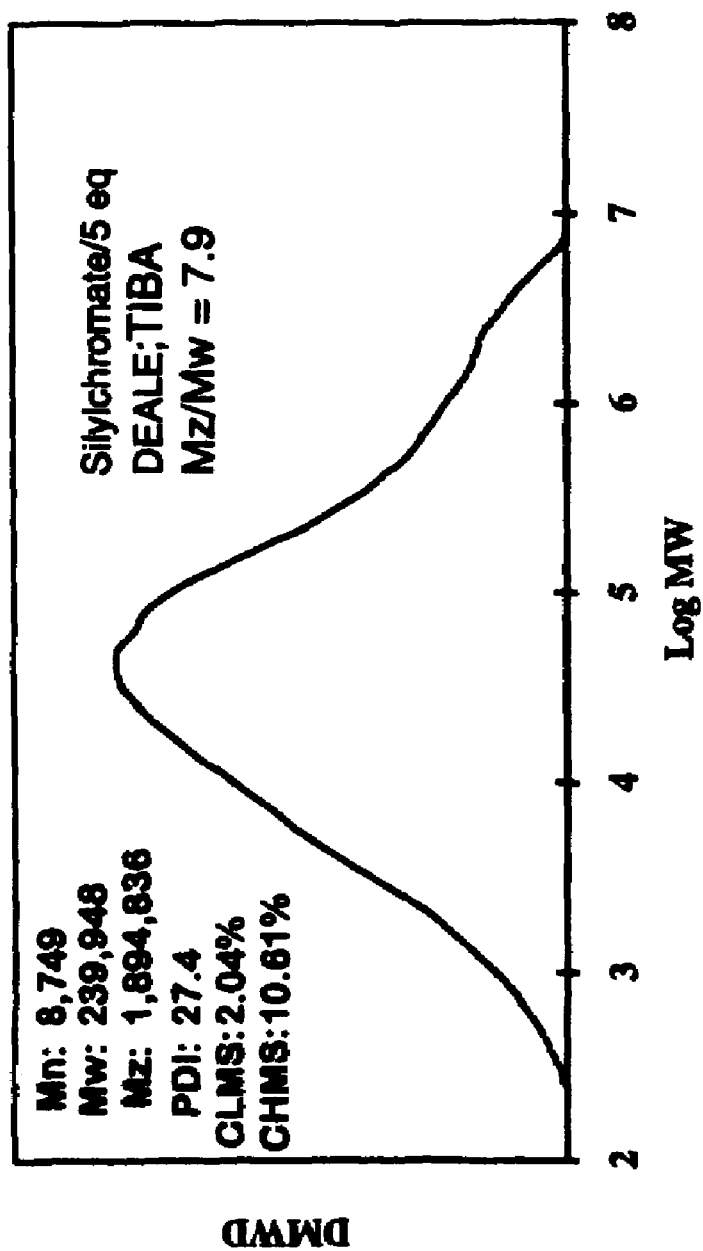
FIG. 19. Molecular weight plot for silylchromate catalyst having 5 eq DEALE/eq Cr, produced polyethylene, in the presence of TIBA.
Figure 20:
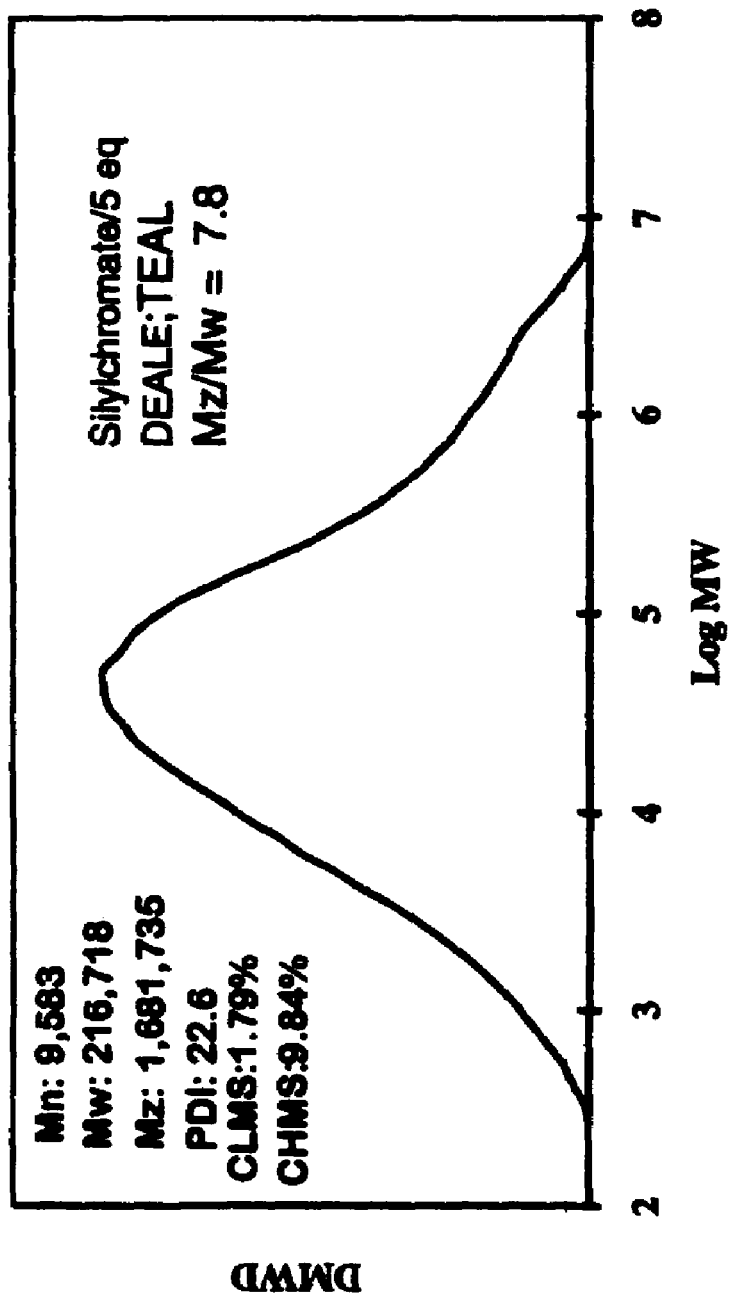
FIG. 20. Molecular weight plot for silylchromate catalyst having 5 eq DEALE/eq Cr, produced polyethylene, in the presence of TEAL.
Figure 21:
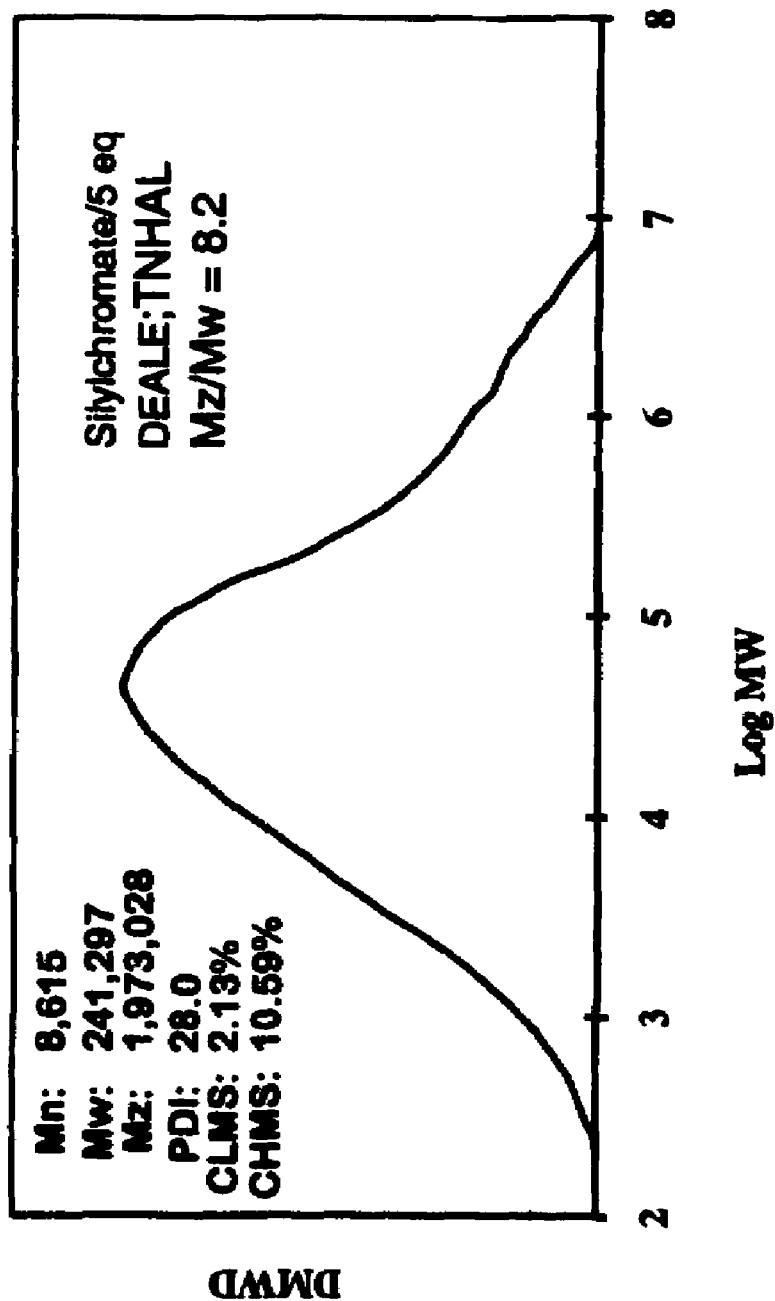
FIG. 21. Molecular weight plot for silylchromate catalyst having 5 eq DEALE/eq Cr, produced polyethylene, in the presence of TNHAL.

FIGS. 13 and 14 demonstrate a general increase in catalyst activity and molecular weight, with a maximum effect at about 1-2 equivalents of Al per equivalent of Cr. Although not wishing to be bound by theory, it is suspected that higher levels of co-catalyst begin to poison the catalyst at high levels. FIGS. 15-17 illustrate the effect of co-catalyst on induction time. In all cases, it can be seen that activity peaks higher and largely remains higher when co-catalyst is present. Induction times are essentially eliminated by the presence of co-catalyst for the SC-500 system.

Figure 22:
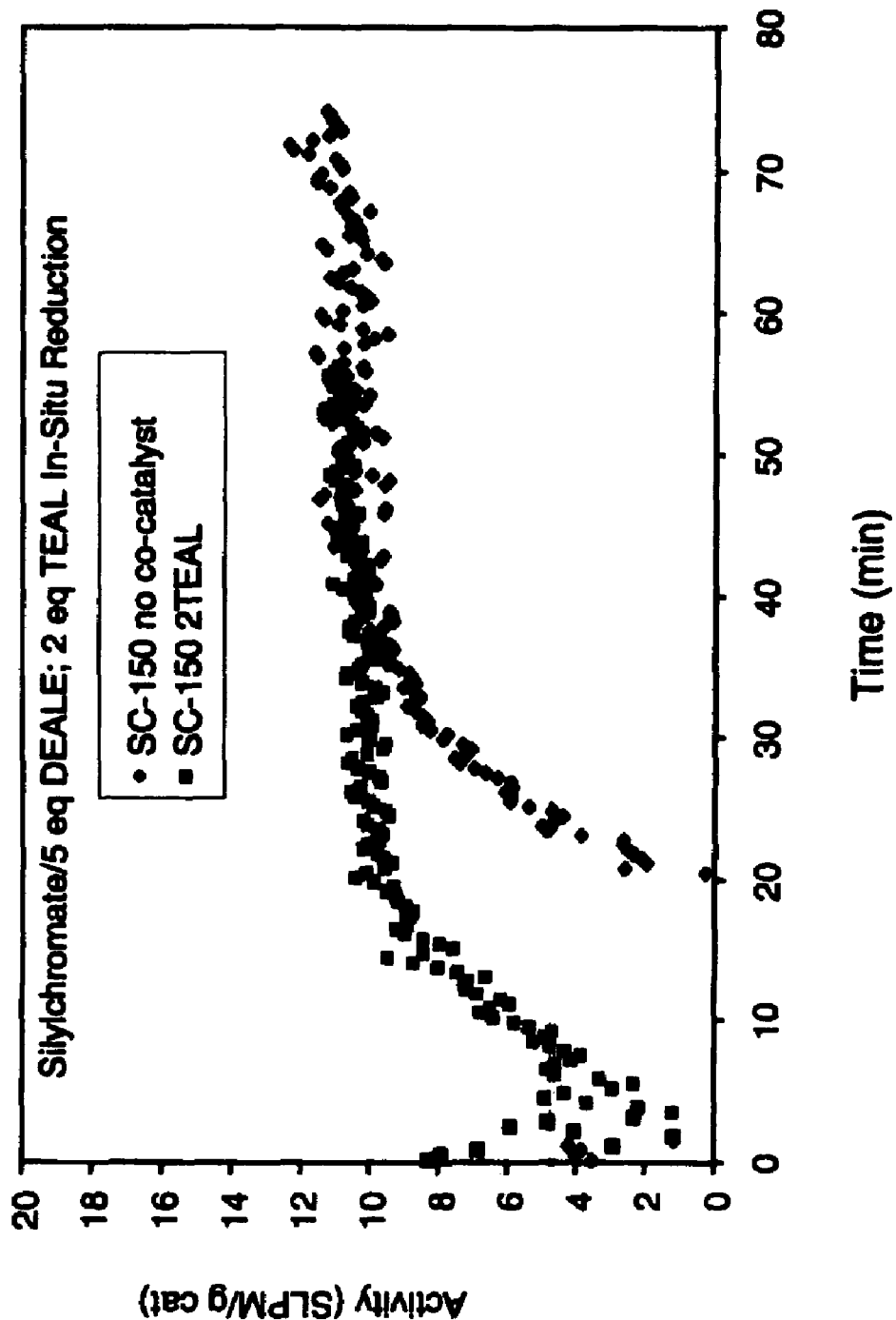
FIG. 22. Activity versus Time for silylchromate catalyst having 1.5 eq DEALE/eq Cr, with no co-catalyst; and in the presence of TEAL.
Figure 23:
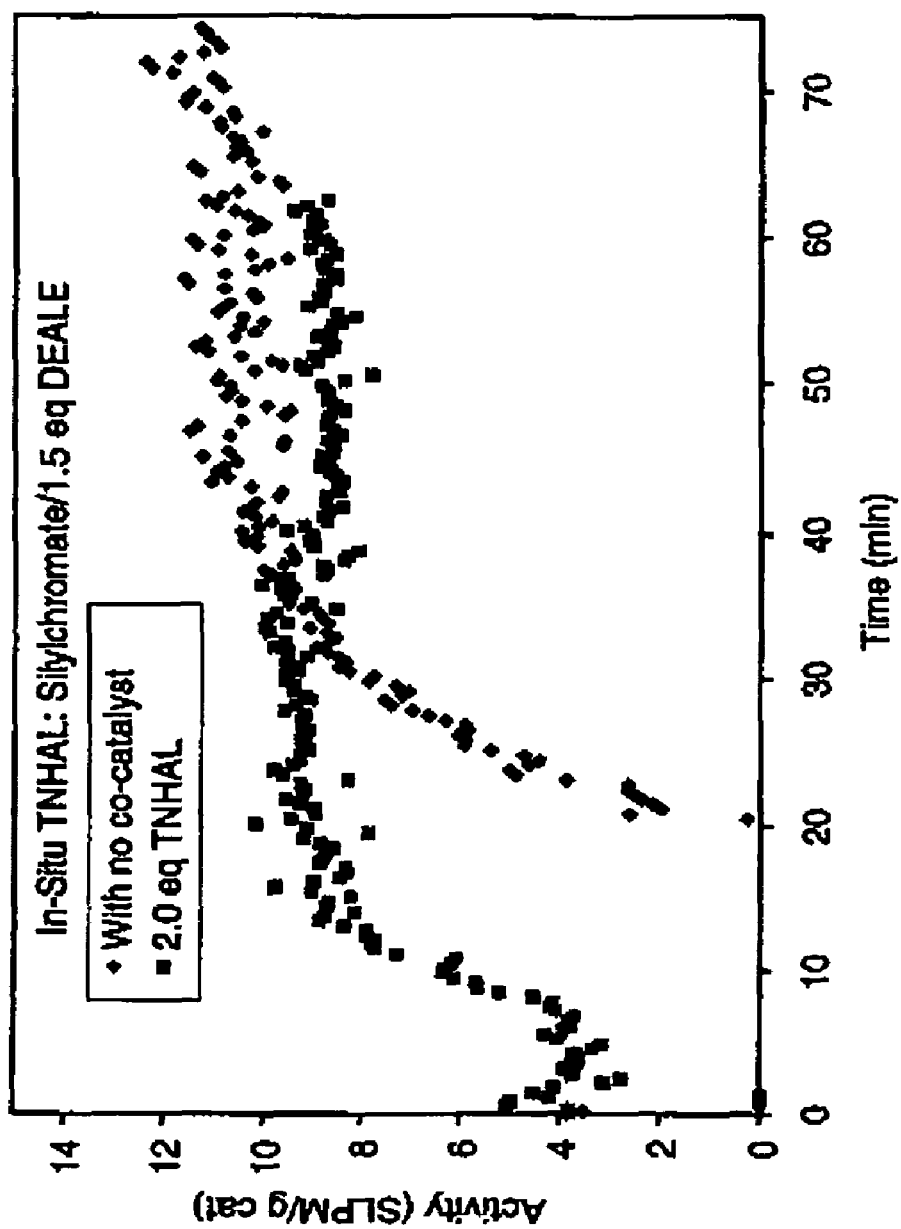
FIG. 23. Activity versus Time for silylchromate catalyst having 1.5 eq DEALE/eq Cr, with no co-catalyst; and in the presence of TNHAL.
Figure 24:
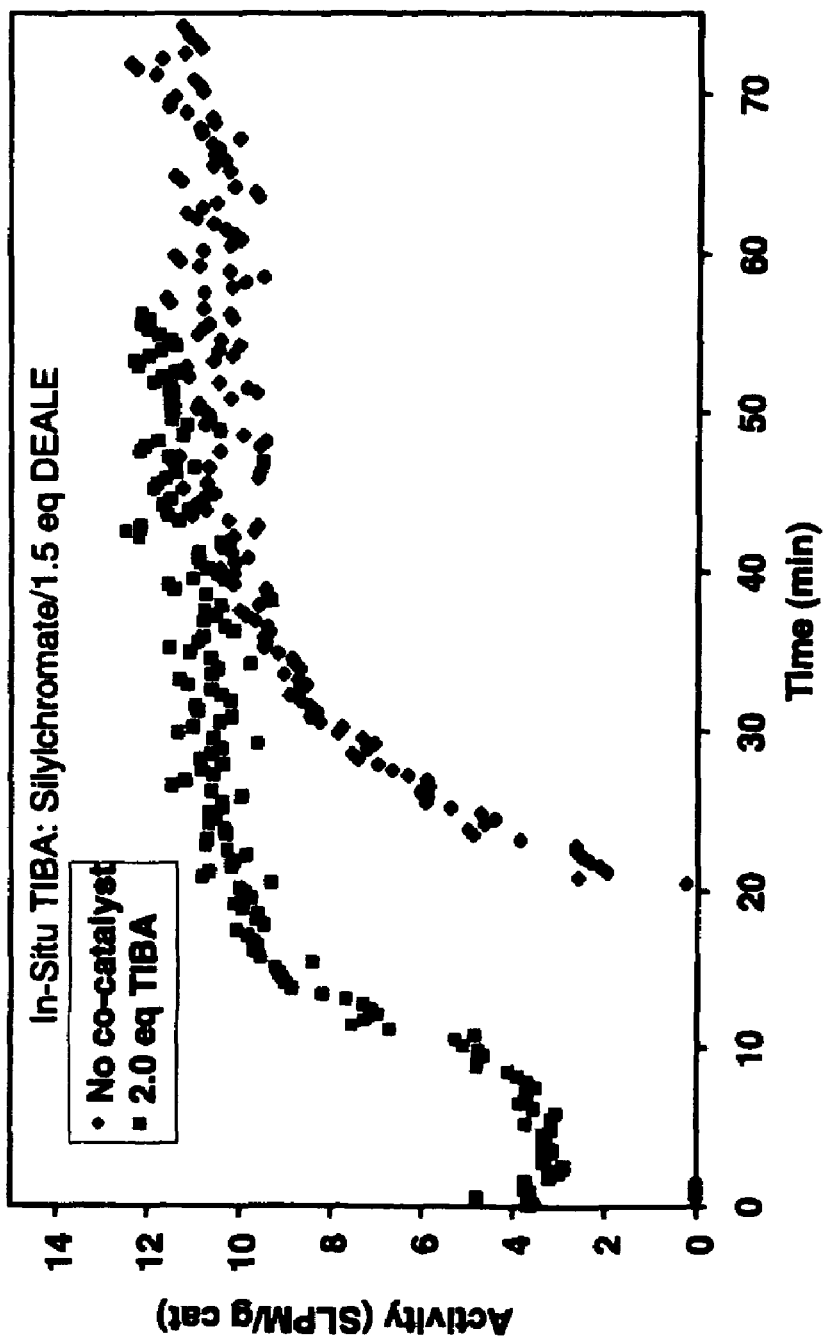
FIG. 24. Activity versus Time for silylchromate catalyst having 1.5 eq DEALE/eq Cr, with no co-catalyst; and in the presence of TIBA.
Figure 25:
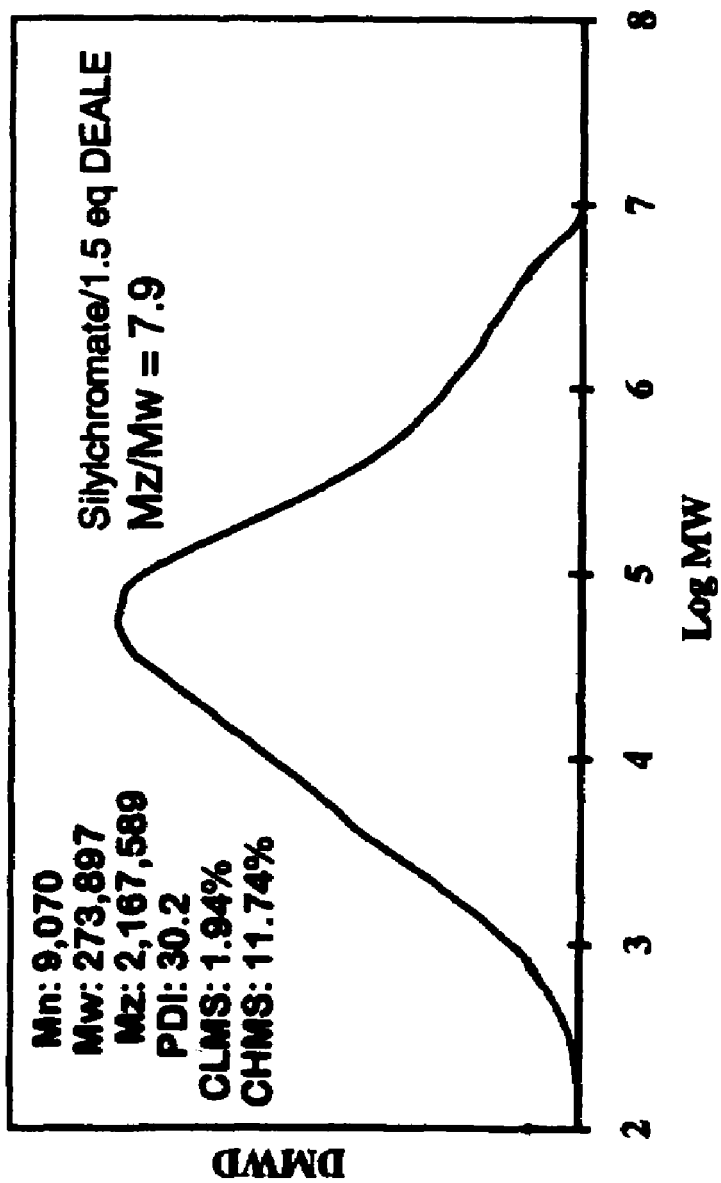
FIG. 25. Molecular weight plot for silylchromate catalyst having 1.5 eq DEALE/eq Cr, produced polyethylene, no co-catalyst.
Figure 26:
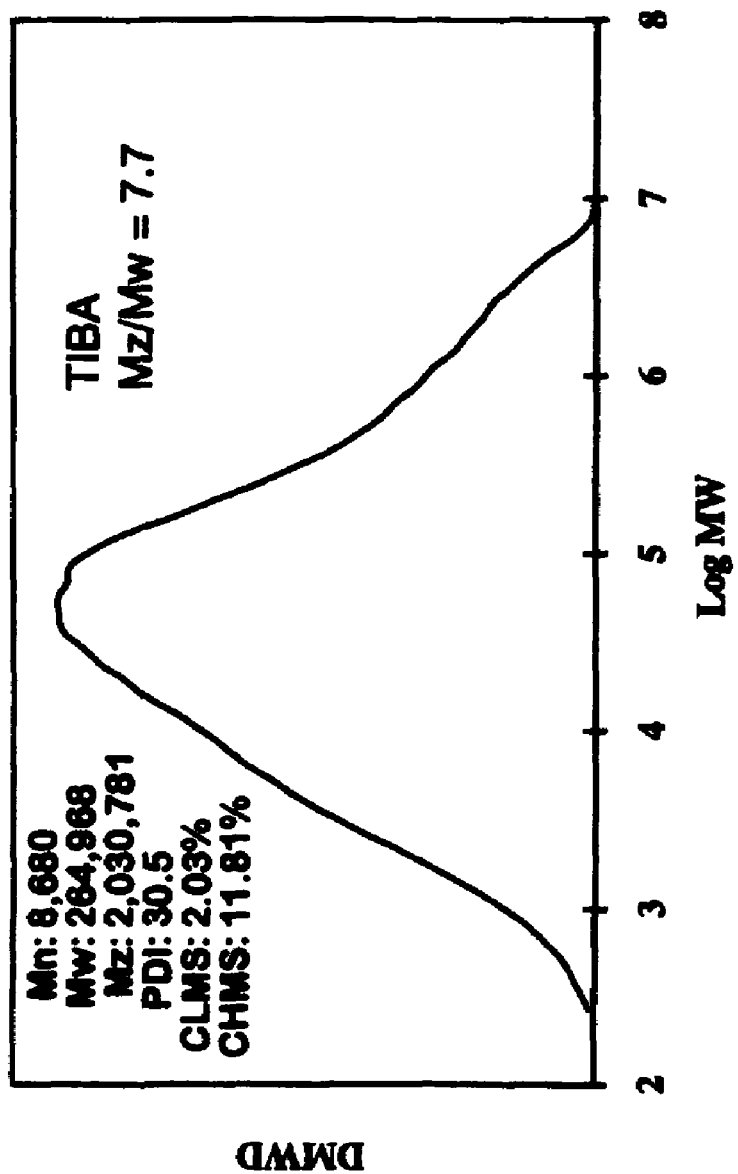
FIG. 26. Molecular weight plot for silylchromate catalyst having 1.5 eq DEALE/eq Cr, produced polyethylene, in the presence of TIBA.
Figure 27:
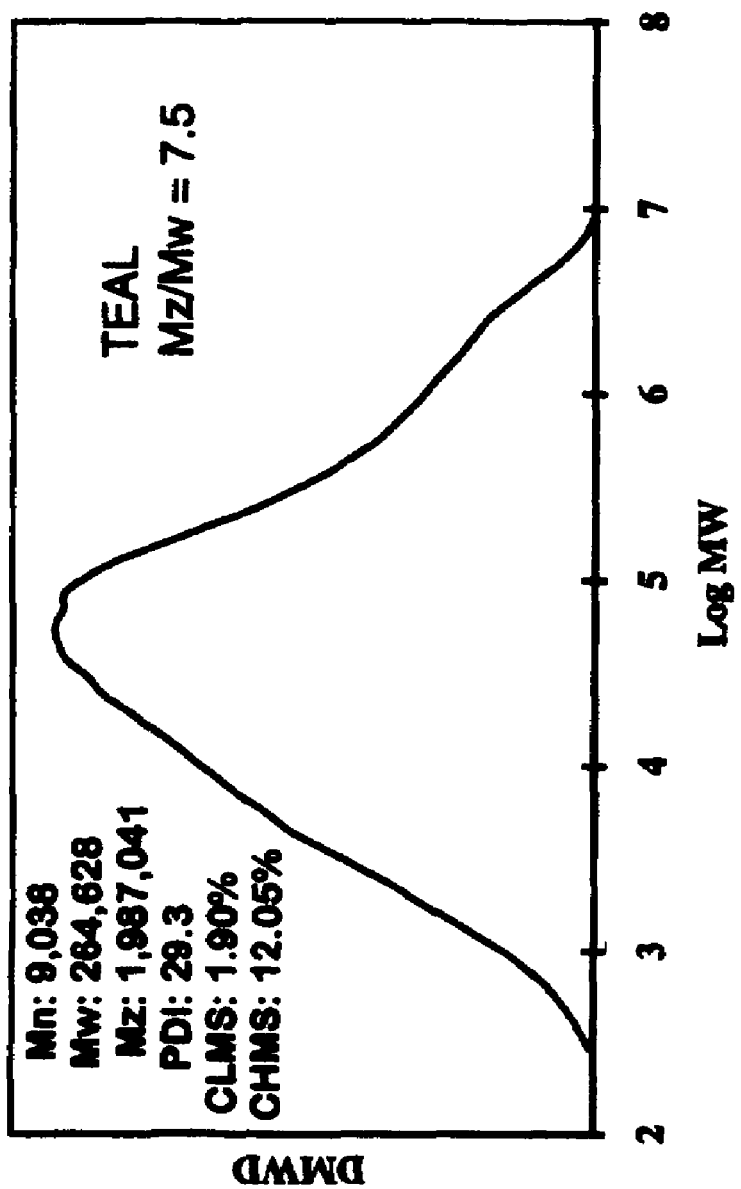
FIG. 27. Molecular weight plot for silylchromate catalyst having 1.5 eq DEALE/eq Cr, produced polyethylene, in the presence of TEAL.
Figure 28:
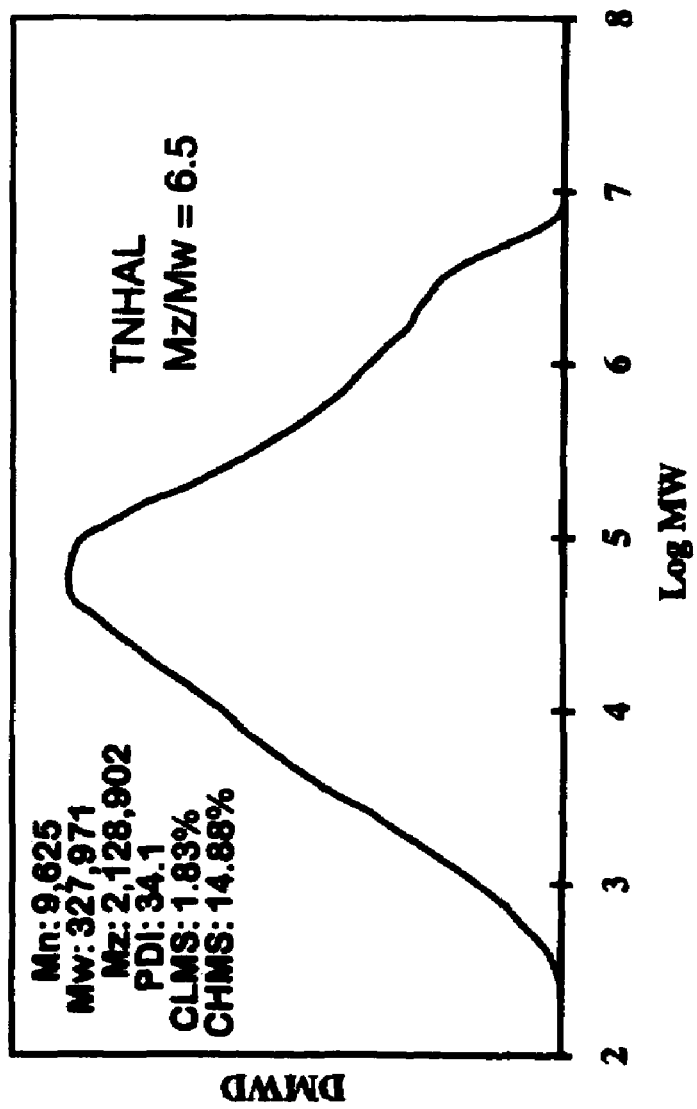
FIG. 28. Molecular weight plot for silylchromate catalyst having 1.5 eq DEALE/eq Cr, produced polyethylene, in the presence of TNHAL.
Figure 29:
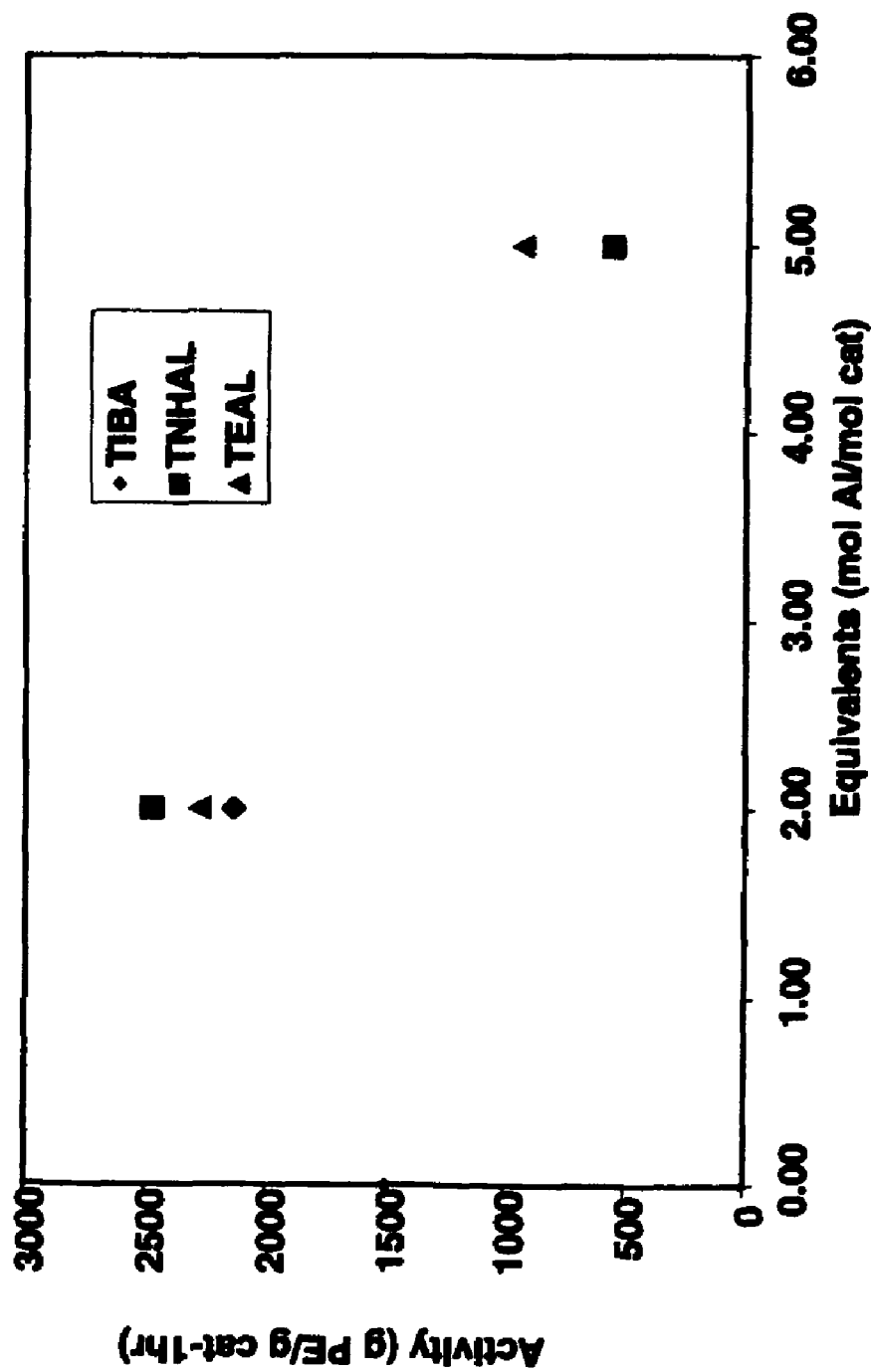
FIG. 29. Activity versus Equivalents of Co-Catalyst (Al/Cr) for various co-catalysts for 957HS chromium oxide-TTIP catalyst having 5 eq DEALE/eq Cr.
Figure 30:
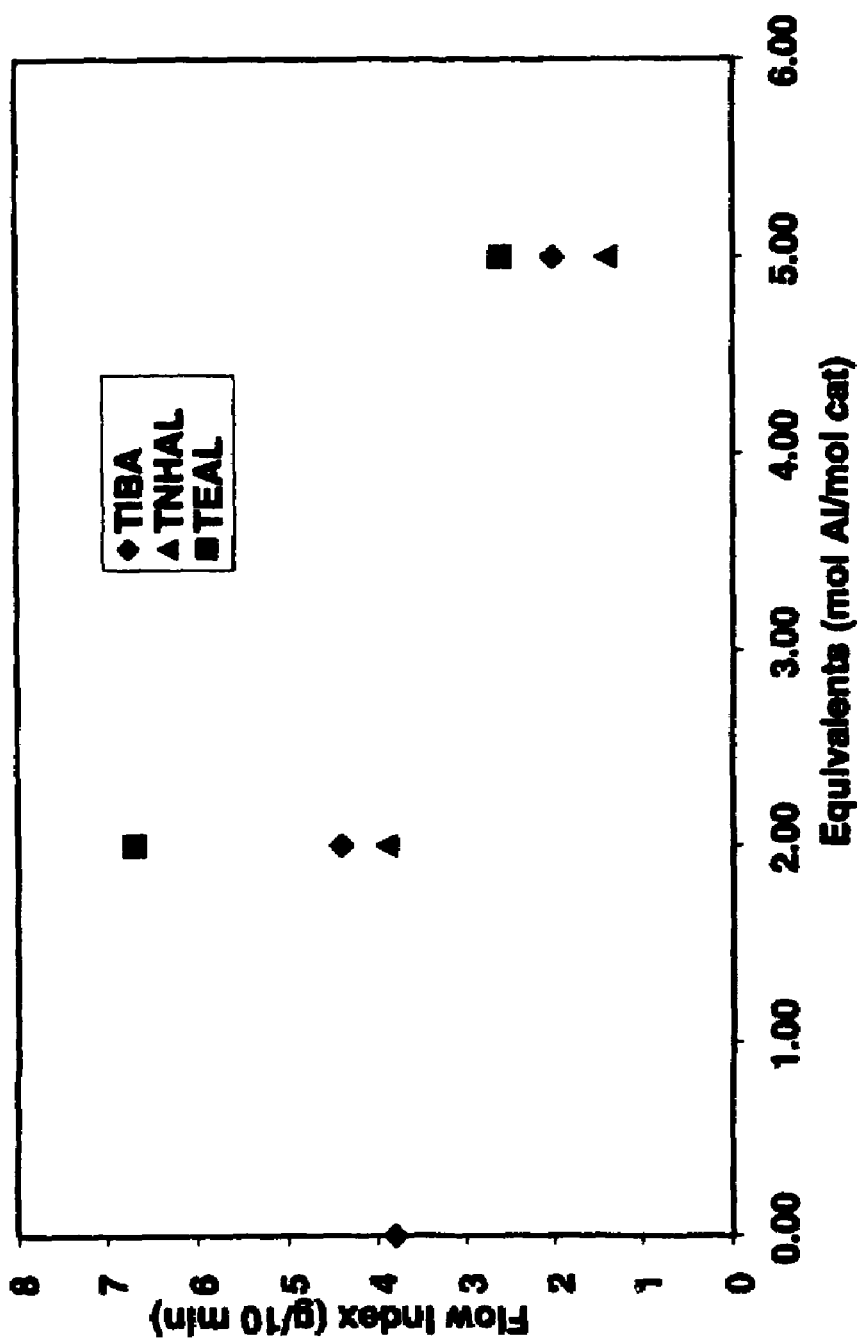
FIG. 30. Flow Index versus Equivalents of Co-Catalyst (Al/Cr) for various co-catalysts for 957HS chromium oxide-TTIP catalyst having 1.5 eq DEALE/eq Cr.
Figure 31:
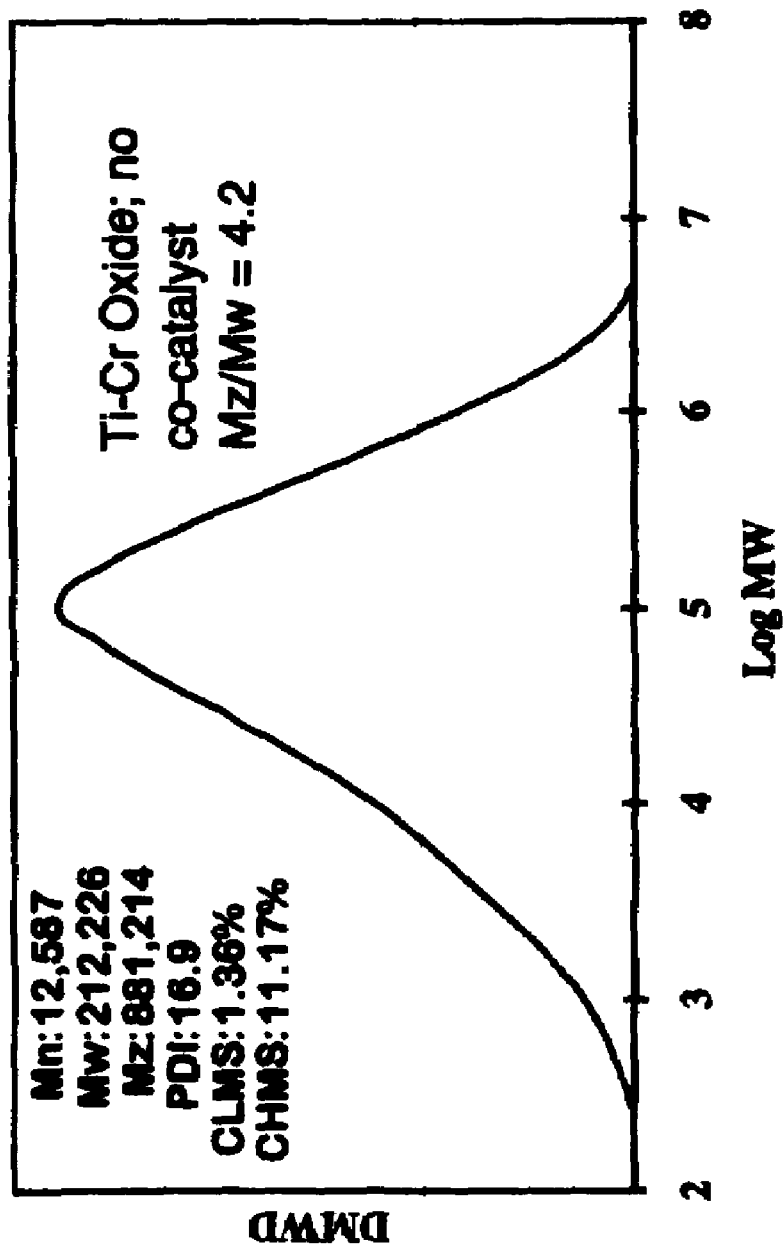
FIG. 31. Molecular weight plot for 957HS chromium oxide-TTIP catalyst-produced polyethylene, no co-catalyst.
Figure 32:
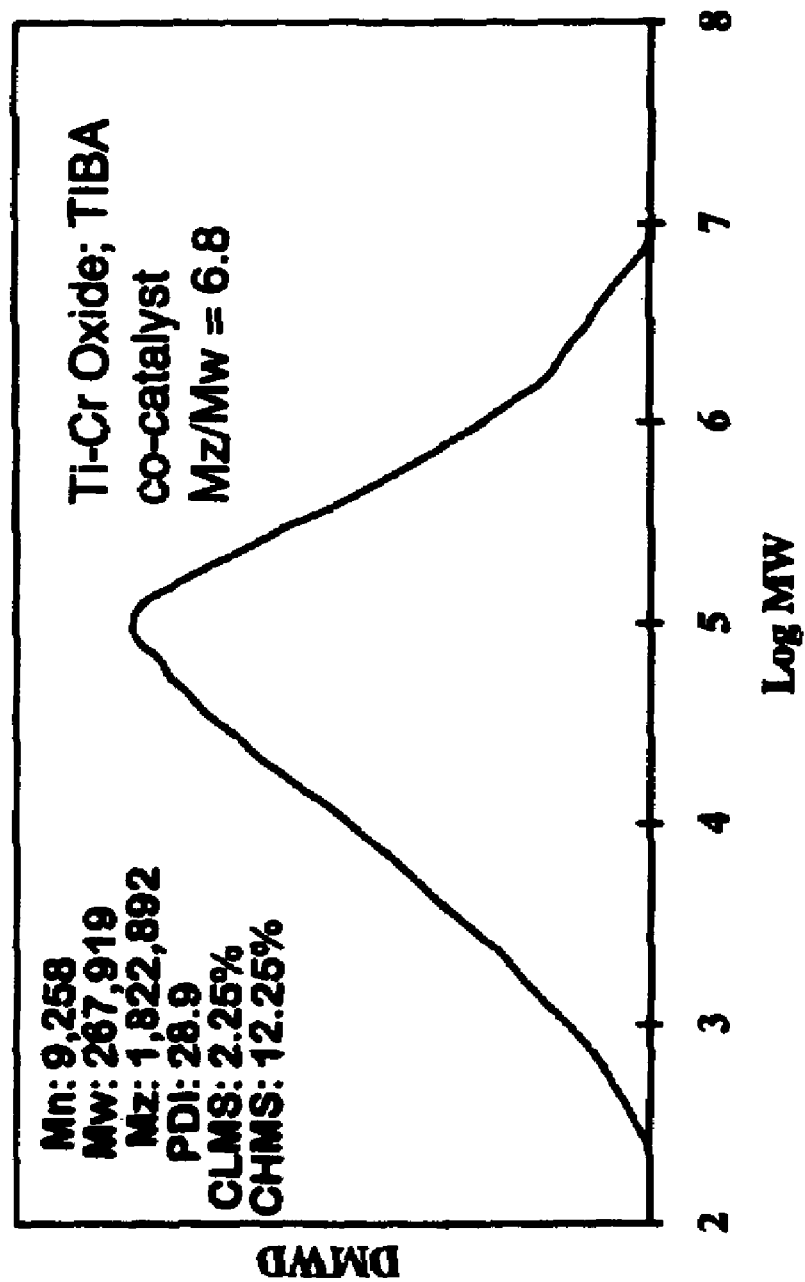
FIG. 32. Molecular weight plot for 957HS chromium oxide-TTIP catalyst-produced polyethylene, in the presence of TIBA.
Figure 33:
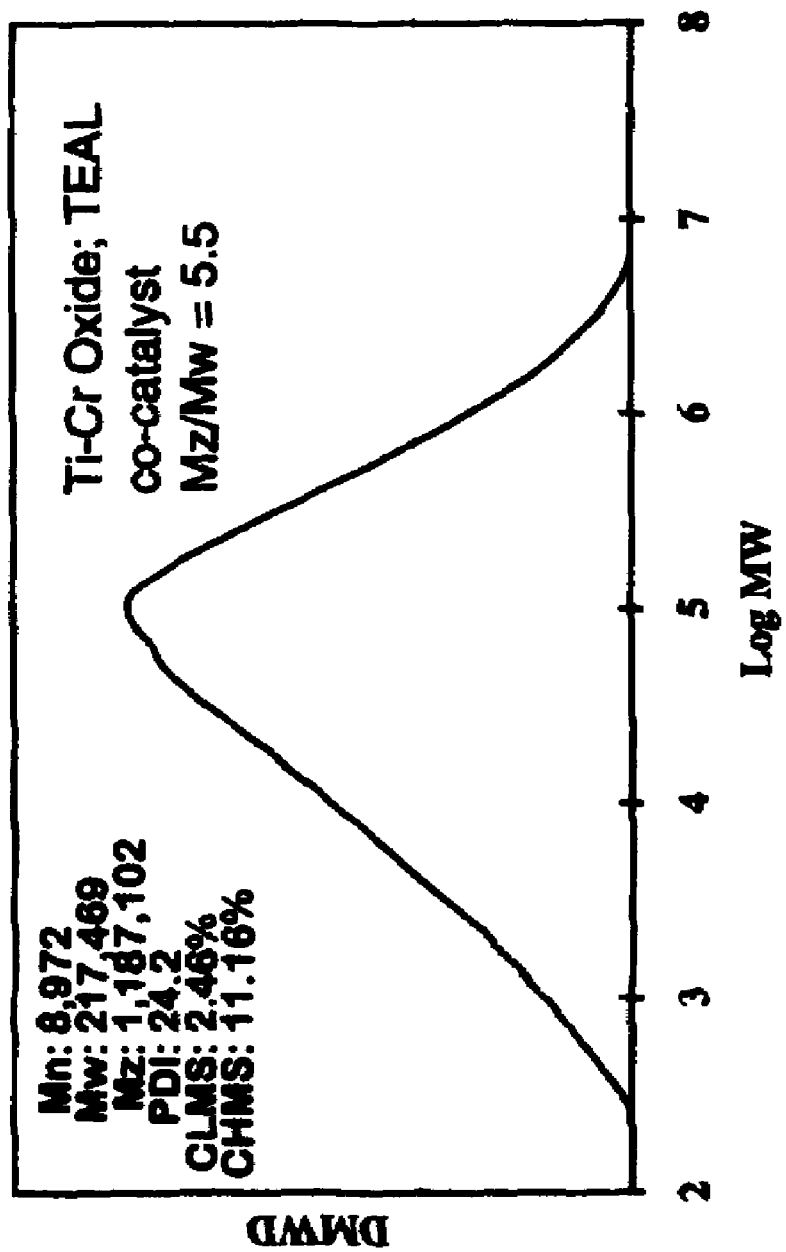
FIG. 33. Molecular weight plot for 957HS chromium oxide-TTIP catalyst-produced polyethylene, in the presence of TEAL.
Figure 34:
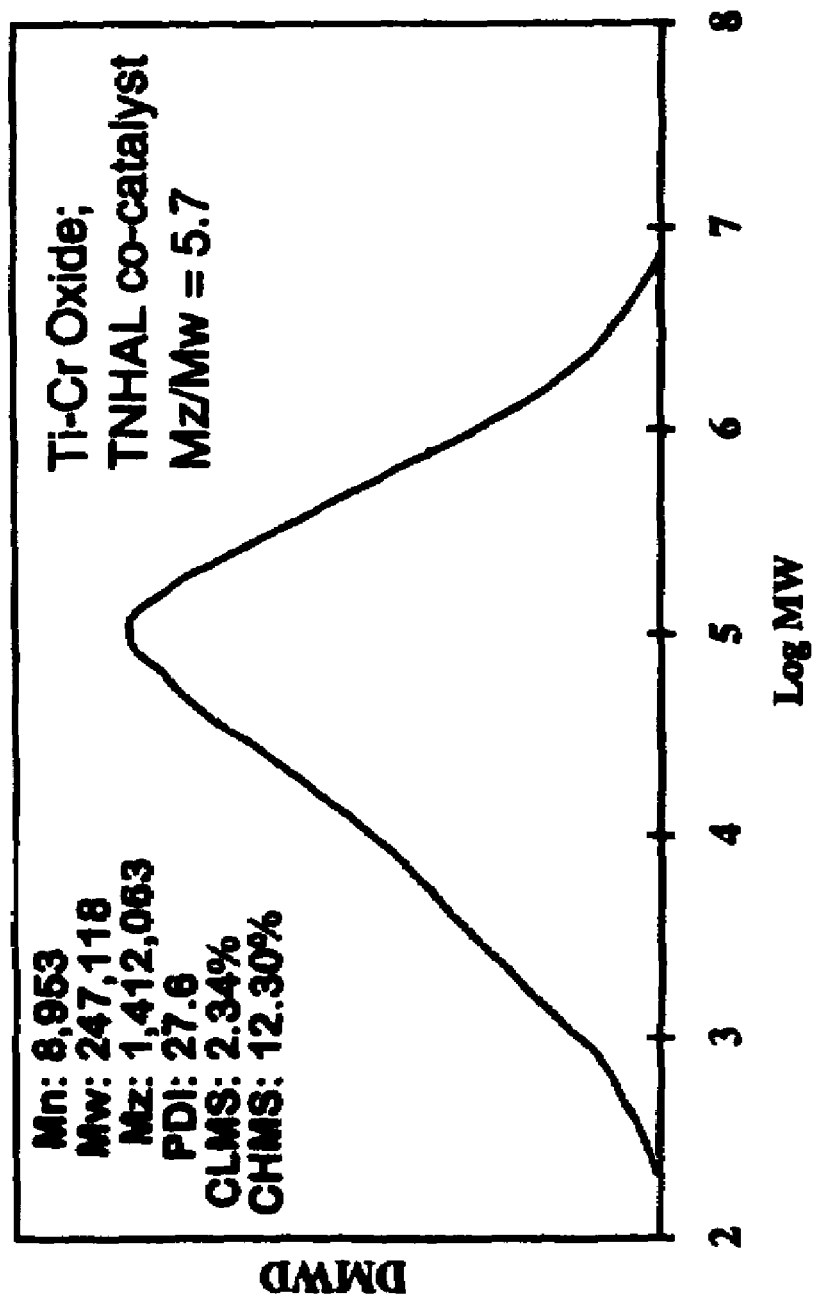
FIG. 34. Molecular weight plot for 957HS chromium oxide-TTIP catalyst-produced polyethylene, in the presence of TNHAL.

FIG. 18-21 demonstrate the effect of the presence of co-catalyst on the molecular weight distribution of the produced polymer. Although we observed earlier that molecular weight was increased by co-catalyst, molecular weight distribution is largely unchanged. Additionally, the intensity of the high molecular weight shoulder, as indicated by the $M_z/M_w$ value activity, and various molecular weight-related data for polymers produced when the co-catalyst is varied. The earlier observed trends for SC-500 are evident for SC-150. Induction times (see FIGS. 22-24) are virtually eliminated by the addition of co-catalysts in these catalyst systems. FIG. 25-28 demonstrate that molecular weight distribution is largely unaffected by co-catalyst. The intensity of the high molecular weight shoulder, as indicated by the $M_z/M_w$ value is also unchanged relative to the polyethylene produced by SC-150 in the absence of co-catalyst. To summarize, co-catalyst increases catalyst activity for SC-150 catalyst, but polymer molecular weight distribution is largely unchanged. Therefore, judicious selection of co-catalyst allows one to modify molecular weight and improve catalyst activity.

TABLE 9

Effect of Co-Catalyst on SC-150 Catalyst Performance.

| Example No. | Addition | Equivalents | Time (min) | YIELD (g) | Flow Index | Act.gPE/ gcat-1 hr | Bulk Density (g/cc) | Mn (× $10^3$) | Mw (× $10^3$) | Mz (× $10^6$) | Mw/Mn | Mz/Mw | Den. g/cc |
|---|---|---|---|---|---|---|---|---|---|---|---|---|---|
| 35 | none | 0.00 | 74 | 157 | 11.2 | 489 | 0.43 | 9.1 | 274 | 2.17 | 30.20 | 7.9 | 0.9502 |
| 36 | TEAL | 2.0 eq | 57 | 155 | 15.3 | 608 | 0.38 | 9.0 | 265 | 1.99 | 29.28 | 7.5 | 0.9513 |
| 37 | TIBA | 2.0 eq | 54 | 159 | 10.8 | 675 | 0.37 | 8.7 | 265 | 2.03 | 30.53 | 7.7 | 0.9524 |
| 38 | TNHAL | 2.0 eq | 63 | 155 | 6.8 | 564 | 0.38 | 9.6 | 328 | 2.13 | 34.07 | 6.5 | 0.9522 |

[500 cc H2 added to all runs]

is also unchanged relative to the polyethylene produced by SC-500 in the absence of co-catalyst. In summary, co-catalyst increases catalyst activity and polymer molecular weight for SC-500 catalyst, but polymer molecular weight distribution is largely unchanged. These features are desirable for short residence time operation.

The same effect is seen with SC catalyst having 1.5 equivalents DEALE/equivalent of Cr (designated herein as SC-150). Table 9 and FIG. 22-28 provides induction time, Co-catalyst addition also has beneficial effects on CrOx catalysts. Table 10 and FIG. 29-34 provide data demonstrating the effect of co-catalyst on the performance of Ti—CrOx (on Grace 955 silica). Table 10 demonstrates that flow index decreases upon addition of TEAL and therefore polymer molecular weight is increased by the use of 5 eq. co-catalyst for the Ti—CrOx catalyst. Ti—CrOx activity responds similarly to co-catalyst as does SC-500 and SC-150 catalyst discussed above.

TABLE 10

Effect of Co-Catalyst on Ti—CrOx Catalyst Performance.

| Example No. | Addition | Equivalents | Time (min) | YIELD (g) | Flow Index | Act.gPE/ gcat-1 hr | Bulk Density (g/cc) | Mn (× $10^3$) | Mw (× $10^3$) | Mz (× $10^6$) | Mw/Mn | Mz/Mw | Den. g/cc |
|---|---|---|---|---|---|---|---|---|---|---|---|---|---|
| 39 | none | 0.00 | 62 | 156 | 3.8 | 1,497 | 0.32 | 12.6 | 212 | 0.88 | 16.9 | 4.2 | 0.9466 |
| 40 | TIBA | 2.0 eq | 40 | 152 | 4.4 | 2,135 | 0.26 | 9.3 | 268 | 1.82 | 28.9 | 6.8 | 0.9475 |

TABLE 10-continued

Effect of Co-Catalyst on Ti—CrOx Catalyst Performance.

| Example No. | Addition | Equiv-alents | Time (min) | YIELD (g) | Flow Index | Act.gPE/ gcat-1 hr | Bulk Density (g/cc) | Mn (× 10³) | Mw (× 10³) | Mz (× 10⁶) | Mw/Mn | Mz/Mw | Den. g/cc |
|---|---|---|---|---|---|---|---|---|---|---|---|---|---|
| 41 | TIBA | 5.0 eq | 88 | 139 | 2.0 | 915 | 0.30 | 7.8 | 319 | 2.01 | 41.0 | 6.3 | 0.9457 |
| 42 | TNHAL | 2.0 eq | 43 | 159 | 3.9 | 2,474 | 0.25 | 9.0 | 247 | 1.41 | 27.6 | 5.7 | 0.9464 |
| 43 | TNHAL | 5.0 eq | 120 | 135 | 1.4 | 561 | 0.35 | 8.8 | 439 | 2.37 | 50.1 | 5.4 | 0.9493 |
| 44 | TEAL | 2.0 eq | 36 | 155 | 6.7 | 2,276 | 0.29 | 9.0 | 217 | 1.19 | 24.2 | 5.5 | 0.9471 |
| 45 | TEAL | 5.0 eq | 80 | 148 | 2.6 | 937 | 0.29 | 8.4 | 297 | 1.84 | 35.2 | 6.2 | 0.9472 |

[500 cc H2 present in all runs]

An improvement in activity is seen, particularly at 1-2 eq of Al per eq of Cr. As seen in FIGS. 31-34, molecular weight distribution broadens when co-catalyst is present, and a pronounced high molecular weight shoulder does not develop. Broadening of the polymer molecular weight distribution will improve physical properties without increasing polymer swell.

Additionally, the inventors have discovered that various co-catalysts not based on aluminum are also useful in the present invention. For example, TEB (triethyl boron) was studied for its effect on catalyst performance. Table 11 demonstrates the effect on performance of TEB co-catalyst on CrOx (chromium oxide on Grace 955 silica) and Ti—CrOx catalyst systems.

alkyl compounds expressly discussed herein are discussed by way of non-limiting example only; other aluminum alkyls are also applicable in and a part of the present invention. Similarly, alkyl aluminum alkoxides other than DEALE are also applicable in the present invention. These include, but are not limited to diethyl aluminum ethoxide, dimethyl aluminum ethoxide, dipropyl aluminum ethoxide, diethyl aluminum propoxide, and methyl ethyl aluminum ethoxide. Through judicious use of the co-catalyst, one may modify these properties and tailor the resulting polymer for specific applications. Importantly, the invention provides for the production of high molecular weight polyethylenes with chromium-based catalysts of high activities, resulting in the ability to run at shorter reactor residence times. This affords improvements

TABLE 11

Effect of Co-Catalyst on CrOx and Ti—CrOx Catalyst Performance.

| Example No. | Addition | eq. | H2 (scc) | Time (min) | YIELD (g) | Flow Index | Act.gPE/ gcat-1 hr | Bulk Density (g/cc) | Mn (× 10³) | Mw (× 10³) | Mz (× 10⁶) | Mw/Mn | Mz/Mw | Den. g/cc |
|---|---|---|---|---|---|---|---|---|---|---|---|---|---|---|
| | | | | | | CrOx on 955 Silica | | | | | | | | |
| 46 | none | | | 79 | 174 | 2.4 | 1,250 | 0.32 | 26.4 | 268 | 1.33 | 10.1 | 5.0 | 0.9425 |
| 47 | TEB | 2.0 eq | | 56 | 158 | 1.8 | 1,832 | 0.32 | | | | | | 0.9480 |
| 48 | none | | 500 | 82 | 161 | 6.8 | 1,347 | 0.33 | 21.6 | 217 | 1.06 | 10.0 | 4.9 | 0.9407 |
| 49 | TEB | 2.0 eq | 500 | 58 | 155 | 8.9 | 1,574 | 0.28 | 15.3 | 275 | 1.60 | 18.0 | 5.8 | 0.9463 |
| | | | | | | TiCrOx on 955 Silica | | | | | | | | |
| 50 | none | | | 32 | 161 | 11.9 | 2,563 | 0.20 | 10.5 | 172 | 0.88 | 16.4 | 5.1 | 0.9456 |
| 51 | TEB | 2.0 eq | | 56 | 149 | 5.1 | 1,449 | 0.32 | 6.2 | 197 | 1.28 | 31.7 | 6.5 | 0.9522 |
| 52 | none | none | 500 | 64 | 175 | 9.7 | 1,380 | 0.32 | 9.8 | 182 | 0.81 | 18.5 | 4.5 | 0.9471 |
| 53 | TEB | 2.0 eq | 500 | 48 | 152 | 21.3 | 1,589 | 0.33 | 6.4 | 177 | 1.41 | 27.4 | 8.0 | 0.9534 |

Figure 35:
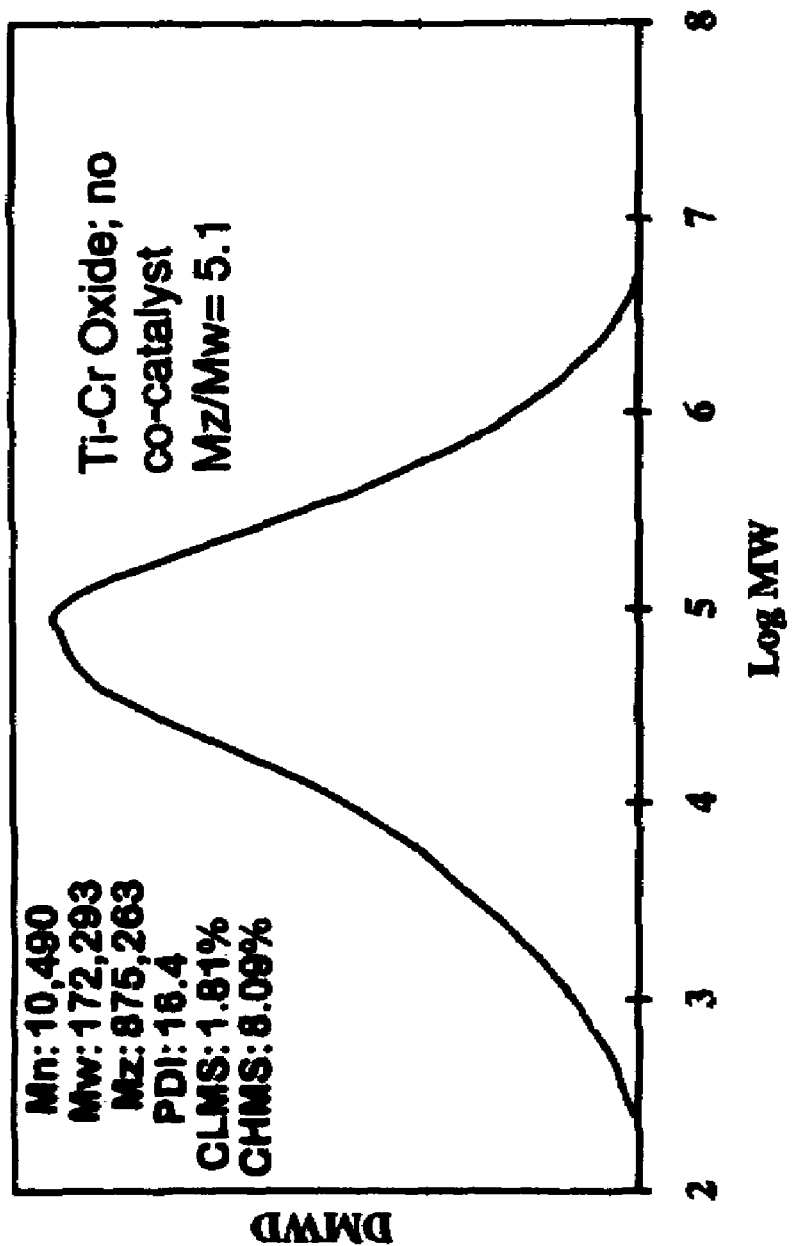
FIG. 35. Molecular weight plot for 957HS chromium oxide-TTIP catalyst-produced polyethylene, no co-catalyst.
Figure 36:
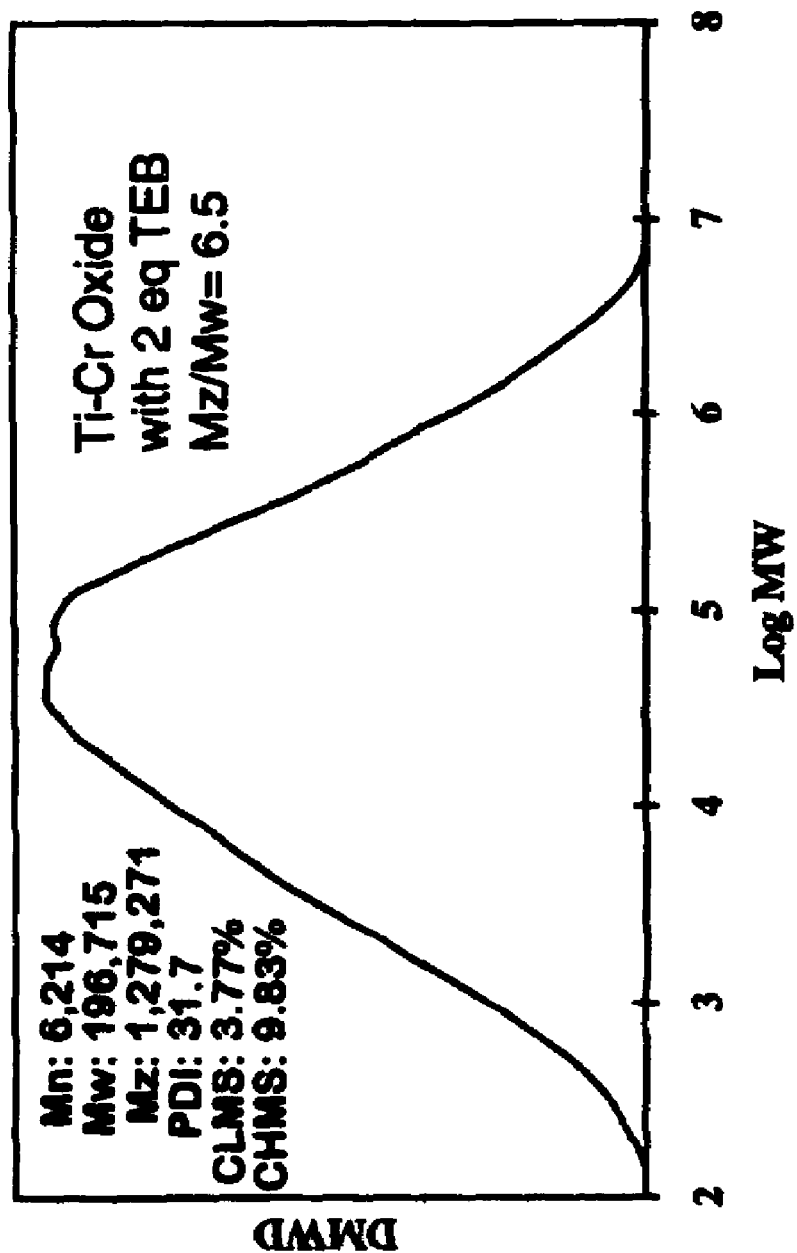
FIG. 36. Molecular weight plot for 957HS chromium oxide-TTIP catalyst-produced polyethylene, in the presence of TEB.

FIG. 35-36 illustrate molecular weigh-related data for polyethylene produced from Ti—CrOx catalyst alone (FIG. 35), and Ti—CrOx with TEB co-catalyst (FIG. 36). Polymer molecular weight is increased as seen in the decrease in flow index upon the use of TEB in comparison to no co-catalyst for both CrOx and Ti—CrOx systems in the absence of hydrogen. Catalyst activity was largely unaffected in both catalyst systems by the use of TEB, however, TEB broadens molecular weight distribution. Additionally, the broadening of molecular weight distribution effected by the use of TEB appears accompanied by the growth of only a modest molecular weight shoulder (FIG. 36) as is the case when using DEALE as co-catalyst.

The present invention allows for the manipulation of molecular weight, molecular weight distribution, catalyst activity, as well as other properties of the resulting polyethylene through the judicious use of co-catalyst generally, and of aluminum alkyl co-catalysts specifically. The aluminum in the space time yield for polyethylene production using chromium-based catalysts while maintaining high reaction temperatures.

Fluid Bed Gas Phase Examples

The following provides fluid bed gas phase examples of the present invention. A gas phase fluidized bed polymerization reactor of the UNIPOL™ process design having a nominal diameter of 14 inches was used for the continuous production of high-density ethylene-hexene copolymer. In these cases, the cycle gas blower was situated upstream of the cycle gas heat exchanger in the gas recirculation loop but the two could have been reversed to reduce the gas temperature where it entered the heat exchanger. The cycle pipe was about 2 inches in diameter and its flow rate was manipulated by a ball valve in the cycle line to control the superficial gas velocity in the fluid bed at the desired rate. Monomers and gaseous components were added upstream of the cooler before the blower, at the blower impeller or after the blower. Dry catalyst was continuously added in discrete small aliquots via ⅛ inch tube directly to the fluidized bed at a height about 0.1 to 2 m above the distributor plate and most preferably at about the 0.2 to 1.2 m range using a nitrogen carrier gas flow at a location about 15 to 50% of the reactor diameter. Polymer product was withdrawn periodically from the reactor through a discharge isolation tank in aliquots of about 0.2 to 5 kg to maintain a desired approximate average fluidized bed level or weight. A dilute stream of oxygen in nitrogen (200 ppmv) was available and used on some experiments to manipulate the polymer molecular weight and molecular weight distribution. It was added to the cycle gas before the heat exchanger when no free aluminum alkyl was present in the reaction system, but its addition point was switched to the fluidized bed when free TEAL and DEALE were present in order to avoid the possibility of some of the oxygen reacting with the aluminum alkyl in the cycle line or heat exchanger before entering the fluid bed. This was a precaution and does not preclude its addition to the cycle line or before the heat exchanger.

Various sets of experiments were conducted at discrete times, and each set included a comparative case. Background impurities in the feedstream and in the reactors varied with time and caused minor shifts in reaction temperature and catalyst productivity between experimental sets. Comparative cases include catalyst prepared at a commercial manufacturing facility as well as catalysts prepared in the laboratories. The laboratory-prepared catalysts required a lower reaction temperature and provided a comparative case for experimental catalysts also prepared in the laboratory.

Examples 54 through 59 in Table 12 show the results of employing various supports and chromium sources. The reactor operated well without sheeting or chunk formation for all the examples. Examples 54 and 55 show the results for the comparative catalyst (silylchromate made on 955 silica dehydrated at 600° C. and reduced with 5 equivalents of DEALE). The experimental catalysts are compared to Example 55. SC catalyst made on MS3050 support (Example 56) had significantly higher catalyst productivity and made broad molecular weight distribution polymer with a high molecular weight shoulder. The catalyst employed in Examples 57 and 58 are based on CrOx on 955 silica activated at 825° C. and then reduced with 5 equivalents of DEALE. In both cases higher catalyst productivities were obtained and higher reaction temperatures were required to make the polymer. This shows that the catalysts inherently make higher molecular weight polymer and will be useful for short residence time operation. In Example 58, oxygen addback to the reactor was also used which at a given temperature lowers the polymer molecular weight and increases the polymer melt flow ratio (MFR) values (indicative of broader polymer molecular weight distribution). Example 59 shows the results for a PQ CrOx catalyst (CrOx on MS3050) activated at 700° C. followed by reduction with 5 equivalents of DEALE. Here again higher catalyst productivities are obtained and higher reaction temperatures are needed to make the polymer.

In summary, these gas phase results support the observations found in the earlier examples. Higher catalyst productivities and higher molecular weight polymers can be achieved employing alternate supports for silylchromate catalyst production. Employment of reduced CrOx catalysts can also supply the same improvements. In all cases broad molecular weight polymers are obtained with the desirable high molecular weight shoulder.

TABLE 12

Gas Phase Conditions and Results with DEALE In-Catalyst; Silica Support Varied

| | Example | | | | | |
|---|---|---|---|---|---|---|
| | 54 Comparative | 55 Comparative | 56 | 57 | 58 | 59 |
| Cr Source | Silyl Chromate | Silyl Chromate | Silyl Chromate | Chromium Oxide | Chromium Oxide | Chromium Oxide |
| Cr Loading, wt % | 0.24 | 0.24 | 0.50 | 0.50 | 0.50 | 0.50 |
| DEALE/Cr Mole Ratio | 5 | 5 | 5 | 5 | 5 | 5 |
| Silica Support | 955 | 955 | MS 3050 | 955 | 955 | MS 35100 |
| Source (Comm. = Commercial) | Comm. | Pilot Plant | Pilot Plant | | | |
| Temperature, ° C. | 96.5 | 88.0 | 92.1 | 103.9 | 99.9 | 104.9 |
| Total Pressure, kPa | 2501 | 2492 | 2501 | 2494 | 2493 | 2490 |
| Ethylene Pressure, kPa | 1524 | 1510 | 1517 | 1510 | 1510 | 1517 |
| $H_2/C_2$ Mole Ratio | 0.0097 | 0.0103 | 0.0106 | 0.0103 | 0.0204 | 0.0106 |
| Hexene/$C_2$ Mole Ratio | 0.0049 | 0.0100 | 0.0079 | 0.0050 | 0.0065 | 0.0031 |
| Oxygen Addition, ppmv | None | None | None | None | 0.10 | 0.251 |
| Superficial Gas Velocity, m/sec | 0.530 | 0.530 | 0.530 | 0.589 | 0.607 | 0.527 |
| Bed Weight, kg | 83.9 | 83.9 | 71.7 | 79.4 | 79.4 | 69.9 |
| Bed Height, m | 2.18 | 2.02 | 2.60 | 2.08 | 2.09 | 3.48 |
| Production Rate, kg/h | 16.3 | 16.3 | 11.3 | 14.1 | 12.7 | 15.0 |
| Average Residence Time, h | 5.2 | 5.1 | 6.3 | 5.7 | 6.0 | 4.6 |
| Space Time Yield, kg/h/m$^3$ | 83 | 91 | 50 | 75 | 70 | 50 |
| Catalyst Productivity, kg/kg | 4965 | 4035 | 7217 | 6554 | 5748 | 6375 |
| Fluidized Bulk Density, kg/m$^3$ | 325 | 351 | 232 | 322 | 320 | 170 |

TABLE 12-continued

Gas Phase Conditions and Results with DEALE In-Catalyst; Silica Support Varied

| | Example | | | | | |
|---|---|---|---|---|---|---|
| | 54 Comparative | 55 Comparative | 56 | 57 | 58 | 59 |
| Settled Bulk Density, kg/m$^3$ | 487 | 527 | 352 | 492 | 508 | 311 |
| Resin APS, mm | 0.716 | 0.734 | 1.11 | 0.777 | 0.777 | 0.919 |
| Melt Index (I$_2$), dg/min | 0.10 | 0.08 | 0.10 | 0.12 | 0.09 | 0.05 |
| Flow Index (I$_5$), dg/min | 0.49 | 0.47 | 0.60 | 0.60 | 0.49 | 0.44 |
| Flow Index (I$_{21}$), dg/min | 10.5 | 12.8 | 13.6 | 12.3 | 12.1 | 4.16 |
| MFR (I$_{21}$/I$_5$) | 21.2 | 27.2 | 22.5 | 20.6 | 24.7 | 9.4 |
| MFR (I$_{21}$/I$_2$) | 107 | 155 | 131 | 99 | 138 | 90.9 |
| Density, g/cm$^3$ | 0.9472 | 0.9481 | 0.9482 | 0.9479 | 0.9483 | 0.9485 |
| Mn | 10214 | — | 8374 | 10283 | 11140 | 14958 |
| Mw | 256077 | — | 291804 | 187522 | 206907 | 304972 |
| Mz | 1734620 | — | 2100445 | 1213861 | 1302183 | 1779473 |
| Mz + 1 | 3284606 | — | 3626163 | 2681581 | 2673316 | 3271683 |
| Mv | 175935 | — | 190696 | 134078 | 146591 | 216325 |
| PDI (Mw/Mn) | 25.07 | — | 34.85 | 18.24 | 18.57 | 20.39 |
| PDI (Mz/Mw) | 6.77 | — | 7.20 | 6.47 | 6.29 | 5.83 |
| CHMS (% > 500K) | 11.76 | — | 13.29 | 8.62 | 9.93 | 14.28 |
| CLMS (% < 1K) | 1.76 | — | 2.24 | 1.95 | 1.44 | 0.98 |

Examples 60 through 64 in Table 13 were run in a reactor similar to those of Table 12. Example 60 is the comparative example. Examples 61 through 64 show the effect of TEAL addition to a standard silylchromate catalyst (silylchromate made on 955 silica dehydrated at 600° C. and reduced with 5 equivalents of DEALE). In Table 13 the results show an optimum in the amount of TEAL added to a gas phase fluid bed polymerization of silylchromate catalyst based on productivity, resin particle characteristics, increased reaction temperature and MFR. For the specified catalyst and reaction conditions, that optimum was approximately in the 0.5 to 3 TEAL/Cr range and more preferably in the 1 to 2 TEAL/Cr range. The catalyst was the same in this set of experiments. The productivity values were based on a catalyst addition rate and resin production rate material balance. The chromium remaining in the resin is similar to the productivity trends. The TEAL/Cr added mole ratio was based on the TEAL feed rate and a measure of the Cr in the resin by an X-ray method. The TEAL was added to the bed using a ⅛-inch tube set up like the catalyst injection tube but without sweep nitrogen. The TEAL was provided as a dilute solution in purified isopentane, and the container it was prepared in had previously been exposed to TEAL prior to filling to reduce the possibility of reactive impurities such as water in the container that would consume the small amount of TEAL present. The reactor operated well during the time TEAL was added without sheet, chip or chunk formation. The static voltage in the bed measured by a high resistance-high capacitance electronic probe showed reduced levels when TEAL was present—the static remained neutral but in a narrower band. The wall skin thermocouples located at various distances above the plate in the fluid bed and in the freeboard above the bed were excellent for the no-TEAL case and seemed even better in the presence of TEAL with less fluctuation and a shift of about 1 to 2° C. closer (from below) towards the bed average core temperature.

In summary the addition of co-catalyst (TEAL) results in higher catalyst activity and allows the reactor to run at higher temperatures to achieve the same polymer molecular weight. The polymer molecular weight distribution remains unchanged in all these examples.

TABLE 13

Gas Phase Conditions and Results with DEALE In-Catalyst; TEAL/Cr Ratio Varied

| | Experiment | | | | |
|---|---|---|---|---|---|
| | 60 Comparative | 61 | 62 | 63 | 64 |
| Cr Source | Silyl Chromate | Silyl Chromate | Silyl Chromate | Silyl Chromate | Silyl Chromate |
| Cr Loading, wt % | 0.24 | 0.24 | 0.24 | 0.24 | 0.24 |
| DEALE/Cr Mole Ratio | 5 | 5 | 5 | 5 | 5 |
| Silica Support | 955 | 955 | 955 | 955 | 955 |
| Source (Comm. = Commercial) | Comm. | Comm. | Comm. | Comm. | Comm. |
| TEAL Added to Reactor, TEAL/Cr Mole Ratio | None | 0.91 | 2.22 | 3.22 | 4.85 |

TABLE 13-continued

Gas Phase Conditions and Results with DEALE In-Catalyst; TEAL/Cr Ratio Varied

| | Experiment | | | | |
|---|---|---|---|---|---|
| | 60 Comparative | 61 | 62 | 63 | 64 |
| Temperature, ° C. | 98.0 | 102.5 | 102.5 | 102.5 | 100.5 |
| Total Pressure, kPa | 2491 | 2492 | 2490 | 2492 | 2491 |
| Ethylene Pressure, kPa | 1510 | 1510 | 1510 | 1510 | 1510 |
| $H_2/C_2$ Mole Ratio | 0.010 | 0.010 | 0.010 | 0.010 | 0.099 |
| Hexene/$C_2$ Mole Ratio | 0.00433 | 0.00353 | 0.00330 | 0.00331 | 0.00360 |
| Oxygen Addition, ppmv | None | None | None | None | None |
| Superficial Gas Velocity, m/sec | 0.555 | 0.561 | 0.555 | 0.564 | 0.564 |
| Bed Weight, kg | 88.9 | 87.5 | 87.5 | 87.5 | 87.1 |
| Bed Height, m | 3.04 | 2.94 | 3.05 | 3.12 | 3.21 |
| Production Rate, kg/h | 19.1 | 18.0 | 17.4 | 16.6 | 17.2 |
| Average Residence Time, h | 4.7 | 4.9 | 5.0 | 5.3 | 5.1 |
| Space-Time Yield, kg/h/$m^3$ | 70 | 69 | 64 | 59 | 61 |
| Catalyst Productivity, kg/kg | 5041 | 6666 | 6452 | 6150 | 5308 |
| Fluidized Bulk Density, kg/$m^3$ | 328 | 333 | 320 | 315 | 304 |
| Settled Bulk Density, kg/$m^3$ | 483 | 485 | 466 | 464 | 447 |
| Resin APS, mm | 0.752 | 0.790 | 0.780 | 0.765 | 0.681 |
| Resin Fines <120 Mesh, wt % | 1.31 | 1.28 | 0.39 | 0.65 | 0.82 |
| Melt Index ($I_2$), dg/min | 0.096 | 0.098 | 0.098 | 0.090 | 0.087 |
| Flow Index ($I_5$), dg/min | 0.470 | 0.474 | 0.472 | 0.459 | 0.450 |
| Flow Index ($I_{21}$), dg/min | 9.79 | 9.75 | 9.91 | 9.81 | 10.2 |
| MFR ($I_{21}/I_5$) | 20.7 | 20.5 | 21.1 | 21.3 | 22.7 |
| MFR ($I_{21}/I_2$) | 102 | 100 | 101 | 108 | 116 |
| Density, g/$cm^3$ | 0.9480 | 0.9481 | 0.9474 | 0.9474 | 0.9472 |
| Cr in Polymer, ppmw | 0.44 | 0.35 | 0.38 | 0.41 | 0.53 |
| Mn | 12460 | 13519 | 11758 | 9685 | 11647 |
| Mw | 279637 | 265684 | 276778 | 263471 | 253762 |
| Mz | 1875317 | 1598806 | 1826871 | 1722578 | 1731498 |
| Mz + 1 | 3543254 | 3109360 | 3432220 | 3224517 | 3436515 |
| Mv | 193220 | 188165 | 190700 | 182352 | 174394 |
| PDI (Mw/Mn) | 22.4 | 19.65 | 23.54 | 27.2 | 21.79 |
| PDI (Mz/Mw) | 6.71 | 6.02 | 6.60 | 6.54 | 6.82 |
| CHMS (% > 500K) | 12.63 | 12.82 | 13.01 | 12.24 | 11.98 |
| CLMS (% < 1K) | 1.31 | 1.12 | 1.34 | 2.48 | 1.27 |

The experiments of Examples 65-73 (summarized in Table 14) and Example 74 (discussed in the text below) were conducted in gas phase polymerization reactors similar to those of the previous experiments. Examples 65 through 71 examined the effects of TEAL co-catalyst addition in the preferred range at high and low space-time yield and with catalysts prepared at two DEALE/Cr catalyst levels (5 equivalents of DEALE/Cr and 1.5 equivalents of DEALE/Cr). TEAL increased the catalyst productivity about 35% at each STY studied, and also increased the reaction temperature about 3 to 5° C. at each space-time yield. TEAL allowed operation at the higher space-time yield with catalyst productivity comparable or greater than that of the lower space-time yield without TEAL. Resin particle size was increased and fines reduced when operating at the higher space-time yield in the presence of TEAL compared to without it. MFR increased with increasing space-time yield. The performance of the low and high DEALE catalysts was similar in the presence of TEAL but different without. As can be seen the catalyst productivity and required reactor temperature are inadequate at high space-time yield (low residence times) operation without the presence of co-catalyst (Ex. 67 and 70). These gas phase results support the earlier examples showing the use of co-catalyst in conjunction with silylchromate catalysts.

Example 72 shows the use of oxygen add-back with the addition of co-catalyst. Polymer flow index increased upon the addition of oxygen to the reactor. Oxygen can be added to control polymer molecular weight and molecular weight distribution.

DEALE was added to the reactor in Example 73 instead of TEAL using a higher loaded chromium oxide catalyst (0.5 wt % Cr on 955 silica activated at 825° C.), resulting in increased catalyst productivity and increased reaction temperature compared to standard silylchromate operation with or without TEAL.

Example 74: Addition of TEAL to an ongoing polymerization reaction using a low DEALE/Cr ratio silylchromate catalyst (1.5:1 DEALE/Cr) in the fluidized bed twice resulted in the formation of polymer sheets and agglomerates that blocked the resin discharge port forcing a reactor shutdown The reactor operated well for Experiments 65 to 72. TEAL was introduced to a TEAL-free system successfully using the 5:1 DEALE/Cr silylchromate catalyst. TEAL examples with the 1.5:1 DEALE/Cr catalyst were successfully conducted by transitioning from the 5:1 to 1.5:1 catalyst with TEAL already present in the fluidized bed reactor. It is preferred to initiate the catalyst addition, particularly for the lower DEALE/Cr catalysts, to a bed that already contains a sufficient amount of TEAL.

The TEAL and DEALE addition to the reactors were made at a pre-calculated rate and then the Al/Cr ratio calculated when the experiment was finished. It would be possible to control at a predetermined Al/Cr ratio based on catalyst addition rate, or to specify an approximate constant feed rate of the TEAL or DEALE. Their feed rate could also be proportioned to the resin production rate to control their concentration at some specified level, preferably one that achieves the desired results with the minimum use of reactive agent.

TABLE 14

Gas Phase Conditions and Results with DEALE In-Catalyst; DEALE/Cr Ratio Varied

| | Example | | | |
|---|---|---|---|---|
| | 65 Comparative | 66 | 67 Comparative | 68 |
| Cr Source | Silyl Chromate | Silyl Chromate | Silyl Chromate | Silyl Chromate |
| Cr Loading, wt % | 0.24 | 0.24 | 0.24 | 0.24 |
| DEALE/Cr Mole Ratio | 5 | 5 | 5 | 5 |
| Silica Support | 955 | 955 | 955 | 955 |
| Source (Comm. = Commercial) | Comm. | Comm. | Comm. | Comm. |
| TEAL Added to Reactor, TEAL/Cr Mole Ratio | None | 0.91 | None | 1.07 |
| Temperature, ° C. | 98.0 | 102.5 | 92.7 | 99.0 |
| Total Pressure, kPa | 2491 | 2492 | 2489 | 2488 |
| Ethylene Pressure, kPa | 1510 | 1510 | 1441 | 1510 |
| $H_2/C_2$ Mole Ratio | 0.010 | 0.010 | 0.0544 | 0.0101 |
| Hexene/$C_2$ Mole Ratio | 0.00433 | 0.00353 | 0.0065 | 0.0036 |
| Oxygen Addition, ppmv | None | None | None | None |
| Superficial Gas Velocity, m/sec | 0.555 | 0.561 | 0.552 | 0.567 |
| Bed Weight, kg | 88.9 | 87.5 | 90.3 | 89.4 |
| Bed Height, m | 3.04 | 2.94 | 2.97 | 2.92 |
| Production Rate, kg/h | 19.1 | 18.0 | 34.0 | 33.7 |
| Average Residence Time, h | 4.7 | 4.9 | 2.7 | 2.7 |
| Space-Time Yield, kg/h/m3 | 70 | 69 | 128 | 130 |
| Catalyst Productivity, kg/kg | 5041 | 6666 | 2786 | 3618 |
| Fluidized Bulk Density, kg/m$^3$ | 328 | 333 | 343 | 346 |
| Settled Bulk Density, kg/m$^3$ | 483 | 485 | 523 | 511 |
| Resin APS, mm | 0.752 | 0.790 | 0.655 | 0.752 |
| Resin Fines <120 Mesh, wt % | 1.31 | 1.28 | 1.33 | 0.90 |
| Melt Index ($I_2$), dg/min | 0.096 | 0.098 | 0.083 | 0.081 |
| Flow Index ($I_5$), dg/min | 0.470 | 0.474 | 0.438 | 0.441 |
| Flow Index ($I_{21}$), dg/min | 9.79 | 9.75 | 10.4 | 10.1 |
| MFR ($I_{21}/I_5$) | 20.7 | 20.5 | 23.5 | 23.0 |
| MFR ($I_{21}/I_2$) | 102 | 100 | 125 | 126 |
| Density, g/cm$^3$ | 0.9480 | 0.9481 | 0.9471 | 0.948 |
| Cr in Polymer, ppmw | 0.44 | 0.35 | 0.80 | 0.59 |
| Mn | 12460 | 13519 | 8229 | 10657 |
| Mw | 279637 | 265684 | 271033 | 230657 |
| Mz | 1875317 | 1598806 | 1888749 | 1607038 |
| Mz + 1 | 3543254 | 3109360 | 3520335 | 3596324 |
| Mv | 193220 | 188165 | 183560 | 160356 |
| PDI (Mw/Mn) | 22.4 | 19.65 | 32.94 | 21.64 |
| PDI (Mz/Mw) | 6.71 | 6.02 | 6.97 | 6.97 |
| CHMS (% > 500K) | 12.63 | 12.82 | 12.45 | 10.95 |
| CLMS (% < 1K) | 1.31 | 1.12 | 2.68 | 1.57 |

| | Example | | | | |
|---|---|---|---|---|---|
| | 69 | 70 Comparative | 71 | 72 | 73 |
| Cr Source | Silyl Chromate | Silyl Chromate | Silyl Chromate | Silyl Chromate | Chromium Oxide |
| Cr Loading, wt % | 0.24 | 0.24 | 0.24 | 0.24 | 0.50 |
| DEALE/Cr Catalyst Mole Ratio | 1.5 | 1.5 | 1.5 | 5 | 0 |
| Silica Support | 955 | 955 | 955 | 955 | 955 |
| Source (Comm. = Commercial) | Comm. | Comm. | Comm. | Comm. | Comm. |
| TEAL Added to Reactor, TEAL/Cr Mole Ratio | 2.47 | no | 0.83 | 1.60 | DEALE at 4.7 Al/Cr |
| Temperature, ° C. | 102.0 | 96.7 | 100.0 | 102.0 | 104.5 |
| Total Pressure, kPa | 2491 | 2488 | 2488 | 2489 | 2491 |
| Ethylene Pressure, kPa | 1510 | 1503 | 1510 | 1510 | 1517 |

TABLE 14-continued

Gas Phase Conditions and Results with DEALE In-Catalyst; DEALE/Cr Ratio Varied

| | | | | | |
|---|---|---|---|---|---|
| H$_2$/C$_2$ Mole Ratio | 0.010 | 0.010 | 0.0101 | 0.010 | 0.0098 |
| Hexene/C$_2$ Mole Ratio | 0.0037 | 0.0042 | 0.0036 | 0.0037 | 0.0034 |
| Oxygen Addition, ppmv | None | None | None | 0.120 | None |
| Superficial Gas Velocity, m/sec | 0.570 | 0.564 | 0.573 | 0.570 | 0.564 |
| Bed Weight, kg | 88.5 | 90.3 | 88.9 | 87.5 | 84.8 |
| Bed Height, m | 3.22 | 3.00 | 2.92 | 3.42 | 2.84 |
| Production Rate, kg/h | 19.3 | 32.8 | 34.7 | 18.9 | 14.9 |
| Average Residence Time, h | 4.6 | 2.7 | 2.6 | 4.6 | 5.7 |
| Space-Time Yield, kg/h/m$^3$ | 67 | 123 | 133 | 62 | 59 |
| Catalyst Productivity, kg/kg | 6640 | 2564 | 3871 | 4926 | 17500 |
| Fluidized Bulk Density, kg/m$^3$ | 309 | 338 | 343 | 288 | 335 |
| Settled Bulk Density, kg/m$^3$ | 476 | 508 | 498 | 461 | 418 |
| Resin APS, mm | 0.770 | 0.617 | 0.757 | 0.665 | 1.22 |
| Resin Fines <120 Mesh, wt % | 0.73 | 1.62 | 0.64 | 1.14 | 0.56 |
| Melt Index (I$_2$), dg/min | 0.082 | 0.085 | 0.088 | 0.101 | 0.067 |
| Flow Index (I$_5$), dg/min | 0.429 | 0.43 | 0.46 | 0.503 | 0.39 |
| Flow Index (I$_{21}$), dg/min | 8.83 | 9.60 | 10.3 | 10.5 | 9.60 |
| MFR (I$_{21}$/I$_5$) | 20.6 | 22.0 | 22.4 | 21.0 | 24.8 |
| MFR (I$_{21}$/I$_2$) | 104 | 110 | 115 | 103 | 143.1 |
| Density, g/cm$^3$ | 0.9469 | 0.9478 | 0.9473 | 0.9481 | 0.9463 |
| Cr in Polymer, ppmw | — | — | — | — | — |
| Mn | 11571 | 11696 | 14938 | 9281 | 24787 |
| Mw | 254022 | 256144 | 232504 | 218079 | 235551 |
| Mz | 1560945 | 1450341 | 1326253 | 1364031 | 1350517 |
| Mz + 1 | 2925600 | 2717358 | 2562773 | 2544778 | 3047628 |
| Mv | 178701 | 182668 | 167657 | 152554 | 175124 |
| PDI (Mw/Mn) | 21.95 | 21.9 | 15.56 | 23.5 | 9.5 |
| PDI (Mz/Mw) | 6.14 | 5.66 | 5.70 | 6.25 | 5.73 |
| CHMS (% > 500K) | 12.14 | 12.74 | 11.25 | 10.47 | 10.9 |
| CLMS (% < 1K) | 1.63 | 1.43 | 0.75 | 2.25 | 0.08 |

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A process for producing an ethylene polymer comprising the steps of:
    contacting ethylene under polymerization conditions with a catalyst system in a reactor, said catalyst system comprising a supported chromium catalyst comprising chromium oxide, an alkyl aluminum alkoxide or an alkyl aluminum alkoxide in combination with an alkyl aluminum, and a silica-containing support comprising silica selected from the group consisting of silica having:
    (a) a pore volume of about 1.1 to about 1.8 cm$^3$/g and a surface area of about 245 to about 375 m$^2$/g, (b) a pore volume of about 2.4 to about 3.7 cm$^3$/g and a surface area of about 410 to about 620 m$^2$/g, and (c) a pore volume of about 0.9 to about 1.4 cm$^3$/g and a surface area of about 390 to about 590 m$^2$/g;
    b) wherein the supported chromium catalyst is activated at about 400 to about 860° C.; and
    c) wherein at least a portion of the alkyl aluminum alkoxide or the alkyl aluminum oxide in combination with the alkyl aluminum is added in situ, such that the portion of the alkyl aluminum alkoxide or the alkyl aluminum oxide in combination with the alkyl aluminum is added into the reactor in the presence of the monomers under polymerization conditions, and is not combined with the supported chromium catalyst prior to the addition into the reactor;
    wherein the alkyl aluminum oxide is present in an amount such that the polymer side chain branching, of the resulting ethylene polymer is reduced as compared to an ethylene polymer produced under identical conditions in the absence of the alkyl aluminum alkoxide, and wherein the alkyl aluminum alkoxide is present in an amount to effect a final molar ratio of aluminum to chromium of from about 0.1:1 to 10:1.

2. The process of claim 1 wherein said alkyl aluminum is triethyl aluminum, tri-isobutyl aluminum, or tri-n-hexyl aluminum.

3. The process of claim 1 wherein said alkyl aluminum alkoxide is diethyl aluminum ethoxide.

4. The process of claim 1, wherein said catalyst system further comprises titanium tetraisopropoxide.

5. The process of claim 1 wherein said polymerization is gas phase polymerization.

6. The process of claim 3 wherein said addition of diethyl aluminum ethoxide comprises addition directly to the catalyst during catalyst preparation.

7. The process of claim 1 wherein the polymer $M_w/M_n$ is greater than or equal to 16 and the polymer $M_z/M_w$ is greater than or equal to 6.

8. The process of claim 1, wherein the alkyl aluminum alkoxide has the general formula: $R_2$—Al—OR, wherein each of the alkyl groups R may be the same or different, and wherein the alkyl groups R have from 1 to about 12 carbon atoms.

9. The process of claim 1, wherein the alkyl aluminum alkoxide is selected from the group consisting of diethyl aluminum ethoixide, diethyl aluminum methoxide, dimethyl aluminum ethoxide, di-isopropyl aluminum ethoxide, diethyl aluminum propoxide, di-isobutyl aluminum ethoxide, methyl ethyal aluminum ethoxide, and combinations thereof.

10. The process of claim 1, wherein the alkyl aluminum has the general formula: $R_3Al$, wherein each of the alkyl groups R may be the same or different, and wherein the alkyl groups R have from 1 to about 12 carbon atoms.

11. The process of claim 1, wherein the alkyl aluminum is selcted from the group consisting triethyalaluminum, triisopropylaluminum, tri-isobutylaluminum, tri-n-hexyl aluminum, methyal diethylaluminum, trimethylaluminum and combinations thereof.

\* \* \* \* \*

UNITED STATES PATENT AND TRADEMARK OFFICE
CERTIFICATE OF CORRECTION

PATENT NO. : 7,563,851 B2  
APPLICATION NO. : 11/202311  
DATED : July 21, 2009  
INVENTOR(S) : Kevin J. Cann et al.

Page 1 of 1

It is certified that error appears in the above-identified patent and that said Letters Patent is hereby corrected as shown below:

Column 38, Line 6, "ethyal" should be deleted, and -- ethyl -- inserted therefore.

Column 38, Line 12, "triethyalaluminum" should be deleted, and -- triethylaluminum -- inserted therefore.

Column 38, Line 14, "methyal" should be deleted, and -- methyl -- inserted therefore.

Signed and Sealed this

Twenty-ninth Day of September, 2009

David J. Kappos  
*Director of the United States Patent and Trademark Office*